(12) United States Patent
Aoki et al.

(10) Patent No.: US 6,251,157 B1
(45) Date of Patent: Jun. 26, 2001

(54) SINTERED ALLOY HAVING SUPERB WEAR RESISTANCE AND PROCESS FOR PRODUCING THE SAME

(75) Inventors: Yoshimasa Aoki; Koichiro Hayashi, both of Kashiwa (JP); Koichi Aonuma, Matsudo; Toru Tsuboi, Kamagaya, all of (JP)

(73) Assignee: Hitachi Powdered Metals Co., Ltd., Chiba (JP)

( * ) Notice: Subject to any disclaimer, the term of this patent is extended or adjusted under 35 U.S.C. 154(b) by 0 days.

(21) Appl. No.: 09/376,855

(22) Filed: Aug. 18, 1999

(30) Foreign Application Priority Data

Aug. 19, 1998 (JP) .................................. 10-233249
Aug. 19, 1998 (JP) .................................. 10-233342

(51) Int. Cl.[7] ................. C22C 1/10; C22C 1/05
(52) U.S. Cl. ................. 75/231; 75/237; 75/246
(58) Field of Search ................. 75/231, 237, 246

(56) References Cited

U.S. PATENT DOCUMENTS

| 4,963,200 | * 10/1990 | Okuda et al. ........................ 148/325 |
| 5,411,571 | 5/1995 | Kobayashi et al. . |
| 5,952,590 | 9/1999 | Kawata et al. . |

FOREIGN PATENT DOCUMENTS

| 0 785 288 A1 | 7/1997 | (EP) . |
| 0 789 088 A1 | 8/1997 | (EP) . |
| 2210894 | 6/1989 | (GB) . |
| 2312217 | 10/1997 | (GB) . |

OTHER PUBLICATIONS

Patent Abstract of Japanese Publication No. 09195012 A.
Patent Abstract of Japanese Publication No. 09195013 A.
Patent Abstract of Japanese Publication No. 09195014 A.
Abstract of Publication No. 17968/74.
Abstract of Publication No. 70605/73.
Patent Abstract of Japanese Publication No. 10219411 A.
Abstract of Publication No. 55–73850 A.
Abstract of Publication No. 55–73851 A.
Abstract of Publication No. 55–73852 A.
Abstract of Publication No. 62–10244 A.
Abstract of Publication No. 62–10244 A.
Abstract of Publication No. 62–10245 A.
Abstract of Publication No. 62–10246 A.
Abstract of Publication No. 1–68446 A.
Abstract of Publication No. 1–68449 A.

* cited by examiner

*Primary Examiner*—Daniel Jenkins
(74) *Attorney, Agent, or Firm*—Scully, Scott, Murphy & Presser

(57) ABSTRACT

A sintered alloy having superb wear resistance comprising: composite phases dispersed in a matrix of the sintered alloy; the composite phase consisting of; a particle group in which Cr carbide particles and Cr sulfide particles exist in a mixed condition; and a ferrite phase or a mixture phase of ferrite and austenite surrounding the particle group as a core.

3 Claims, 44 Drawing Sheets

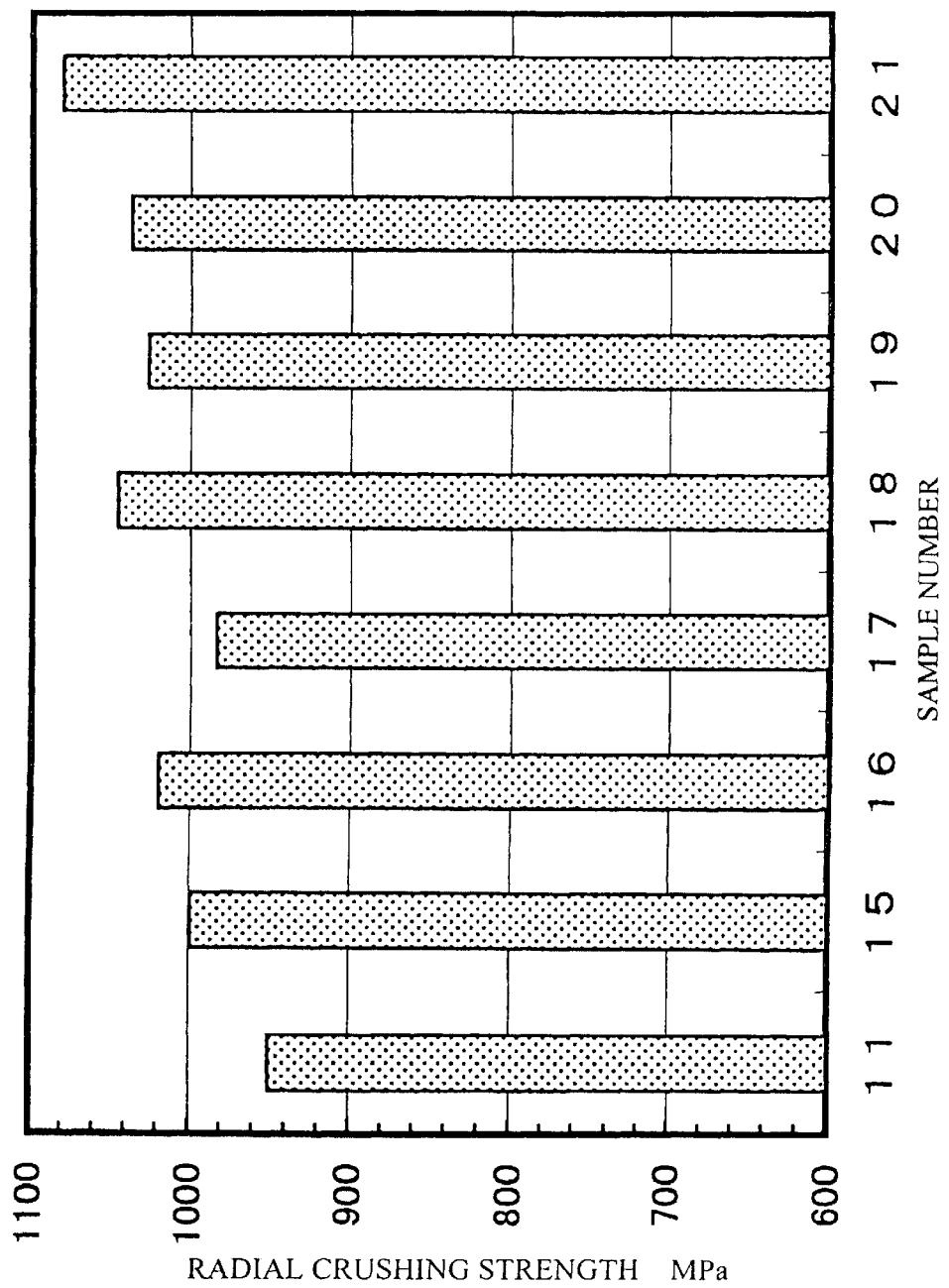

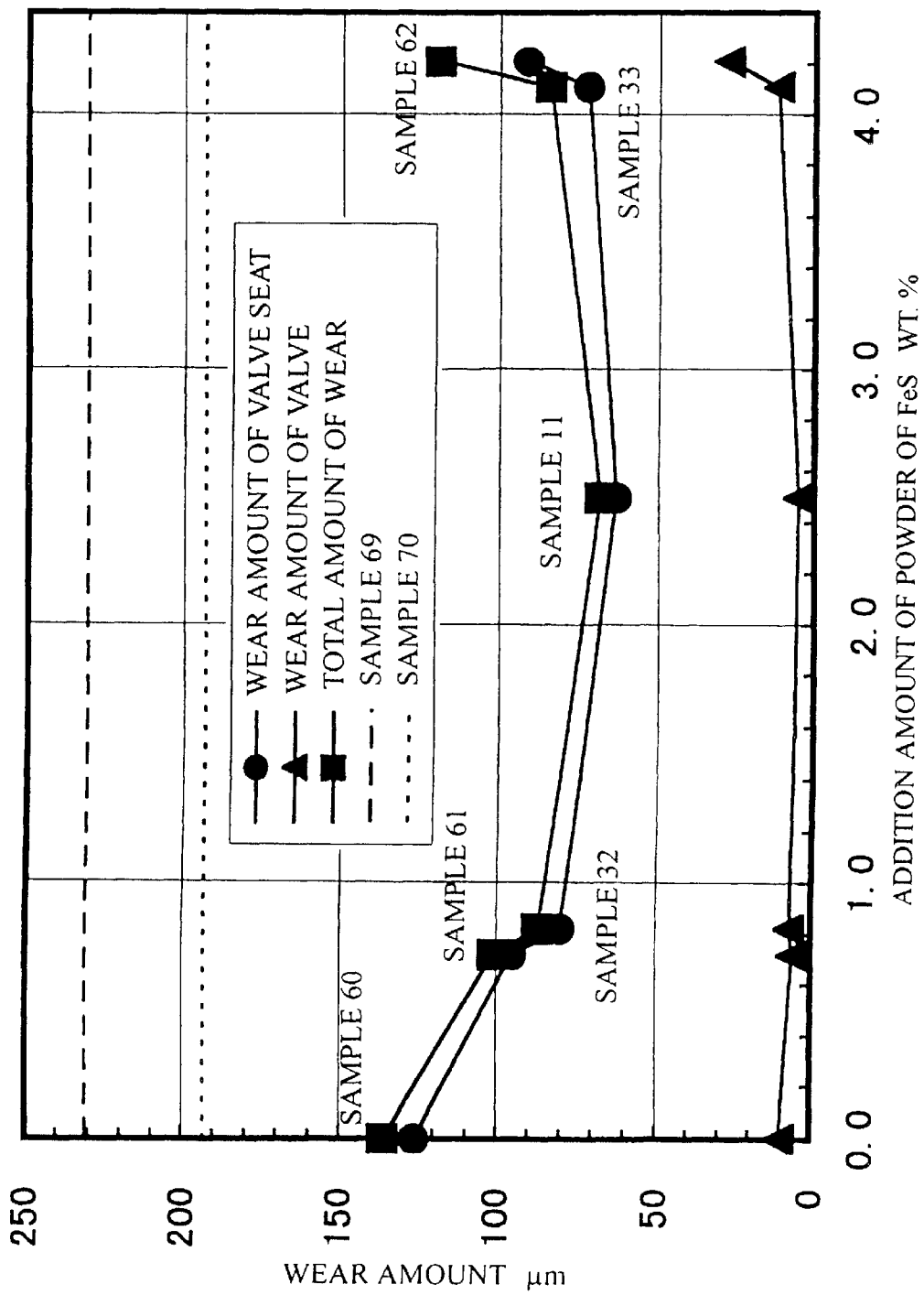

SINTERED ALLOY HAVING SUPERB WEAR RESISTANCE AND PROCESS FOR PRODUCING THE SAME

BACKGROUND OF THE INVENTION

This invention relates to a sintered alloy suited to be used for a valve seat of internal combustion engines. Particularly, the invention relates to the technique which can improve machinability as well as superb wear resistance at elevated temperatures.

Recently, with the progress of higher performance of automobile engines, the conditions for operation became much harder. The valve seat used for such engines is also inevitably required to withstand severer environments than ever. To fulfill such requirements, the present applicant previously proposed several sintered alloys having superb wear resistance as disclosed, for example, in Japanese Patent Publication Nos. 17968/74, 36242/80, 56547/82, and 55593/93, and Japanese Patent Unexamined Publication Nos. 195012/97, 195013/97, 195014/97, 219417/98, and Japanese Patent Application No. 141976/98.

Of all the proposed sintered alloys having superb wear resistance, the alloy disclosed in Japanese Patent Publication No. 56547/82 is improved in the wear resistance. The sintered alloy having such improved wear resistance is produced by preparing, in order to form a matrix for a valve seat, two kinds of alloy powders by alloying all the components contained in the alloys disclosed in Japanese Patent Publication Nos. 17968/74 and 36242/80 only excepting graphite, then mixing a graphite powder to the alloy powders thus prepared, and then forming and sintering the mixed powder so that a porphyritic matrix structure will be exhibited. Specifically, graphite is added to a mixed powder of A alloy powder consisting, percent by weight, Cr in the amount of 2 to 4%, Mo in the amount of 0.2 to 0.4%, V in the amount of 0.2 to 0.4%, and the balance of Fe, and B alloy powder consisting of, percent by weight, Ni in the amount of 0.5 to 3%, Mo in the amount of 0.5 to 3%, Co in the amount of 5.5 to 7.5%, and the balance of Fe to set the weight ratio between the A alloy powder and the B alloy powder to 25:75 to 75:25. By doing so, the wear resistance is improved.

The sintered alloy having superb wear resistance disclosed in Japanese Patent Publication No. 55593/93 exhibits a metallographic structure in which particle groups consisting of Mo in the amount of 26 to 30%, Cr in the amount of 7 to 9%, Si in the amount of 1.5 to 2.5% and the balance of Co disperse in the alloy disclosed in Japanese Patent Publication No. 36242/80. The sintered alloy having superb wear resistance can be produced using the mixed powder of the above B alloy powder, C alloy powder consisting of Mo in the amount of 26 to 30%, Cr in the amount of 7 to 9%, Si in the amount of 1.5 to 2.5% and the balance of Co, and a graphite powder.

The sintered alloy having superb wear resistance disclosed in Japanese Patent Unexamined Publication No. 195012/97 consists of, as a whole, Ni in the amount of 0.736 to 9.65%; Cu in the amount of 0.736 to 2.895%; Mo in the amount of 0.294 to 0.965%; Cr in the amount of 0.12 to 6.25%, C in the amount of 0.508 to 2.0%. The sintered alloy exhibits a metallographic structure consisting of (1) martensite, (2) bainite surrounding sorbite and/or upper bainite as a core, (3) austenite which is high in Ni concentration (4) a particle group mainly consisting of Cr carbide covered by ferrite which is high in Cr concentration. The sintered alloy can be produced by using a mixed powder of an Fe powder partly diffused with Ni in the amount of 1 to 10%; Cu in the amount of 1 to 3%; Mo in the amount of 0.4 to 1%, and 3 to 25% of an Fe—Cr type alloy powder consisting of Cr in the amount of 4 to 25%; C in the amount of 0.25 to 2.4% and the balance of Fe, and 0.5 to 1.4% of a graphite powder.

The sintered alloy having superb wear resistance disclosed in Japanese Patent Unexamined Publication No. 195013/97 consists of, as a whole, Ni in the amount of 0.736 to 5.79%; Cr in the amount of 0.12 to 6.25%; Mo in the amount of 0.294 to 0.965%; C in the amount of 0.508 to 2.0%. The sintered alloy exhibits a metallographic structure in which the following phases are dispersed in the matrix of bainite or a mixed structure consisting of bainite and sorbite. The phase consists of a hard phase core mainly consisting of Cr carbide, ferrite phase high in Cr concentration, which surrounds the hard phase core, and martensite phase surrounding the ferrite. The sintered alloy can be produced by using a mixed powder of an alloy powder consisting of Ni in the amount of 1 to 6% and Mo in the amount of 0.4 to 1%, and 3 to 25% of an Fe—Cr type alloy powder consisting of Cr in the amount of 4 to 25%; C in the amount of 0.25 to 2.4% and the balance of Fe, and 0.5 to 1.4% of a graphite powder.

The sintered alloy having superb wear resistance disclosed in Japanese Patent Unexamined Publication No. 195014/97 consists of, as a whole, Ni in the amount of 0.736 to 5.79%; Cr in the amount of 0.12 to 6.25%; Mo in the amount of 0.368 to 1.93%; C in the amount of 0.508 to 2.0%. The sintered alloy exhibits a metallographic structure in which the following phases are dispersed in a mixed structure consisting of (1) bainite or mixed structure of bainite and sorbite, (2) martensite, and (3) austenite. The phase consists of a hard phase core mainly consisting of Cr carbide, ferrite phase high in Cr concentration, which surrounds the hard phase core, and martensite surrounding the ferrite. The sintered alloy can be produced by using a mixed powder of an alloy powder in which 1 to 6% of Ni is partly diffused to an alloy powder consisting of Mo in the amount of 0.5 to 2%, and the balance of Fe, 3 to 25% of an Fe—Cr type alloy powder consisting of Cr in the amount of 4 to 25%; C in the amount of 0.25 to 2.4% and the balance of Fe, and 0.5 to 1.4% of a graphite powder.

Further, the sintered alloy having superb wear resistance proposed in Japanese Patent Unexamined Publication No. 219417/98 is based on the alloy disclosed in Japanese Patent Publication No. 56547/82 in which the alloy exhibits a porphyritic metallographic structure. In the sintered alloy, in order to strengthen the matrix, Ni is added thereto, and in addition, the Co base alloy power used in Japanese Patent Publication No. 55593/93 and the Fe—Cr type alloy powder used in 195012/97, 195013/97 and 195014/97 for forming hard phases are added thereto. The sintered alloy consists of, as a whole, Ni in the amount of 1.35 to 19.61%, Cr in the amount of 0.9 to 11.05%, Mo in the amount of 1.44 to 9.09, Co in the amount of 3.6 to 20.05, V in the amount of 0.018 to 0.26%, Si in the amount of 0.1 to 0.75%, C in the amount of 0.35 to 1.5%, and the balance of Fe. The sintered alloy exhibits a metallographic structure in which the following first and second hard phases are dispersed in a mixed structure of martensite, sorbite and austenite. The first hard phase comprises a hard phase as a core mainly consisting of Mo silicide, and a diffused phase including diffused Co surrounding the hard phase. The second hard phase comprises a hard phase as a core mainly consisting of Cr carbide, and a mixture phase of ferrite and austenite surrounding the hard phase.

The sintered alloy having superb wear resistance proposed in Japanese Patent Application No. 141976/98 is characterized in that the Fe—Cr type alloy powder used in 195012/97, 195013/97 and 195014/97 for forming hard phases is added to a matrix which is strengthened by adding a Ni powder to an Fe powder. In the sintered alloy, the amount of austenite in the structure can be normalized by compacting, sintering and optionally performing a sub-zero treatment.

As apparent from the foregoing, the present applicant proposed several sintered alloys having superb wear resistance in order to meet with the requirements of the age. However, the present situation is that the conditions for operation are even increased in severeness as the performance of automobile engines is further improved and that the material, which is superior in wear resistance and in strength at elevated temperatures to the aforementioned sintered alloys, is demanded.

SUMMARY OF THE INVENTION

The sintered alloy having superb wear resistance according to the present invention is characterized by comprising composite phases dispersed in a matrix of the sintered alloy; the composite phase consisting of; a particle group in which Cr carbide particles and Cr sulfide particles exist in a mixed condition and a ferrite phase or a mixture phase of ferrite and austenite surrounding the particle group as a core. Effects of the sintered alloy having superb wear resistance thus constructed will now be described with reference to FIG. 1.

FIG. 1 is a schematic view showing a metallographic structure of the sintered alloy having superb wear resistance, whose surface is subjected to corrosion treatment with nital or the like. As shown in FIG. 1, in the matrix of the sintered alloy, particle groups in which Cr carbide particles and Cr sulfide particles exist in a mixed condition are dispersed. The particle group is surrounded by a ferrite phase or a mixture phase of ferrite and austenite, thus the composite phase having the particle group as a core is formed. In this way, the sintered alloy having superb wear resistance according to the invention can provide superb wear resistance to the matrix and improve machinability by dispersing not only Cr carbide particles which is high in hardness but also Cr sulfide particles having self-lubricating property. Furthermore, the ferrite phase or the mixture phase of ferrite and austenite are high in Cr concentration, thereby increasing the toughness and material strength thereof, and employing as a cushioning material for a counterpart component element. Therefore, the invention can further improve the wear resistance since the wear of the counterpart component element is restricted.

The matrix structure can be constructed by a solitary structure of pearite, sorbite, bainite or martensite, or a mixed structure chosen from the group added with austenite to them. Hard particles and lubricating materials can be dispersed in the solitary structure and the mixed structure.

It should be noted that the proportion of the particle group with respect to the metallographic structure is preferably in the range of 3 to 30% by area ratio. If the area ratio is less than 3%, the above mentioned wear resistance and machinability are hard to obtain. In contrast, if the area ratio exceeds 30%, the structure becomes excessively hard to promote the wear of the counterpart component element. As a result, the worn particles act as abrasive grains, so that the wear resistance is deteriorated. The area of the particle group can be obtained by measuring the inside area of the profile line of the particle group. Preferably, the area ratio is in the range of 3 to 25%, more preferably, in the range of 5 to 25%.

In the above sintered alloy having superb wear resistance, carbide particles formed by at least one of Mo, W and V are preferably existed in a mixed condition in the particle group. In this way, the particle group includes, in addition to Cr carbide and Cr sulfide, Mo carbide, V carbide, W carbide, and an intermetallic compound of Cr and Mo, V or W, so that the wear resistance is further improved. That is, it has a metallographic structure in which the particle group consisting of a mixture of Cr carbide Cr sulfide in the schematic view of FIG. 1 is replaced by a particle group consisting of a mixture of Cr carbide and Cr sulfide as a main component. Further, V and W form fine carbide with C to contribute to the improvement of the wear resistance, and the intermetallic compound and the carbide thereof have the effects for preventing the Cr carbide from becoming more coarse. Because the coarse Cr carbide promotes the wear of the counterpart component element, the wear of the valve as a counterpart component element is reduced by such preventive means and the wear resistance is improved.

The sintered alloy having superb wear resistance such as above can be produced by adding a particle group forming powder including 4 to 25% by weight of Cr and a sulfide powder consisting of at least one of $MoS_2$ powder, $WS_2$ powder, FeS powder and CuS powder to an Fe-base mixed powder or an Fe-base alloy powder including no Cr, and using the mixed powder thus obtained. Wherein, the sulfide powder is added in the amount of 0.3 to 1.5% by weight as a whole.

Specially, by using $MoS_2$ powder or $WS_2$ powder, Mo carbide or W carbide disperses in the matrix to further improve the wear resistance. By using CuS powder, the hardening property is improved in addition to promoting strengthen of the matrix due to diffusion of Cu in the matrix, so that the wear resistance is further improved.

It should be noted that the Fe-base mixed powder and the Fe-based alloy powder with no Cr is employed for forming a matrix. If the Fe—Cr type powder is used alone for forming the matrix, the ferrite phase which is high in Cr (mixture phase of ferrite and austenite) is not formed around the particle group since the Fe—Cr type alloy powder is also used for forming the particle group. As a result, improvement of the wear resistance due to improvement of the strengthening of the matrix is not expected. On the other hand, when the Fe-base alloy powder with no Cr is used together with the Fe—Cr type alloy powder, the ferrite phase which is high in Cr (mixture phase of ferrite and austenite) is formed around the particle group, so that the wear resistance is improved.

The followings are the reason why the content of Cr in the particle group forming powder is limited in the range of 4 to 25% by weight. If the Cr content is less than 4% by weight, insufficient amount of the Cr carbide and the Cr sulfide are formed, so that the improvement of the wear resistance and the machinability is not expected. In contrast, if the Cr content exceeds 25% by weight, the Cr carbide is excessively formed to promote the wear of the counterpart component element. Moreover, the hardness of the powder increases, to deteriorate the compactability. It should be noted that in order to limit the area ratio of the particle group with respect to the metallographic structure in the range of 3 to 30% by area ratio, the particle group forming powder is added in the amount of 5 to 30% by weight as a whole powder. The particle group forming powder is preferably added in the amount of 5 to 25% by weight.

Furthermore, the followings are the reason why the sulfide powder is added such that the content of S is limited in the range of 0.3 to 1.5% by weight as a whole. If the S content is less than 0.3% by weight, insufficient amount of the Cr sulfide is formed, so that the improvement of the wear resistance and the machinability is not sufficient. In contrast, if the S content exceeds 1.5% by weight, the Cr sulfide is excessively precipitated to decrease the strength of the matrix.

Preferably, at least one of Mo, V and W is included in the particle group forming powder, so that carbide particles formed by at least one of Mo, W and V can be existed in a mixed condition in the particle group.

According to another aspect of the invention, the invention provides valve sheets having the above-mentioned characteristics.

BRIEF DESCRIPTION OF THE DRAWINGS

FIG. 13($b$) is a chart showing the relationship between the ratio of A alloy power and B alloy powder in the preliminary mixed powder and the radial crushing strength, in the embodiment of the present invention;

FIG. 14($b$) is a chart showing the relationship between the amount of addition of Ni powder in the preliminary mixed powder and the radial crushing strength, in the embodiment of the present invention;

FIG. 15($b$) is a chart showing the relationship between the amount of addition of graphite powder in the preliminary mixed power and the radial crushing strength, in the embodiment of the present invention;

FIG. 16($b$) is a chart showing the relationship between the amount of addition of C alloy powder and the radial crushing strength, in the embodiment of the present invention;

FIG. 17($b$) is a chart showing the relationship between the content of Cr in D alloy powder and the radial crushing strength, in the embodiment of the present invention;

FIG. 18($b$) is a chart showing the relationship between the amount of addition of D alloy powder and the radial crushing strength, in the embodiment of the present invention;

FIG. 19($b$) is a chart showing how the Mo, V and W in E alloy powder affects the radial crushing strength, in the embodiment of the present invention;

FIG. 20($b$) is a chart showing the relationship between the amount of addition of FeS powder and the radial crushing strength, in the embodiment of the present invention;

FIG. 21($b$) is a chart showing the relationship between the amount of addition of $MoS_2$ powder and the radial crushing strength, in the embodiment of the present invention;

FIG. 22($b$) is a chart showing the relationship between the amount of addition of $WS_2$ powder and the radial crushing strength, in the embodiment of the present invention;

FIG. 23($b$) is a chart showing the relationship between the amount of addition of CuS powder and the radial crushing strength, in the embodiment of the present invention;

FIG. 24($b$) is a chart showing the relationship between the amount of addition of manganese sulfide powder and the radial crushing strength, in the embodiment of the present invention;

DETAILED DESCRIPTION OF THE EMBODIMENT(S)

Figure 1:
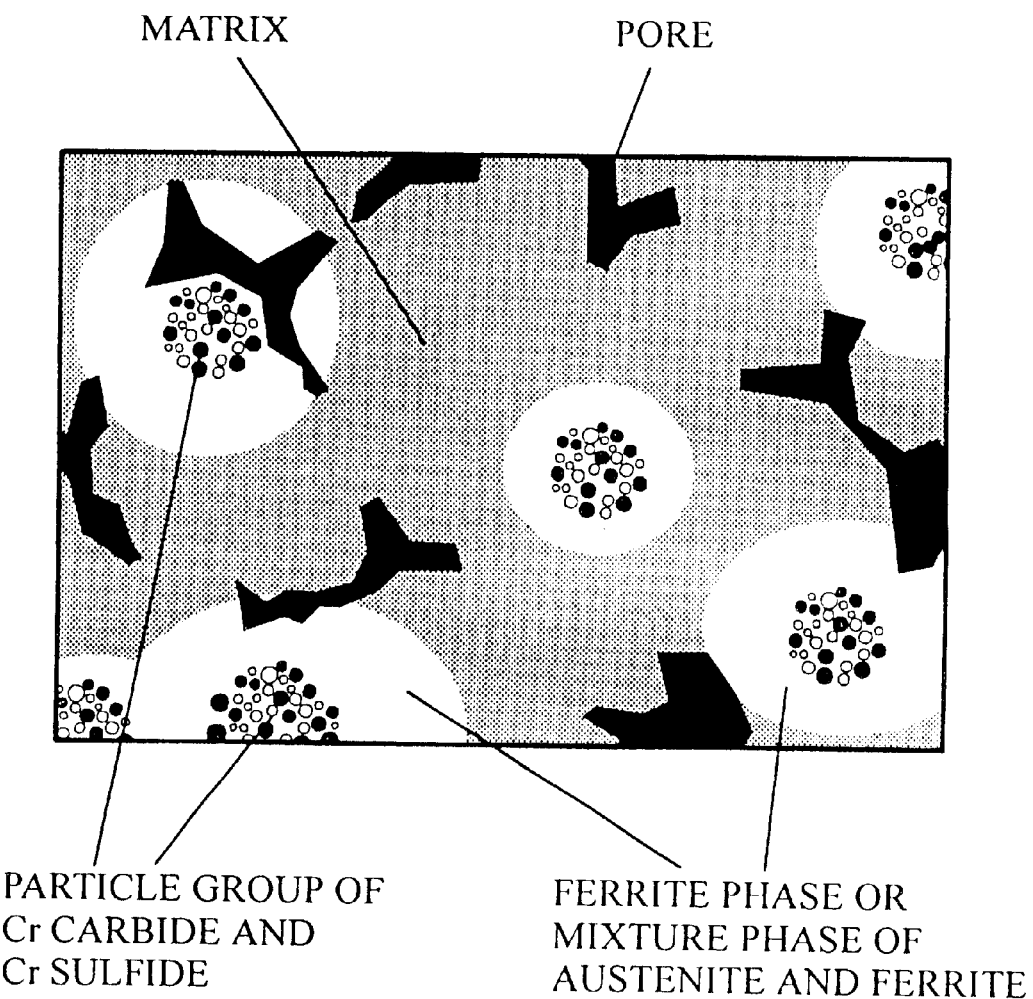
FIG. 1 is a view schematically showing the metallographic structure of a sintered alloy having superb wear resistance according to the present invention.
Figure 2:
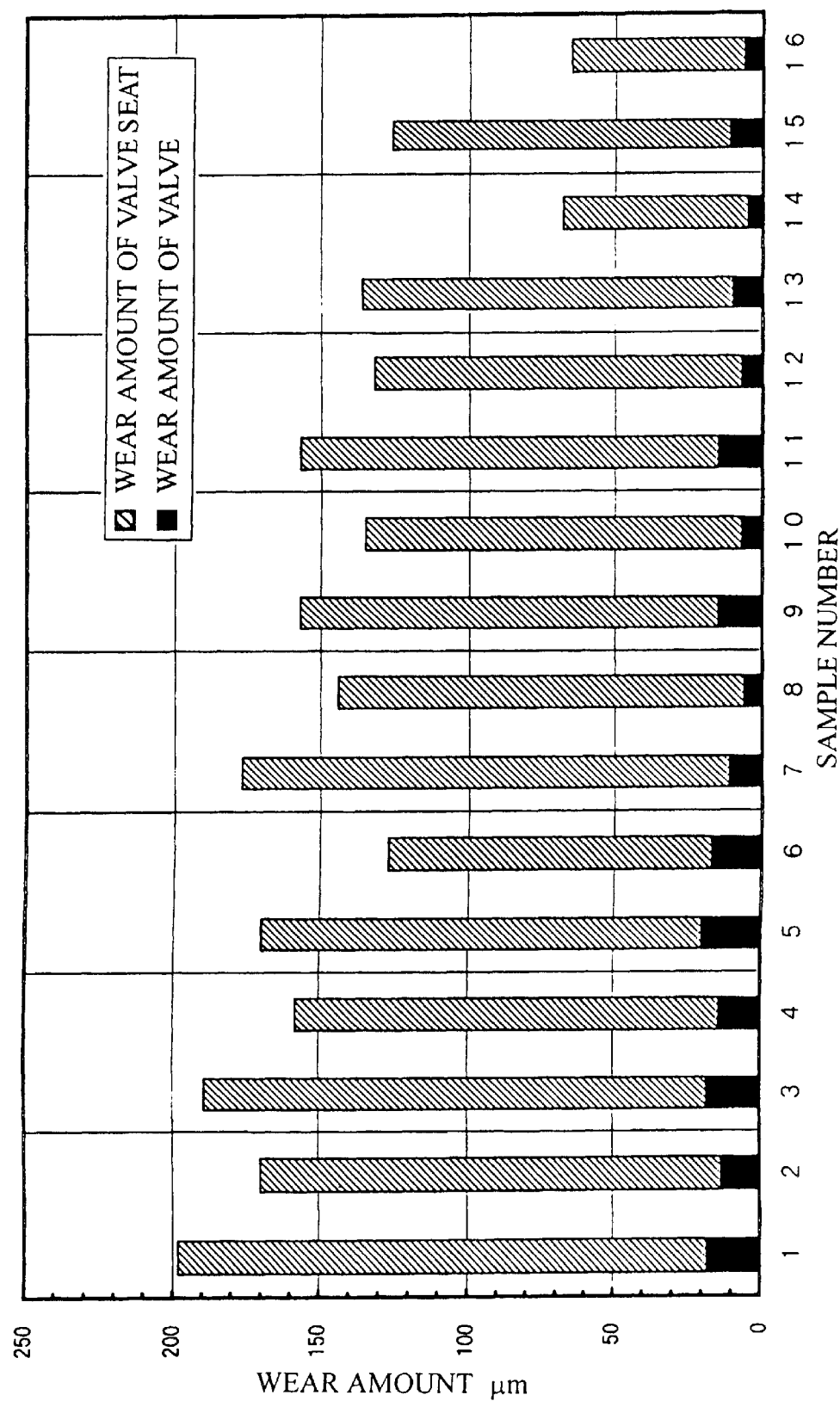
FIG. 2 is a chart showing the wear amount of Sample Nos. 1 to 16.
Figure 3:
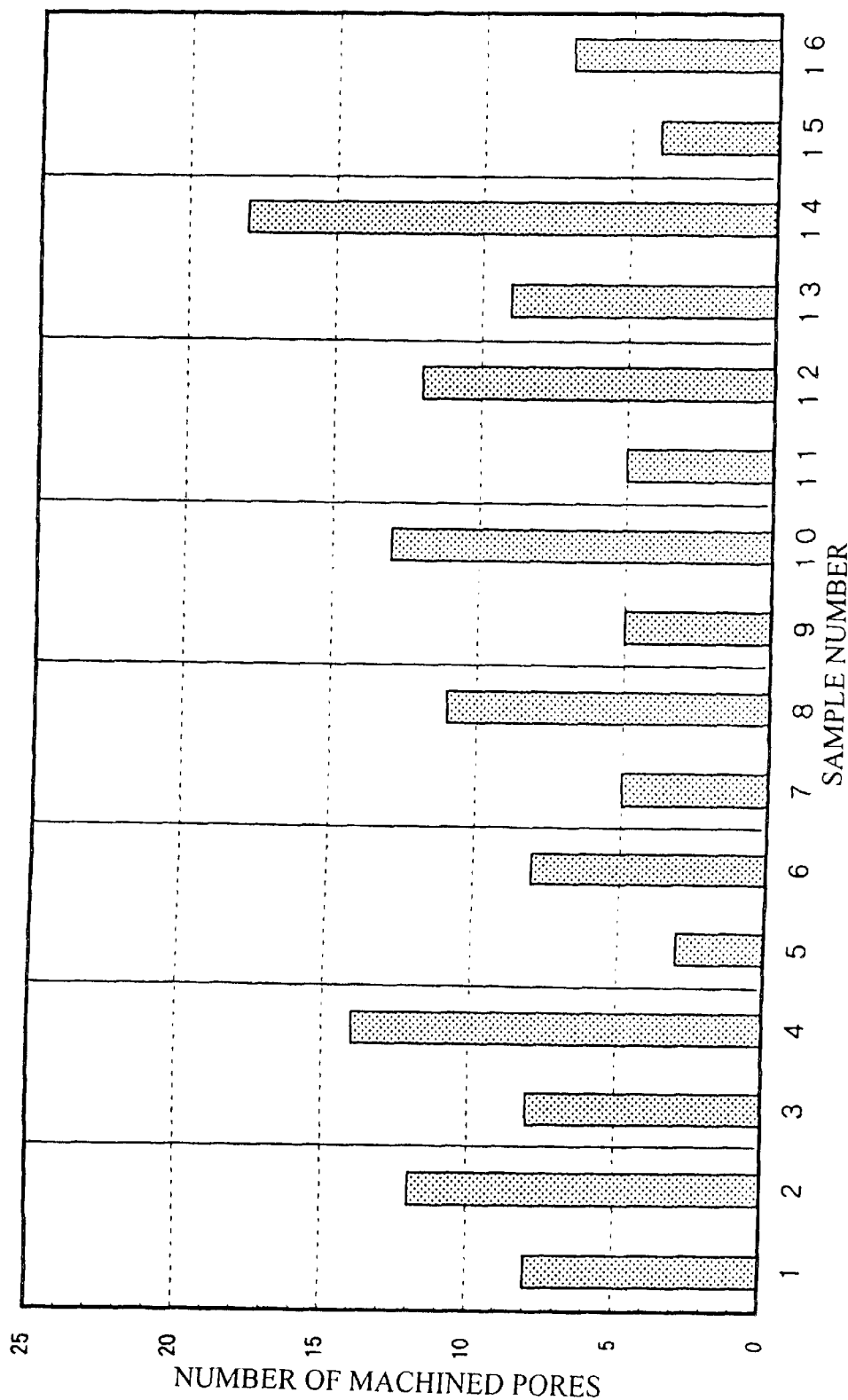
FIG. 3 is a chart showing the number of machined pores of Sample Nos. 1 to 16.

The embodiment(s) of the present invention will now be described hereinafter.

1. First Embodiment

Evaluation Test 1

A to E alloy powders, an Fe powder, a Ni powder, a graphite powder, a particle group forming powder F, a particle group forming powder G and a sulfide powder shown in Table 1 were prepared. The C alloy powder for forming a matrix is a partly diffused powder in which Ni and Mo are bonded to Fe powder by partial diffusing. The E alloy powder is a partial diffused powder in which Ni is bonded to Fe—Mo pre-alloyed powder by partial diffusing. The others of A, B, D, F and G powders are pre-alloyed powders. These powders were mixed together at the mixing ratio shown in Table 2 and Table 3, they were compacted under the pressure of 6.5 ton/cm² to obtain 30-mm-outer diameter, 25-mm inner diameter and 10-mm thickness samples having a shape of a valve sheet. Then, they were sintered for sixty (60) minutes at a temperature of 1180° C. in a dissociated ammonia gas. As a result, alloys having the chemical compositions shown in Table 4 (Sample Nos. 1 to 54) were obtained. The samples of the invention are samples that are added with sulfide powders shown in Table 2 and Table 3, the others are comparative samples.

TABLE 1

| | Powder Composition wt. % | | | | | | | | | | | |
|---|---|---|---|---|---|---|---|---|---|---|---|---|
| | Fe | Ni | Cr | Co | Mo | V | Si | W | Cu | S | C | Note |
| A Alloy Powder | Balance | | | 6.50 | 1.50 | | | | | | | ① |
| B Alloy Powder | Balance | | 3.00 | | 1.00 | 0.50 | | | | | | ① |
| C Alloy Powder | Balance | 4.00 | | | 0.50 | | | | 1.50 | | | ② |
| D Alloy Powder | Balance | 2.00 | | | 0.50 | | | | | | | ① |
| E Alloy Powder | Balance | 2.00 | | | 1.50 | | | | | | | ③ |
| F Alloy Powder | | 8.00 | Balance | | 28.00 | | 2.50 | | | | | ① |
| G Alloy Powder | | | | | | | | | | | | |
| G1 | Balance | | 3.00 | | | | | | | | 1.40 | ① |
| G2 | Balance | | 4.00 | | | | | | | | 1.40 | ① |
| G3 | Balance | | 10.00 | | | | | | | | 1.40 | ① |
| G4 | Balance | | 12.00 | | | | | | | | 1.40 | ① |
| G5 | Balance | | 12.00 | | 1.00 | 0.50 | | | | | 1.40 | ① |
| G6 | Balance | | 15.00 | | | | | | | | 1.40 | ① |
| G7 | Balance | | 20.00 | | | | | | | | 1.40 | ① |
| G8 | Balance | | 25.00 | | | | | | | | 1.40 | ① |
| G9 | Balance | | 27.00 | | | | | | | | 1.40 | ① |
| G10 | Balance | | 15.00 | | 1.00 | | | | | | 1.40 | ① |
| G11 | Balance | | 15.00 | | | 0.50 | | | | | 1.40 | ① |
| G12 | Balance | | 15.00 | | | | | 2.00 | | | 1.40 | ① |
| G13 | Balance | | 15.00 | | 1.00 | 0.50 | | | | | 1.40 | ① |
| G14 | Balance | | 15.00 | | 1.00 | | | 2.00 | | | 1.40 | ① |
| G15 | Balance | | 15.00 | | | 0.50 | | 2.00 | | | 1.40 | ① |
| G16 | Balance | | 15.00 | | 1.00 | 0.50 | | 2.00 | | | 1.40 | ① |
| Sulfide Powder | | | | | | | | | | | | |
| FeS Powder | Balance | | | | | | | | | 36.50 | | |
| $MoS_2$ powder | | | | | Balance | | | | | 40.00 | | |
| $WS_2$ Powder | | | | | | | | Balance | | 25.90 | | |
| CuS Powder | | | | | | | | | Balance | 33.50 | | |

① Pre-alloyed Powder
② Fe Powder/Ni, Mo Partial Diffused Powder
③ Fe - Mo Pre-alloyed Powder/Ni Partial Diffused Powder

TABLE 2

| Sample No. | A Alloy Powder | B Alloy Powder | C Alloy Powder | D Alloy Powder | E Alloy Powder | Fe Powder | Ni Powder | F Alloy Powder | G Alloy Powder | | Sulfide Powder | | | | Graphite Powder |
|---|---|---|---|---|---|---|---|---|---|---|---|---|---|---|---|
| | | | | | | | | | | Powder No. | FeS Powder | $MoS_2$ Powder | $WS_2$ Powder | CuS Powder | |
| 1 | 98.60 | | | | | | | | | | | | | | 1.40 |
| 2 | 81.10 | | | | | | | | 15.00 | G5 | 2.50 | | | | 1.40 |
| 3 | 49.30 | 49.30 | | | | | | | | | | | | | 1.40 |
| 4 | 40.55 | 40.55 | | | | | | | 15.00 | G5 | 2.50 | | | | 1.40 |
| 5 | 83.90 | | | | | | | 15.00 | | | | | | | 1.10 |
| 6 | 66.40 | | | | | | | 15.00 | 15.00 | G5 | 2.50 | | | | 1.10 |
| 7 | | 89.00 | | | | | | | 10.00 | G4 | | | | | 1.00 |
| 8 | | 86.50 | | | | | | | 10.00 | G4 | 2.50 | | | | 1.00 |
| 9 | | | 89.00 | | | | | | 10.00 | G5 | | | | | 1.00 |
| 10 | | | 86.50 | | | | | | 10.00 | G5 | 2.50 | | | | 1.00 |
| 11 | | | | | 89.00 | | | | 10.00 | G5 | | | | | 1.00 |
| 12 | | | | | 86.50 | | | | 10.00 | G5 | 2.50 | | | | 1.00 |
| 13 | 34.30 | 34.30 | | | | | | 15.00 | 15.00 | G5 | | | | | 1.40 |
| 14 | 33.05 | 33.05 | | | | | | 15.00 | 15.00 | G5 | 2.50 | | | | 1.40 |
| 15 | | | | | | 63.60 | 10.00 | | 25.00 | G6 | | | | | 1.40 |
| 16 | | | | | | 61.10 | 10.00 | | 25.00 | G6 | 2.50 | | | | 1.40 |
| 17 | | | 88.45 | | | | | | 10.00 | G4 | 0.55 | | | | 1.00 |
| 18 | | | 88.18 | | | | | | 10.00 | G4 | 0.82 | | | | 1.00 |
| 19 | | | 84.89 | | | | | | 10.00 | G4 | 4.11 | | | | 1.00 |
| 20 | | | 84.62 | | | | | | 10.00 | G4 | 4.38 | | | | 1.00 |
| 21 | | | 88.50 | | | | | | 10.00 | G4 | | 0.50 | | | 1.00 |
| 22 | | | 88.25 | | | | | | 10.00 | G4 | | 0.75 | | | 1.00 |
| 23 | | | 86.75 | | | | | | 10.00 | G4 | | 2.25 | | | 1.00 |
| 24 | | | 85.25 | | | | | | 10.00 | G4 | | 3.75 | | | 1.00 |
| 25 | | | 85.00 | | | | | | 10.00 | G4 | | 4.00 | | | 1.00 |
| 26 | | | 88.22 | | | | | | 10.00 | G4 | | | | 0.78 | 1.00 |
| 27 | | | 87.84 | | | | | | 10.00 | G4 | | | | 1.16 | 1.00 |

TABLE 3

| Sample No. | A Alloy Powder | B Alloy Powder | C Alloy Powder | D Alloy Powder | E Alloy Powder | Fe Powder | Ni Powder | F Alloy Powder | G Alloy Powder | | Sulfide Powder | | | | Graphite Powder |
|---|---|---|---|---|---|---|---|---|---|---|---|---|---|---|---|
| | | | | | | | | | | Powder No. | FeS Powder | $MoS_2$ Powder | $WS_2$ Powder | CuS Powder | |
| 28 | | | 85.53 | | | | | | 10.00 | G4 | | | 3.47 | | 1.00 |
| 29 | | | 83.21 | | | | | | 10.00 | G4 | | | 5.79 | | 1.00 |
| 30 | | | 82.82 | | | | | | 10.00 | G4 | | | 6.18 | | 1.00 |
| 31 | | | 88.40 | | | | | | 10.00 | G4 | | | | 0.60 | 1.00 |
| 32 | | | 88.10 | | | | | | 10.00 | G4 | | | | 0.90 | 1.00 |
| 33 | | | 86.30 | | | | | | 10.00 | G4 | | | | 2.70 | 1.00 |
| 34 | | | 84.52 | | | | | | 10.00 | G4 | | | | 4.48 | 1.00 |
| 35 | | | 84.22 | | | | | | 10.00 | G4 | | | | 4.78 | 1.00 |
| 36 | | | | 93.50 | | | | | 3.00 | G5 | 2.50 | | | | 1.00 |
| 37 | | | | 91.50 | | | | | 5.00 | G5 | 2.50 | | | | 1.00 |
| 38 | | | | 81.50 | | | | | 15.00 | G5 | 2.50 | | | | 1.00 |
| 39 | | | | 76.50 | | | | | 20.00 | G5 | 2.50 | | | | 1.00 |
| 40 | | | | 71.50 | | | | | 25.00 | G5 | 2.50 | | | | 1.00 |
| 41 | | | | 68.50 | | | | | 28.00 | G5 | 2.50 | | | | 1.00 |
| 42 | | | | | | 61.10 | 10.00 | | 25.00 | G1 | 2.50 | | | | 1.40 |
| 43 | | | | | | 61.10 | 10.00 | | 25.00 | G2 | 2.50 | | | | 1.40 |
| 44 | | | | | | 61.10 | 10.00 | | 25.00 | G3 | 2.50 | | | | 1.40 |
| 45 | | | | | | 61.10 | 10.00 | | 25.00 | G7 | 2.50 | | | | 1.40 |
| 46 | | | | | | 61.10 | 10.00 | | 25.00 | G8 | 2.50 | | | | 1.40 |
| 47 | | | | | | 61.10 | 10.00 | | 25.00 | G9 | 2.50 | | | | 1.40 |
| 48 | | | | | | 61.10 | 10.00 | | 25.00 | G10 | 2.50 | | | | 1.40 |
| 49 | | | | | | 61.10 | 10.00 | | 25.00 | G11 | 2.50 | | | | 1.40 |
| 50 | | | | | | 61.10 | 10.00 | | 25.00 | G12 | 2.50 | | | | 1.40 |
| 51 | | | | | | 61.10 | 10.00 | | 25.00 | G13 | 2.50 | | | | 1.40 |
| 52 | | | | | | 61.10 | 10.00 | | 25.00 | G14 | 2.50 | | | | 1.40 |
| 53 | | | | | | 61.10 | 10.00 | | 25.00 | G15 | 2.50 | | | | 1.40 |
| 54 | | | | | | 61.10 | 10.00 | | 25.00 | G16 | 2.50 | | | | 1.40 |

TABLE 4

| Sample No. | Fe | Ni | Cr | Co | Mo | V | Si | W | Cu | S | C | Ratio of Particle Group % |
|---|---|---|---|---|---|---|---|---|---|---|---|---|
| 1 | 90.71 | | | 6.41 | 1.48 | | | | | | 1.40 | 0 |
| 2 | 88.96 | | 1.80 | 5.27 | 1.37 | 0.08 | | | | 0.91 | 1.61 | 14 |
| 3 | 92.44 | | 1.48 | 3.20 | 1.23 | 0.25 | | | | | 1.40 | 0 |
| 4 | 90.38 | | 3.02 | 2.64 | 1.16 | 0.28 | | | | 0.91 | 1.61 | 14 |
| 5 | 77.19 | | 1.20 | 14.68 | 5.46 | | 0.38 | | | | 1.10 | 0 |
| 6 | 75.44 | | 3.00 | 13.54 | 5.35 | 0.08 | 0.38 | | | 0.91 | 1.31 | 14 |
| 7 | 92.32 | 3.56 | 1.20 | | 0.45 | | | | 1.34 | | 1.14 | 9 |
| 8 | 91.56 | 3.46 | 1.20 | | 0.43 | | | | 1.30 | 0.91 | 1.14 | 9 |
| 9 | 95.43 | 1.78 | 1.20 | | 0.55 | 0.05 | | | | | 1.00 | 9 |
| 10 | 95.49 | 1.73 | 1.20 | | 0.53 | 0.05 | | | | | 1.00 | 9 |
| 11 | 94.40 | 1.78 | 1.20 | | 1.44 | 0.05 | | | | | 1.14 | 9 |
| 12 | 93.57 | 1.73 | 1.20 | | 1.40 | 0.05 | | | | 0.91 | 1.14 | 9 |
| 13 | 77.08 | | 4.03 | 11.45 | 5.21 | 0.25 | 0.38 | | | | 1.61 | 14 |
| 14 | 76.32 | | 3.99 | 11.37 | 5.18 | 0.24 | 0.38 | | | 0.91 | 1.61 | 14 |
| 15 | 84.50 | 10.00 | 3.75 | | | | | | | | 1.75 | 25 |
| 16 | 83.59 | 10.00 | 3.75 | | | | | | | 0.91 | 1.75 | 25 |
| 17 | 92.15 | 3.54 | 1.20 | | 0.44 | | | | 1.33 | 0.20 | 1.14 | 9 |
| 18 | 92.07 | 3.53 | 1.20 | | 0.44 | | | | 1.32 | 0.30 | 1.14 | 9 |
| 19 | 91.07 | 3.40 | 1.20 | | 0.42 | | | | 1.27 | 1.50 | 1.14 | 9 |
| 20 | 90.98 | 3.38 | 1.20 | | 0.42 | | | | 1.27 | 1.60 | 1.14 | 9 |
| 21 | 91.85 | 3.54 | 1.20 | | 0.74 | | | | 1.33 | 0.20 | 1.14 | 9 |
| 22 | 91.62 | 3.53 | 1.20 | | 0.89 | | | | 1.32 | 0.30 | 1.14 | 9 |
| 23 | 90.21 | 3.47 | 1.20 | | 1.78 | | | | 1.30 | 0.90 | 1.14 | 9 |
| 24 | 88.80 | 3.41 | 1.20 | | 2.68 | | | | 1.28 | 1.50 | 1.14 | 9 |
| 25 | 88.56 | 3.40 | 1.20 | | 2.83 | | | | 1.28 | 1.60 | 1.14 | 9 |
| 26 | 91.59 | 3.53 | 1.20 | | 0.44 | | | 0.58 | 1.32 | 0.20 | 1.14 | 9 |
| 27 | 91.23 | 3.51 | 1.20 | | 0.44 | | | 0.86 | 1.32 | 0.30 | 1.14 | 9 |
| 28 | 89.06 | 3.42 | 1.20 | | 0.43 | | | 2.57 | 1.28 | 0.90 | 1.14 | 9 |
| 29 | 86.88 | 3.33 | 1.20 | | 0.42 | | | 4.29 | 1.25 | 1.50 | 1.14 | 9 |
| 30 | 86.51 | 3.31 | 1.20 | | 0.41 | | | 4.58 | 1.24 | 1.60 | 1.14 | 9 |
| 31 | 91.76 | 3.54 | 1.20 | | 0.44 | | | | 1.73 | 0.20 | 1.14 | 9 |
| 32 | 91.47 | 3.52 | 1.20 | | 0.44 | | | | 1.92 | 0.30 | 1.14 | 9 |
| 33 | 89.78 | 3.45 | 1.20 | | 0.43 | | | | 3.09 | 0.90 | 1.14 | 9 |
| 34 | 88.11 | 3.38 | 1.20 | | 0.42 | | | | 4.25 | 1.50 | 1.14 | 9 |
| 35 | 87.83 | 3.37 | 1.20 | | 0.42 | | | | 4.44 | 1.60 | 1.14 | 9 |
| 36 | 95.30 | 1.87 | 0.36 | | 0.50 | 0.02 | | | | 0.91 | 1.04 | 1 |
| 37 | 95.06 | 1.83 | 0.60 | | 0.51 | 0.03 | | | | 0.91 | 1.07 | 3 |
| 38 | 93.82 | 1.63 | 1.80 | | 0.56 | 0.08 | | | | 0.91 | 1.21 | 14 |
| 39 | 93.20 | 1.53 | 2.40 | | 0.58 | 0.10 | | | | 0.91 | 1.28 | 19 |
| 40 | 92.58 | 1.43 | 3.00 | | 0.61 | 0.13 | | | | 0.91 | 1.35 | 25 |
| 41 | 92.20 | 1.37 | 3.36 | | 0.62 | 0.14 | | | | 0.91 | 1.39 | 28 |
| 42 | 86.59 | 10.00 | 0.75 | | | | | | | 0.91 | 1.75 | 20 |
| 43 | 86.34 | 10.00 | 1.00 | | | | | | | 0.91 | 1.75 | 23 |
| 44 | 84.84 | 10.00 | 2.50 | | | | | | | 0.91 | 1.75 | 24 |
| 45 | 82.34 | 10.00 | 5.00 | | | | | | | 0.91 | 1.75 | 25 |
| 46 | 81.09 | 10.00 | 6.25 | | | | | | | 0.91 | 1.75 | 25 |
| 47 | 80.59 | 10.00 | 6.75 | | | | | | | 0.91 | 1.75 | 25 |
| 48 | 83.34 | 10.00 | 3.75 | | 0.25 | | | | | 0.91 | 1.75 | 25 |
| 49 | 83.46 | 10.00 | 3.75 | | | 0.13 | | | | 0.91 | 1.75 | 25 |
| 50 | 83.09 | 10.00 | 3.75 | | | | | 0.50 | | 0.91 | 1.75 | 25 |
| 51 | 83.21 | 10.00 | 3.75 | | 0.25 | 0.13 | | | | 0.91 | 1.75 | 25 |
| 52 | 82.84 | 10.00 | 3.75 | | 0.25 | | | 0.50 | | 0.91 | 1.75 | 25 |
| 53 | 82.96 | 10.00 | 3.75 | | | 0.13 | | 0.50 | | 0.91 | 1.75 | 25 |
| 54 | 82.71 | 10.00 | 3.75 | | 0.25 | 0.13 | | 0.50 | | 0.91 | 1.75 | 25 |

The measurements of the simplified wear tests and machinability tests were carried out for those alloys. The results are shown in Table 5 and in FIGS. 2 through 12. The simplified wear test is a test of the type that a sintered alloy machined into a valve seat configuration is press-fitted in an aluminum alloy housing, and the valve is caused to make an up-and-down motion like a piston by an eccentric cam rotated by a motor, such that the face of the valve and the face of the valve seat are repeatedly hit each other. The temperature setting in this test was carried out by heating the bevel of the valve with a burner in order to simply create an environment resembling the inside of the housing of the engine. In this test, it was set such that the rotating speed of the eccentric cam was 2700 rpm, the test temperature was 250° C. at the valve seat portion, and the repeat time was fifteen (15) hours. The wear amounts of the valve seat and the valve after the test were measured and evaluated. The machinability test is a test where a sample is drilled with a prescribed load using a bench drill and the number of the able machining processes are compared. In the present test, the load was set to 1.0 kg, the drill used was a φ3 cemented carbide drill. The thickness of the sample was set to 3 mm.

TABLE 5

| Sample No. | Wear Amount μm Valve Seat | Valve | Total | Number of Machined Pores | Note |
|---|---|---|---|---|---|
| 1 | 180 | 18 | 198 | 8 | Alloy of Japanese Patent Examined Publication No. 36242/80 |
| 2 | 157 | 13 | 170 | 12 | Alloy Matrix of Japanese Patent Examined Publication No. 36242/80 |
| 3 | 171 | 18 | 189 | 8 | Alloy of Japanese Patent Examined Publication No. 56547/82 |
| 4 | 144 | 14 | 158 | 14 | Alloy Matrix of Japanese Patent Examined Publication No. 56547/82 |
| 5 | 150 | 20 | 170 | 3 | Alloy of Japanese Patent Examined Publication No. 55593/93 |
| 6 | 110 | 17 | 127 | 8 | Alloy Matrix of Japanese Patent Examined Publication No. 55593/93 |
| 7 | 166 | 11 | 177 | 5 | Alloy of Japanese Patent Unexamined Publication No. 195012/97 |
| 8 | 138 | 6 | 144 | 11 | Alloy Matrix of Japanese Patent Unexamined Publication No. 195012/97 |
| 9 | 142 | 15 | 157 | 5 | Alloy of Japanese Patent Unexamined Publication No. 195013/97 |
| 10 | 128 | 7 | 135 | 13 | Alloy Matrix of Japanese Patent Unexamined Publication No. 195013/97 |
| 11 | 142 | 15 | 157 | 5 | Alloy of Japanese Patent Unexamined Publication No. 195014/97 |
| 12 | 125 | 7 | 132 | 12 | Alloy Matrix of Japanese Patent Unexamined Publication No. 195014/97 |
| 13 | 126 | 10 | 136 | 9 | Alloy of Japanese Patent Application No. 34449/97 |
| 14 | 63 | 5 | 68 | 18 | Alloy Matrix of Japanese Patent Application No, 34449/97 |
| 15 | 115 | 11 | 126 | 4 | Alloy of Japanese Patent Application No. 141976/98 |
| 16 | 59 | 6 | 65 | 7 | Alloy Matrix of Japanese Patent Application No. 141976/98 |
| 17 | 158 | 8 | 166 | 7 | Alloy Matrix of Japanese Patent Application No. 34449/97 |
| 18 | 140 | 8 | 148 | 8 | Alloy Matrix of Japanese Patent Application No. 34449/97 |
| 19 | 134 | 11 | 145 | 19 | Alloy Matrix of Japanese Patent Application No. 34449/97 |
| 20 | 145 | 28 | 173 | 21 | Alloy Matrix of Japanese Patent Application No. 34449/97 |
| 21 | 152 | 8 | 160 | 6 | Alloy Matrix of Japanese Patent Application No. 34449/97 |
| 22 | 134 | 8 | 142 | 7 | Alloy Matrix of Japanese Patent Application No. 34449/97 |
| 23 | 131 | 9 | 140 | 10 | Alloy Matrix of Japanese Patent Application No. 34449/97 |
| 24 | 123 | 18 | 141 | 16 | Alloy Matrix of Japanese Patent Application No. 34449/97 |
| 25 | 148 | 54 | 202 | 19 | Alloy Matrix of Japanese Patent Application No. 34449/97 |
| 26 | 153 | 8 | 161 | 6 | Alloy Matrix of Japanese Patent Application No. 34449/97 |
| 27 | 134 | 8 | 142 | 7 | Alloy Matrix of Japanese Patent Application No. 34449/97 |
| 28 | 132 | 8 | 140 | 10 | Alloy Matrix of Japanese Patent Application No. 34449/97 |
| 29 | 125 | 13 | 138 | 15 | Alloy Matrix of Japanese Patent Application No. 34449/97 |
| 30 | 153 | 48 | 201 | 17 | Alloy Matrix of Japanese Patent Application No. 34449/97 |
| 31 | 153 | 8 | 161 | 6 | Alloy Matrix of Japanese Patent Application No. 34449/97 |
| 32 | 140 | 7 | 147 | 8 | Alloy Matrix of Japanese Patent Application No. 34449/97 |
| 33 | 135 | 8 | 143 | 11 | Alloy Matrix of Japanese Patent Application No. 34449/97 |
| 34 | 137 | 17 | 154 | 17 | Alloy Matrix of Japanese Patent Application No. 34449/97 |
| 35 | 171 | 51 | 222 | 20 | Alloy Matrix of Japanese Patent Application No. 34449/97 |
| 36 | 141 | 5 | 146 | 16 | Alloy Matrix of Japanese Patent Application No. 34449/97 |
| 37 | 130 | 6 | 136 | 14 | Alloy Matrix of Japanese Patent Application No. 34449/97 |
| 38 | 118 | 10 | 128 | 11 | Alloy Matrix of Japanese Patent Application No. 34449/97 |
| 39 | 112 | 14 | 126 | 10 | Alloy Matrix of Japanese Patent Application No. 34449/97 |
| 40 | 114 | 19 | 133 | 9 | Alloy Matrix of Japanese Patent Application No. 34449/97 |
| 41 | 130 | 49 | 179 | 8 | Alloy Matrix of Japanese Patent Application No. 34449/97 |
| 42 | 123 | 2 | 125 | 11 | Alloy Matrix of Japanese Patent Application No. 141976/98 |
| 43 | 83 | 4 | 87 | 10 | Alloy Matrix of Japanese Patent Application No. 141976/98 |
| 44 | 66 | 5 | 71 | 8 | Alloy Matrix of Japanese Patent Application No. 141976/98 |
| 45 | 60 | 8 | 68 | 7 | Alloy Matrix of Japanese Patent Application No. 141976/98 |
| 46 | 73 | 16 | 89 | 5 | Alloy Matrix of Japanese Patent Application No. 141976/98 |
| 47 | 121 | 51 | 172 | 3 | Alloy Matrix of Japanese Patent Application No. 141976/98 |
| 48 | 43 | 8 | 51 | 6 | Alloy Matrix of Japanese Patent Application No. 141976/98 |
| 49 | 45 | 7 | 52 | 6 | Alloy Matrix of Japanese Patent Application No. 141976/98 |
| 50 | 42 | 9 | 51 | 6 | Alloy Matrix of Japanese Patent Application No. 141976/98 |
| 51 | 36 | 11 | 47 | 5 | Alloy Matrix of Japanese Patent Application No. 141976/98 |
| 52 | 37 | 12 | 49 | 5 | Alloy Matrix of Japanese Patent Application No. 141976/98 |
| 53 | 36 | 12 | 48 | 5 | Alloy Matrix of Japanese Patent Application No. 141976/98 |
| 54 | 31 | 14 | 45 | 5 | Alloy Matrix of Japanese Patent Application No. 141976/98 |

At first, comparing Sample Nos. 1 to 16 in Table 2, Sample Nos. 1, 3, 5, 7, 9, 11, 13 and 15 are conventional sintered alloys. Sample Nos. 2, 4 and 6 are produced by mixing the particle group forming powder G and the sulfide powder to the mixed powder for the conventional sintered alloys. Sample Nos. 8, 10, 12, 14 and 16 are produced by mixing the sulfide powder to the mixed powder for the conventional sintered alloys. Sample Nos. 17 to 54 are examples of the invention. As clearly shown in FIG. 2, in the examples of the invention having particle groups including Cr sulfide by mixing the sulfide powders, it is known that the wear amounts of the valve sheet and the valve are small. As clearly shown in FIG. 3, it is known that, in the invention, the number of machined pores increases and the machinability is improved compared to the comparative examples.

Figure 4:
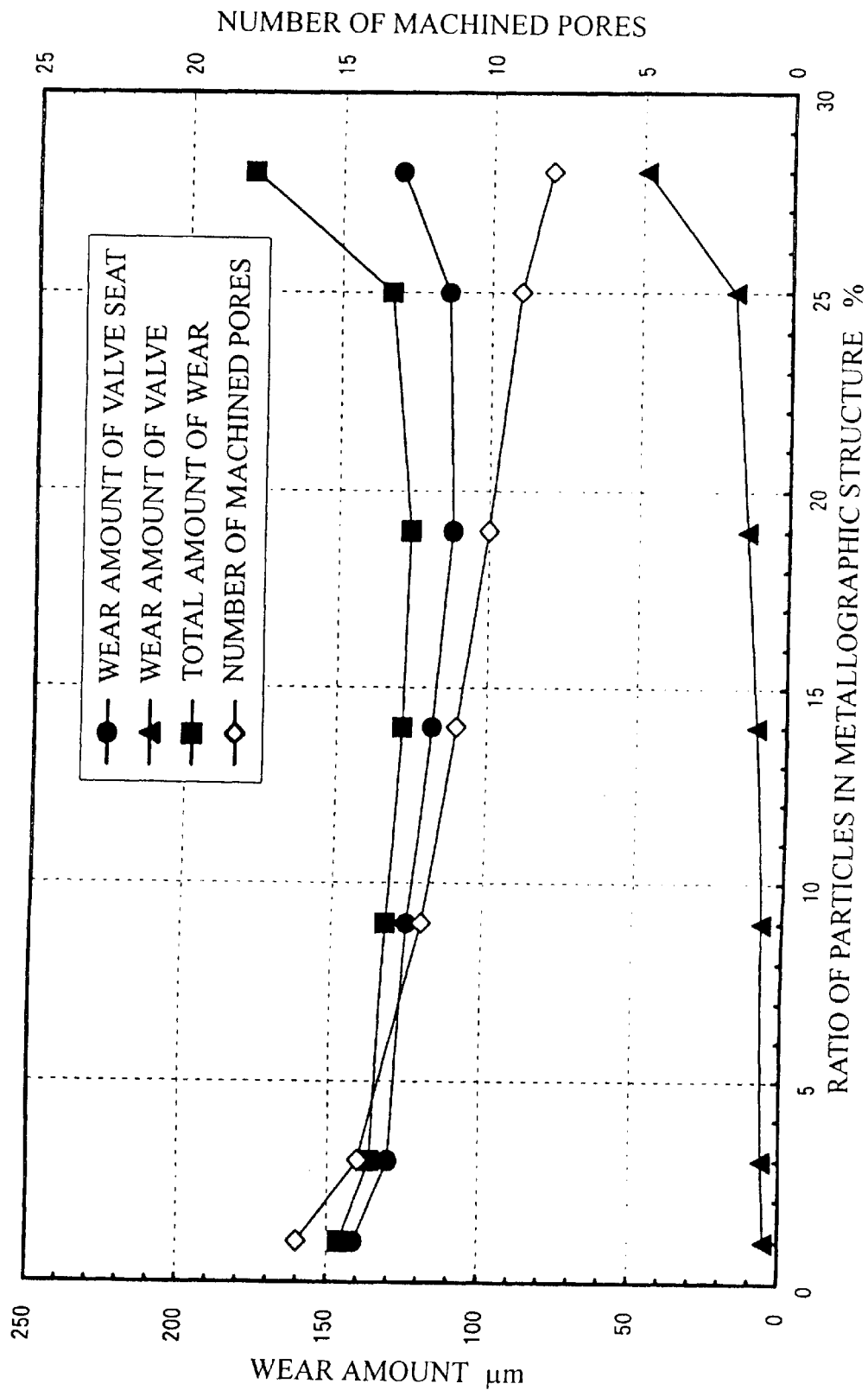
FIG. 4 is a chart showing the relationship between the area ratio of the particle group with respect to the metallographic structure, the wear amount and the number of machined pores.

FIG. 4 shows the relationship between the proportion of the particle group with respect to the metallographic structure and the number of machined pores. As shown in FIG. 4, the hardness increases and the number of machined pores decrease as the area ratio of the particle group increases. However, the wear amount of the valve sheet is small where the area ratio of the particle group is in the range of 3 to 25%. In contrast, when the area ratio exceeds 25%, the valve attackability increases to wear the valve, so that the wear amount of the valve sheet increases.

Figure 5:
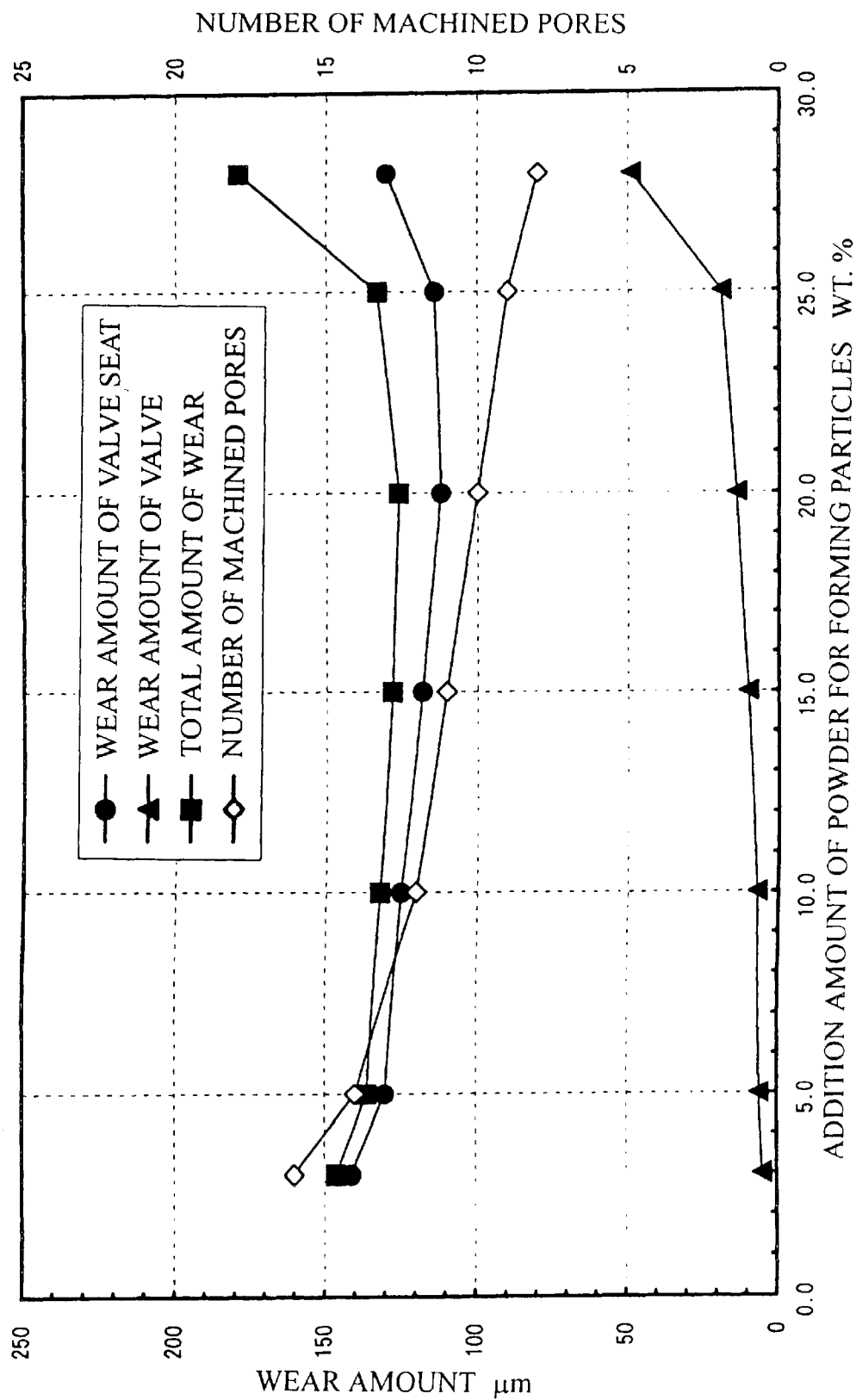
FIG. 5 is a chart showing the relationship between the addition amount of the particle group forming powder, the wear amount and the number of machined pores.

FIG. 5 shows the relationship between the proportion of the particle group forming powder with respect to the mixed powder as a whole, the wear amount and the number of machined pores. As shown in FIG. 5, the hardness of the sintered alloy increases and the number of machined pores decrease as the proportion of the particle group forming powder increases. However, the wear amount of the valve sheet is small where the addition amount of the particle group forming powder is in the range of 5 to 25%. In contrast, when the addition amount of the particle group forming powder exceeds 25%, the valve attackability increases to wear the valve, so that the wear amount of the valve sheet increases.

Figure 6:
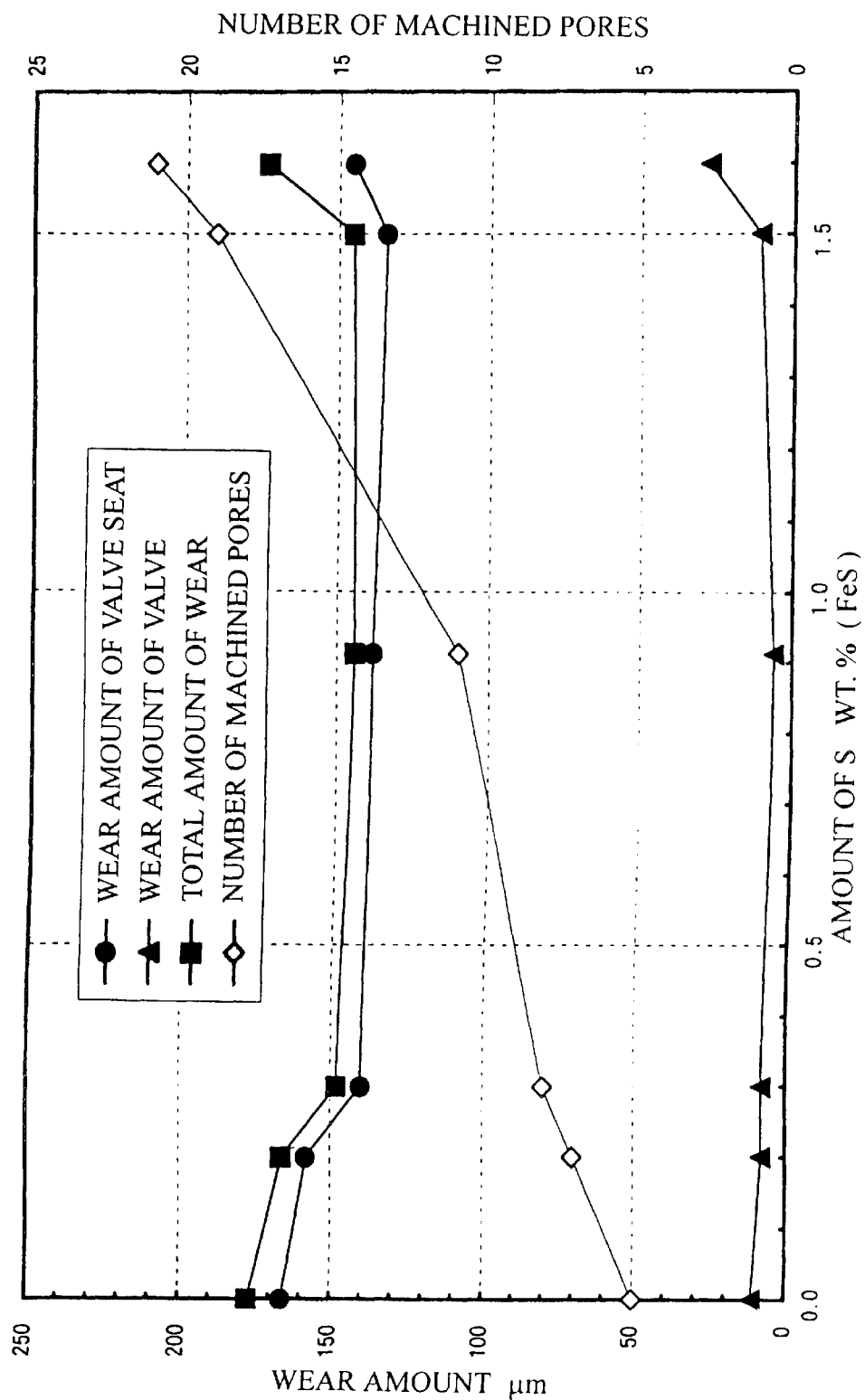
FIG. 6 is a chart showing the relationship between the S contents of the sintered alloys to which a FeS powder is added, the wear amount and the number of machined pores.
Figure 7:
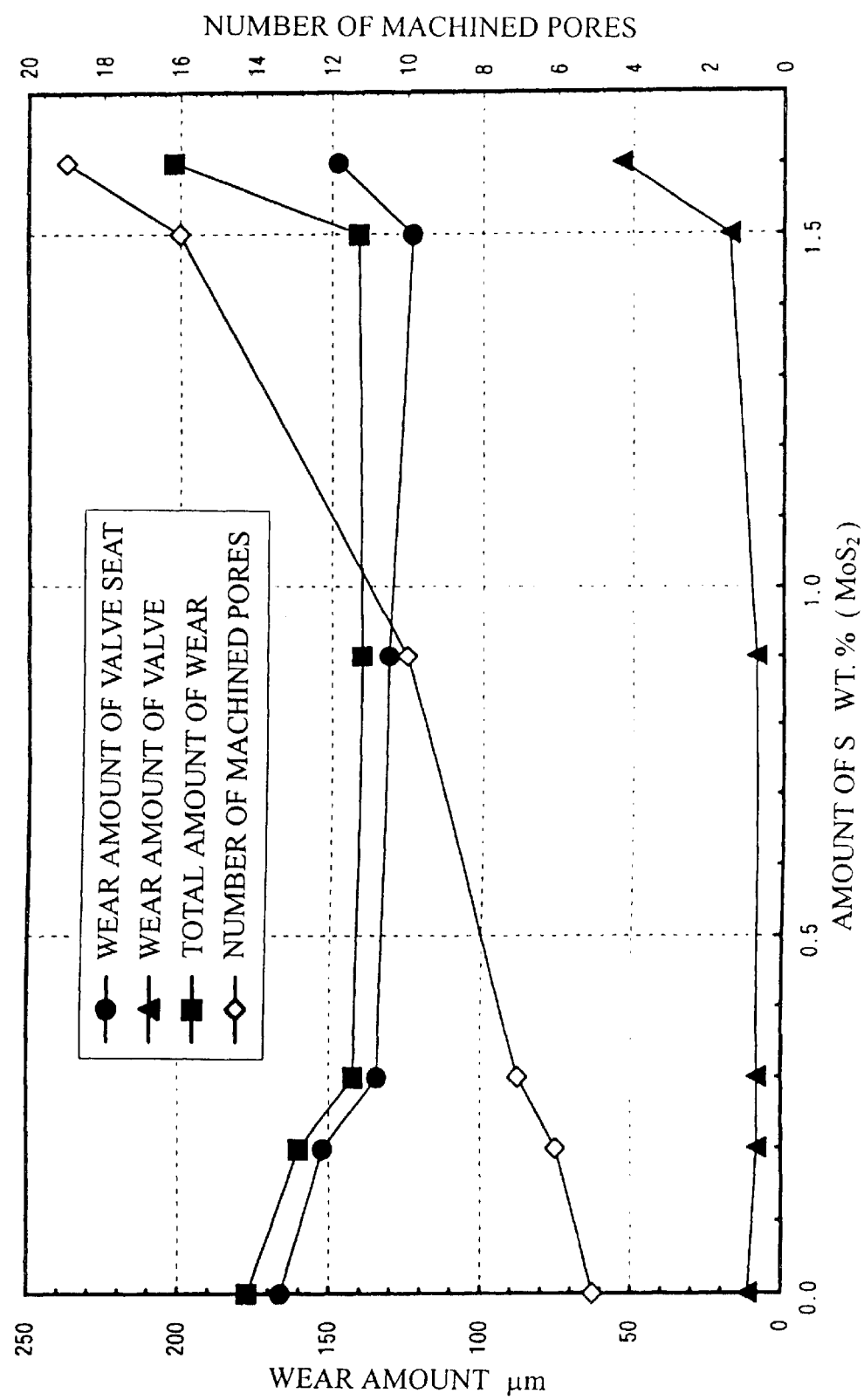
FIG. 7 is a chart showing the relationship between the S contents of the sintered alloys to which a $MoS_2$ powder is added, the wear amount and the number of machined pores.
Figure 8:
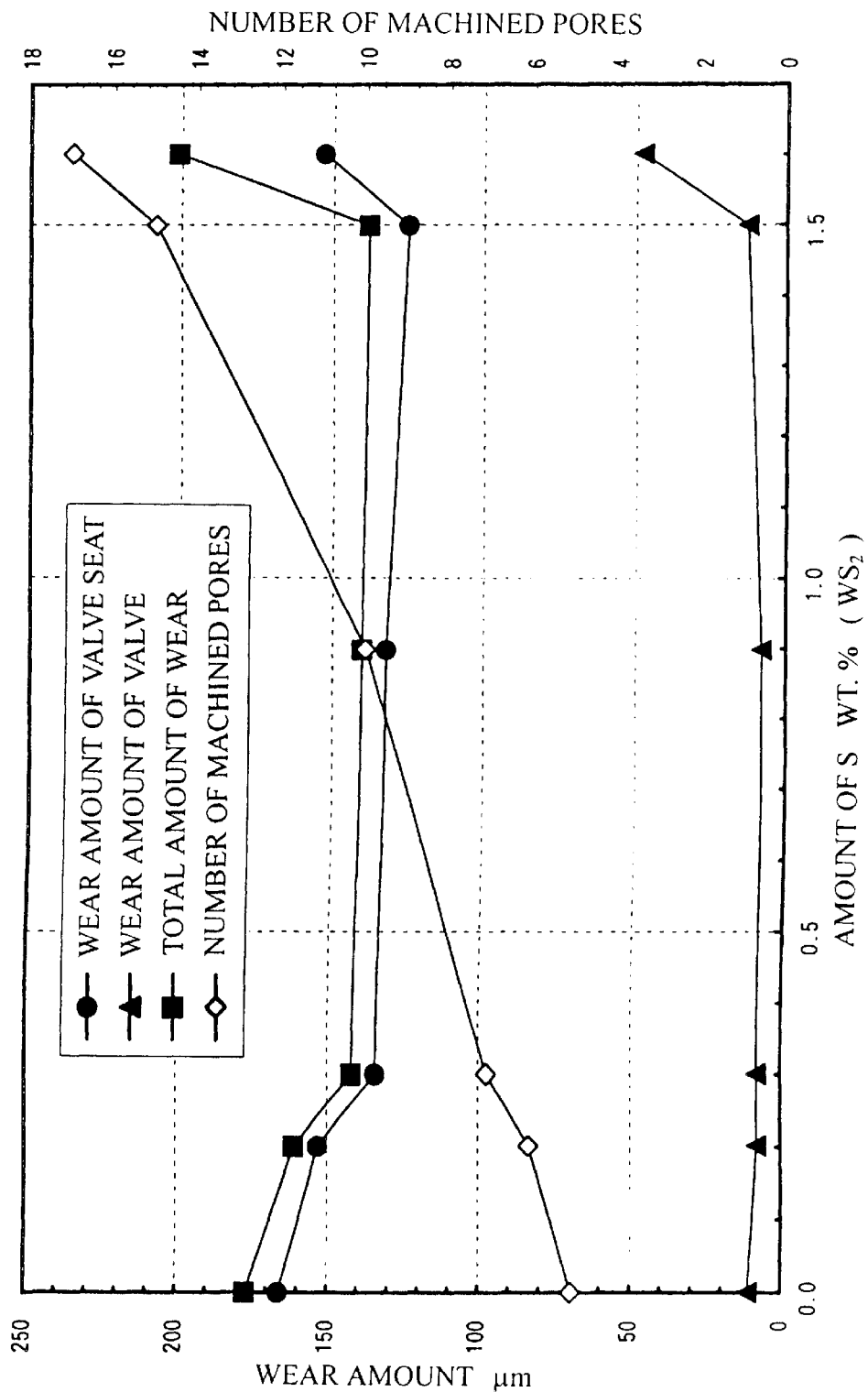
FIG. 8 is a chart showing the relationship between the S contents of the sintered alloys to which a $WS_2$ powder is added, the wear amount and the number of machined pores.
Figure 9:
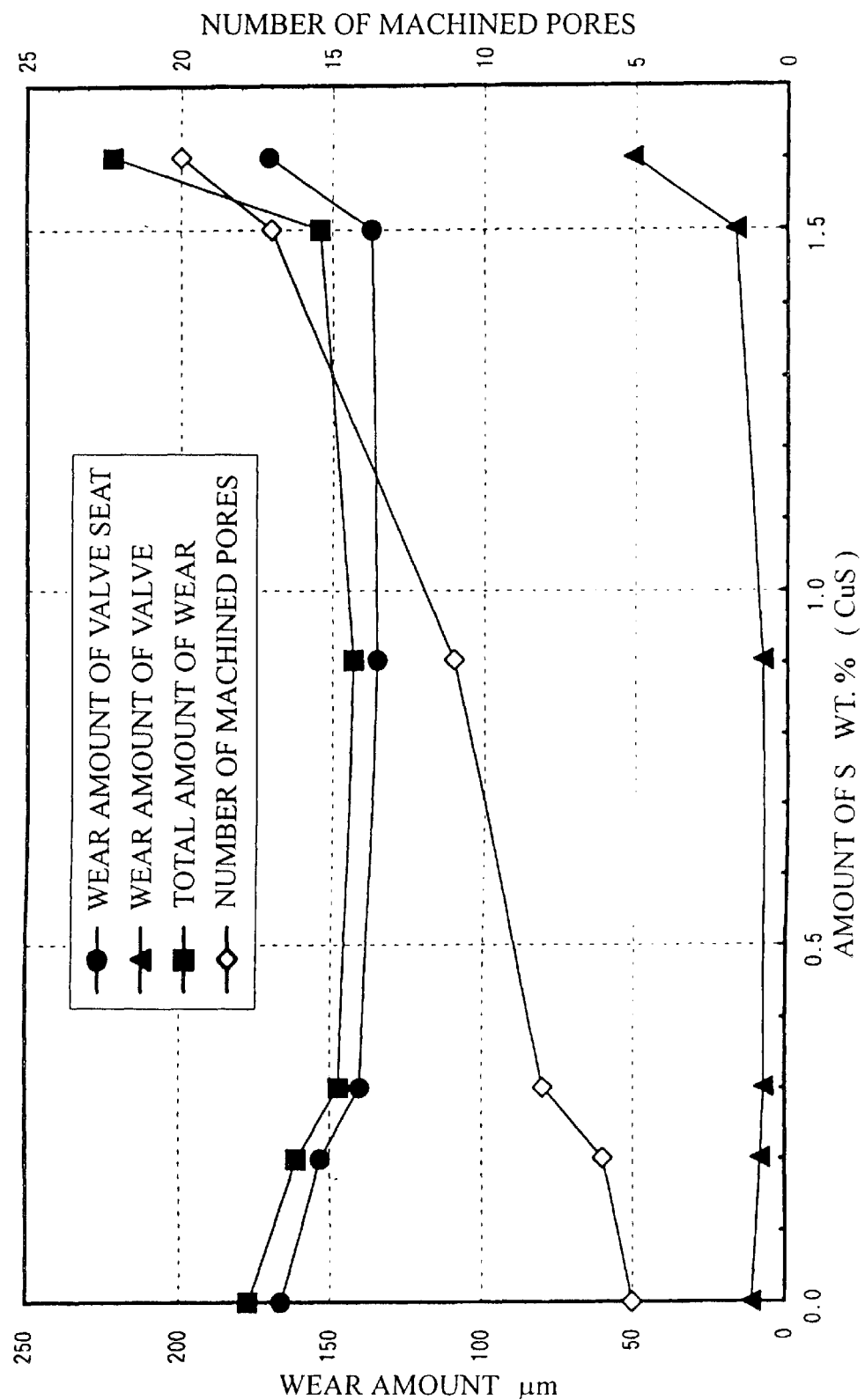
FIG. 9 is a chart showing the relationship between the S contents of the sintered alloys to which a CuS powder is added, the wear amount and the number of machined pores.

FIG. 6 shows the relationship between the S content of the sintered alloy to which the FeS as a sulfide powder is added, the wear amount and the number of machined pores. As shown in FIG. 6, the number of machined pores increases as the S content increases to improve the machinability. The wear amount of the valve sheet is small where the S content is in the range of 0.3 to 1.5% by weight. In contrast, when the S content exceeds 1.5% by weight, the Cr sulfide excessively precipitates to lower the strength, so that the wear amounts of the valve sheet and the valve increase. As shown in FIGS. 7 to 9, in the case using $MoS_2$, $WS_2$ or CuS as a sulfide powder, the same results are obtained.

Figure 10:
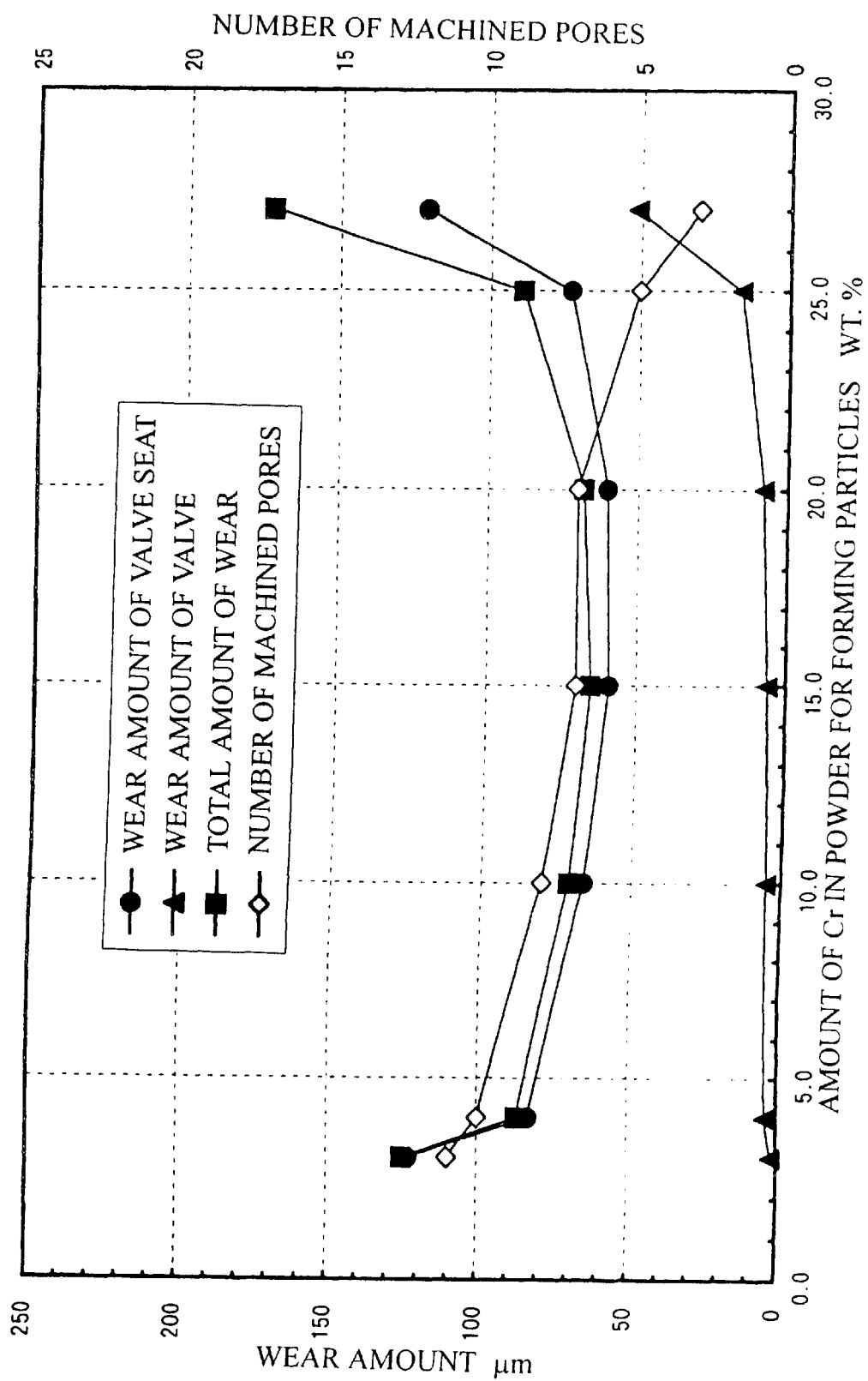
FIG. 10 is a chart showing the relationship between the Cr contents of the particle group forming powder, the wear amount and the number of machined pores.

FIG. 10 shows the relationship between the Cr content of the particle group forming powder, the wear amount and the number of machined pores. As shown in FIG. 10, the number of machined pores decreases as the Cr content increases since the amount of Cr carbide increase. The wear amount of the valve sheet is small where the Cr content is in the range of 4 to 25% by weight. In contrast, when the Cr content exceeds 25% by weight, the hardness of the powder increases and the compactability is deteriorated. As a result, the strength of the sintered alloy decreases, and excessively precipitated Cr carbide promotes the wear of the counterpart component element, so that the wear amounts of the valve sheet and the valve increase.

Figure 11:
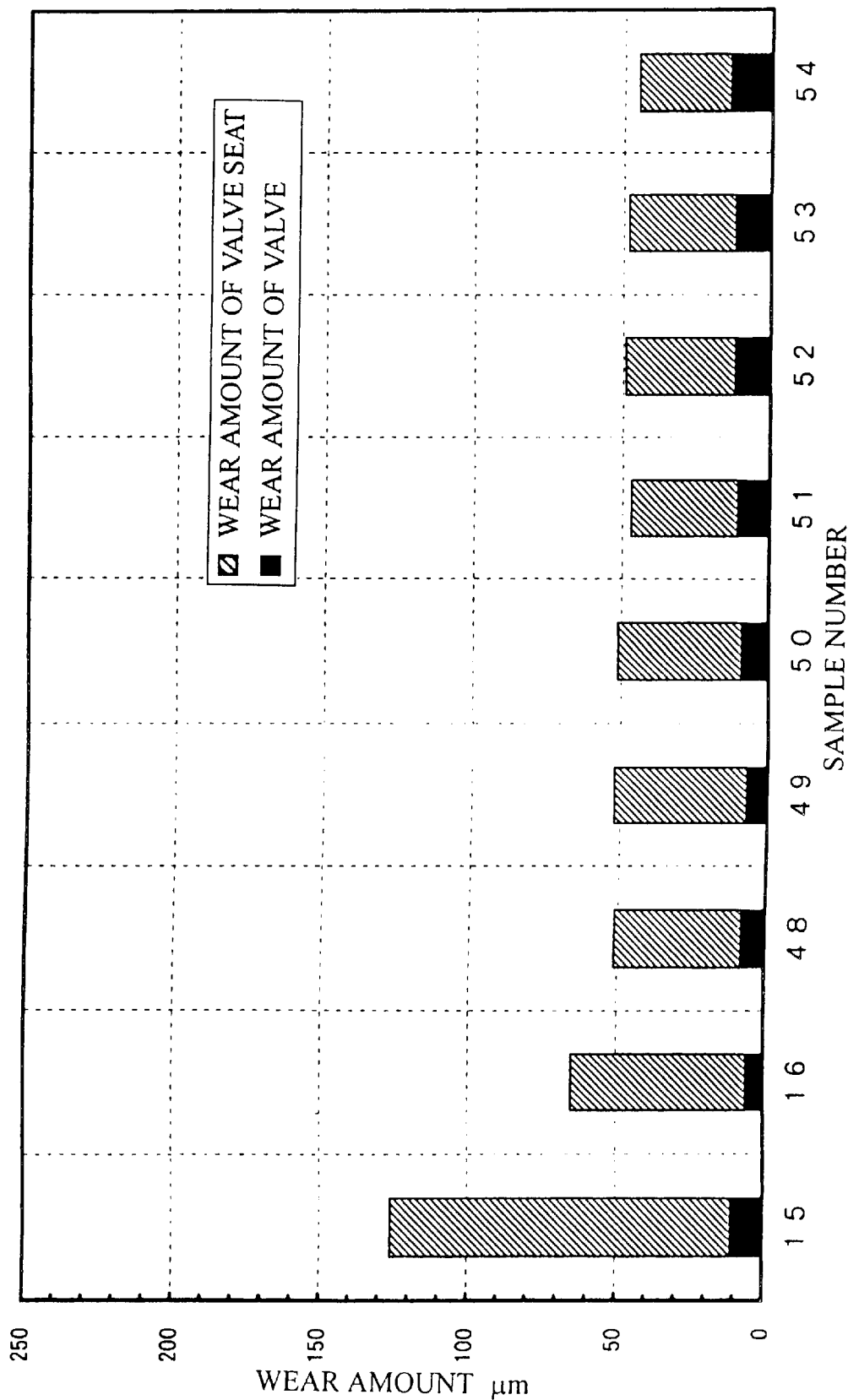
FIG. 11 is a chart showing the wear amount of Sample Nos. 15, 16 and 48 to 54.
Figure 12:
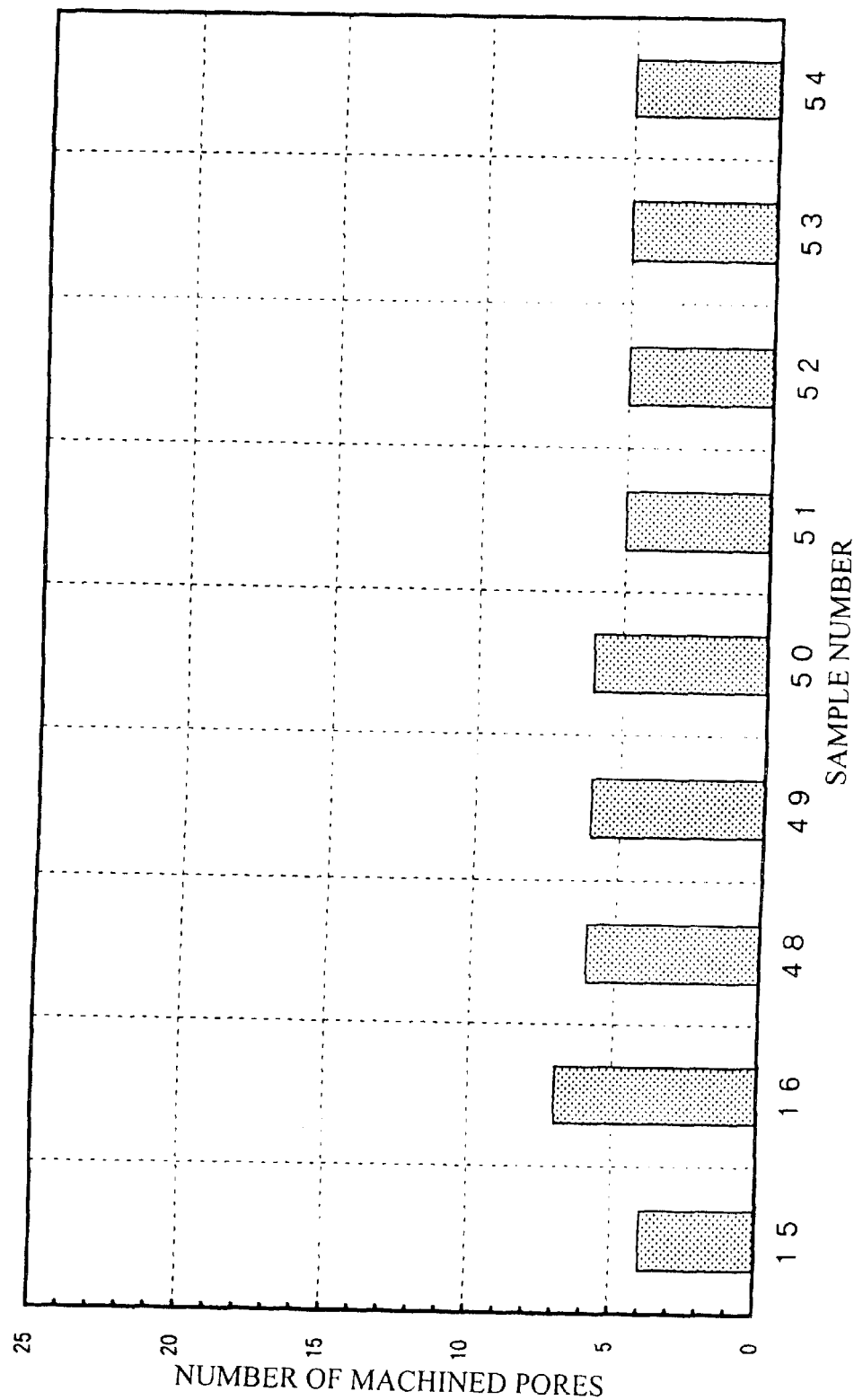
FIG. 12 is a chart showing the number of machined pores of Sample Nos. 15, 16 and 48 to 54.

FIG. 11 shows the wear amounts of the sintered alloy (Sample No. 15) disclosed in Japanese Patent Application No. 141976/98 which is proposed by the applicant and the sintered alloys (Sample Nos. 48 to 54) in which at least one of Mo, V and W is included in the above sintered alloy (Sample No. 15). FIG. 12 shows the number of machined pores. As shown in FIG. 12, the number of machined pores of the sintered alloys hardly vary. However, the wear amount of the valve sheet of the invention remarkably decreases and exhibits superb wear resistance. For comparison, the wear amount and the number of machined pores of the example of the invention (Sample No. 16) including no Mo or the like in the particle group forming powder are shown together.

2. Second Example

Evaluation Test 1

A alloy powder of Fe-3Cr-0.3Mo-0.3V, B alloy powder of Fe-6.5Co-1.5Mo, a Ni powder, and a graphite powder were mixed together at the mixing ratio shown in Table 6 to obtain twenty one (21) kinds, in total, of preliminarily mixed powders including preliminarily mixed powders (Y1 to Y10) having powder compositions shown in Table 6, and comparative preliminarily mixed powders (Y11 to Y21). Also, C alloy powder of Co-28Mo-8Cr-2.5Si, eight(8) kinds, in total, of D alloy powders including D alloy powders (D1 to D6) having the powder components shown in Table 7, and comparative D alloy powders (D7 and D8), and seven (7) kinds of E alloy powders (E1 to E7) were prepared. In addition, FeS powder, $MoS_2$ powder, $WS_2$ powder and CuS powder were prepared.

TABLE 6

| Powder No. | Mixing Ratio wt. % | | | | | Powder Composition wt. % | | | | | | |
|---|---|---|---|---|---|---|---|---|---|---|---|---|
| | A Alloy Powder | B Alloy Powder | Ni Powder | Graphite Powder | A:B | Fe | Ni | Cr | Co | Mo | V | C |
| Y1 | 66.90 | 22.30 | 10.00 | 0.80 | 75:25 | Balance | 10.00 | 2.01 | 1.45 | 0.54 | 0.20 | 0.80 |
| Y2 | 48.10 | 48.10 | 3.00 | 0.80 | 50:50 | Balance | 3.00 | 1.44 | 3.13 | 0.87 | 0.14 | 0.80 |
| Y3 | 46.60 | 46.60 | 6.00 | 0.80 | 50:50 | Balance | 6.00 | 1.40 | 3.03 | 0.84 | 0.14 | 0.80 |
| Y4 | 44.70 | 44.70 | 10.00 | 0.60 | 50:50 | Balance | 10.00 | 1.34 | 2.91 | 0.80 | 0.13 | 0.60 |
| Y5 | 44.60 | 44.60 | 10.00 | 0.80 | 50:50 | Balance | 10.00 | 1.34 | 2.90 | 0.80 | 0.13 | 0.80 |
| Y6 | 44.50 | 44.50 | 10.00 | 1.00 | 50:50 | Balance | 10.00 | 1.34 | 2.89 | 0.80 | 0.13 | 1.00 |
| Y7 | 44.40 | 44.40 | 10.00 | 1.20 | 50:50 | Balance | 10.00 | 1.33 | 2.89 | 0.80 | 0.13 | 1.20 |
| Y8 | 42.10 | 42.10 | 15.00 | 0.80 | 50:50 | Balance | 15.00 | 1.26 | 2.74 | 0.76 | 0.13 | 0.80 |
| Y9 | 39.60 | 39.60 | 20.00 | 0.80 | 50:50 | Balance | 20.00 | 1.19 | 2.57 | 0.71 | 0.12 | 0.80 |
| Y10 | 22.30 | 66.90 | 10.00 | 0.80 | 25:75 | Balance | 10.00 | 0.67 | 4.35 | 1.07 | 0.07 | 0.80 |
| Y11 | 89.20 | | 10.00 | 0.80 | 100:0 | Balance | 10.00 | 2.68 | | 0.27 | 0.27 | 0.80 |
| Y12 | 71.36 | 17.84 | 10.00 | 0.80 | 80:20 | Balance | 10.00 | 2.14 | 1.16 | 0.48 | 0.21 | 0.80 |
| Y13 | 17.84 | 71.36 | 10.00 | 0.80 | 20:80 | Balance | 10.00 | 0.54 | 4.64 | 1.12 | 0.05 | 0.80 |
| Y14 | | 89.20 | 10.00 | 0.80 | 0:100 | Balance | 10.00 | | 5.80 | 1.34 | | 0.80 |
| Y15 | 49.60 | 49.60 | | 0.80 | 50:50 | Balance | | 1.49 | 3.22 | 0.89 | 0.15 | 0.80 |
| Y16 | 49.23 | 49.23 | 0.75 | 0.80 | 50:50 | Balance | 0.75 | 1.48 | 3.20 | 0.89 | 0.15 | 0.80 |
| Y17 | 38.60 | 38.60 | 22.00 | 0.80 | 50:50 | Balance | 22.00 | 1.16 | 2.51 | 0.69 | 0.12 | 0.80 |
| Y18 | 44.80 | 44.80 | 10.00 | 0.40 | 50:50 | Balance | 10.00 | 1.34 | 2.91 | 0.81 | 0.13 | 0.40 |
| Y19 | 44.30 | 44.30 | 10.00 | 1.40 | 50:50 | Balance | 10.00 | 1.33 | 2.88 | 0.80 | 0.13 | 1.40 |
| Y20 | | 99.20 | | 0.80 | 0:100 | Balance | | | 6.45 | 1.49 | | 0.80 |
| Y21 | | 88.20 | 10.00 | 0.80 | 0:100 | Balance | 10.00 | | 5.73 | 1.32 | | 0.80 |

TABLE 7

| Powder No. | | Powder Composition wt. % | | | | | |
|---|---|---|---|---|---|---|---|
| | | Fe | Cr | Mo | V | W | C |
| D Alloy Powder | D1 | 94.60 | 4.00 | | | | 1.40 |
| | D2 | 90.60 | 8.00 | | | | 1.40 |
| | D3 | 86.60 | 12.00 | | | | 1.40 |
| | D4 | 83.60 | 15.00 | | | | 1.40 |
| | D5 | 78.60 | 20.00 | | | | 1.40 |
| | D6 | 73.60 | 25.00 | | | | 1.40 |
| | D7 | 96.60 | 2.00 | | | | 1.40 |
| | D8 | 71.60 | 27.00 | | | | 1.40 |
| E Alloy Powder | E1 | 85.60 | 12.00 | 1.00 | | | 1.40 |
| | E2 | 86.10 | 12.00 | | 0.50 | | 1.40 |
| | E3 | 84.60 | 12.00 | | | 2.00 | 1.40 |
| | E4 | 85.10 | 12.00 | 1.00 | 0.50 | | 1.40 |
| | E5 | 83.60 | 12.00 | 1.00 | | 2.00 | 1.40 |
| | E6 | 84.10 | 12.00 | | 0.50 | 2.00 | 1.40 |
| | E7 | 83.10 | 12.00 | 1.00 | 0.50 | 2.00 | 1.40 |

After preparing the preliminarily mixed powders, the C alloy powers, the D alloy powders, or the E alloy powders were mixed together at the mixing ratio shown in Table 8 and Table 9, they were compacted under the pressure of 6.5 ton/cm$^2$ and sintered for sixty (60) minutes at a temperature of 1180° C. in a dissociated ammonia gas. As a result, alloys of the present invention (Sample Nos. 1 to 42) and comparative alloys (Sample Nos. 43 to 68) whose constituent compositions are partly departed from the scope of the present invention were obtained. The chemical composition of those alloys are shown in Table 10 and Table 11. The comparative alloy of Sample No. 69 is the conventional alloy disclosed in the aforementioned Japanese Patent Examined Publication No. 55593/93, and the comparative alloy of Sample No. 70 is the alloy disclosed in the Japanese Patent Examined Publication No. 98985/95.

TABLE 8

| | Mixing Ratio wt. % | | | | | | | | | | |
|---|---|---|---|---|---|---|---|---|---|---|---|
| | Preliminarily Mixed Powder | | | D, E Alloy Powder | | FeS, MoS$_2$, WS$_2$, CuS Powder | | | | | |
| Sample No. | Powder No. | Addition Amount | C Alloy Powder | Powder No. | Addition Amount | Kind | Addition Amount | Powder Composition wt. % | | | |
| | | | | | | | | Fe | Mo | W | Cu | S |
| 1 | Y1 | 67.50 | 15.00 | D3 | 15.00 | FeS | 2.50 | 63.50 | | | | 36.50 |
| 2 | Y2 | 67.50 | 15.00 | D3 | 15.00 | FeS | 2.50 | 63.50 | | | | 36.50 |
| 3 | Y3 | 67.50 | 15.00 | D3 | 15.00 | FeS | 2.50 | 63.50 | | | | 36.50 |
| 4 | Y4 | 67.50 | 15.00 | D3 | 15.00 | FeS | 2.50 | 63.50 | | | | 36.50 |
| 5 | Y5 | 77.50 | 5.00 | D3 | 15.00 | FeS | 2.50 | 63.50 | | | | 36.50 |
| 6 | Y5 | 72.50 | 10.00 | D3 | 15.00 | FeS | 2.50 | 63.50 | | | | 36.50 |
| 7 | Y5 | 67.50 | 15.00 | D1 | 15.00 | FeS | 2.50 | 63.50 | | | | 36.50 |
| 8 | Y5 | 67.50 | 15.00 | D2 | 15.00 | FeS | 2.50 | 63.50 | | | | 36.50 |
| 9 | Y5 | 77.50 | 15.00 | D3 | 5.00 | FeS | 2.50 | 63.50 | | | | 36.50 |
| 10 | Y5 | 72.50 | 15.00 | D3 | 10.00 | FeS | 2.50 | 63.50 | | | | 36.50 |
| 11 | Y5 | 67.50 | 15.00 | D3 | 15.00 | FeS | 2.50 | 63.50 | | | | 36.50 |
| 12 | Y5 | 62.50 | 15.00 | D3 | 20.00 | FeS | 2.50 | 63.50 | | | | 36.50 |
| 13 | Y5 | 57.50 | 15.00 | D3 | 25.00 | FeS | 2.50 | 63.50 | | | | 36.50 |
| 14 | Y5 | 52.50 | 15.00 | D3 | 15.00 | FeS | 2.50 | 63.50 | | | | 36.50 |
| 15 | Y5 | 67.50 | 15.00 | E1 | 15.00 | FeS | 2.50 | 63.50 | | | | 36.50 |
| 16 | Y5 | 67.50 | 15.00 | E2 | 15.00 | FeS | 2.50 | 63.50 | | | | 36.50 |
| 17 | Y5 | 67.50 | 15.00 | E3 | 15.00 | FeS | 2.50 | 63.50 | | | | 36.50 |
| 18 | Y5 | 67.50 | 15.00 | E4 | 15.00 | FeS | 2.50 | 63.50 | | | | 36.50 |
| 19 | Y5 | 67.50 | 15.00 | E5 | 15.00 | FeS | 2.50 | 63.50 | | | | 36.50 |
| 20 | Y5 | 67.50 | 15.00 | E6 | 15.00 | FeS | 2.50 | 63.50 | | | | 36.50 |
| 21 | Y5 | 67.50 | 15.00 | E7 | 15.00 | FeS | 2.50 | 63.50 | | | | 36.50 |
| 22 | Y5 | 67.50 | 15.00 | D4 | 15.00 | FeS | 2.50 | 63.50 | | | | 36.50 |
| 23 | Y5 | 67.50 | 15.00 | D5 | 15.00 | FeS | 2.50 | 63.50 | | | | 36.50 |
| 24 | Y5 | 67.50 | 15.00 | D6 | 15.00 | FeS | 2.50 | 63.50 | | | | 36.50 |
| 25 | Y5 | 62.50 | 20.00 | D3 | 15.00 | FeS | 2.50 | 63.50 | | | | 36.50 |
| 26 | Y5 | 57.50 | 25.00 | D3 | 15.00 | FeS | 2.50 | 63.50 | | | | 36.50 |
| 27 | Y6 | 67.50 | 15.00 | D3 | 15.00 | FeS | 2.50 | 63.50 | | | | 36.50 |
| 28 | Y7 | 67.50 | 15.00 | D3 | 15.00 | FeS | 2.50 | 63.50 | | | | 36.50 |
| 29 | Y8 | 67.50 | 15.00 | D3 | 15.00 | FeS | 2.50 | 63.50 | | | | 36.50 |
| 30 | Y9 | 67.50 | 15.00 | D3 | 15.00 | FeS | 2.50 | 63.50 | | | | 36.50 |
| 31 | Y10 | 67.50 | 15.00 | D3 | 15.00 | FeS | 2.50 | 63.50 | | | | 36.50 |
| 32 | Y5 | 69.18 | 15.00 | D3 | 15.00 | FeS | 0.82 | 63.50 | | | | 36.50 |
| 33 | Y5 | 65.89 | 15.00 | D3 | 15.00 | FeS | 4.11 | 63.50 | | | | 36.50 |
| 34 | Y5 | 69.25 | 15.00 | D3 | 15.00 | MoS$_2$ | 0.75 | | 60.00 | | | 40.00 |
| 35 | Y5 | 67.75 | 15.00 | D3 | 15.00 | MoS$_2$ | 2.25 | | 60.00 | | | 40.00 |
| 36 | Y5 | 66.25 | 15.00 | D3 | 15.00 | MoS$_2$ | 3.75 | | 60.00 | | | 40.00 |
| 37 | Y5 | 68.84 | 15.00 | D3 | 15.00 | WS$_2$ | 1.16 | | | 74.10 | | 25.90 |
| 38 | Y5 | 66.50 | 15.00 | D3 | 15.00 | WS$_2$ | 3.50 | | | 74.10 | | 25.90 |
| 39 | Y5 | 64.21 | 15.00 | D3 | 15.00 | WS$_2$ | 5.79 | | | 74.10 | | 25.90 |
| 40 | Y5 | 69.10 | 15.00 | D3 | 15.00 | CuS | 0.90 | | | | 66.50 | 33.50 |

TABLE 8-continued

| | Mixing Ratio wt. % | | | | | | | | | | | |
|---|---|---|---|---|---|---|---|---|---|---|---|---|
| | Preliminarily Mixed Powder | | | D, E Alloy Powder | | FeS, MoS$_2$, WS$_2$, CuS Powder | | | | | | |
| Sample No. | Powder No. | Addition Amount | C Alloy Powder | Powder No. | Addition Amount | Kind | Addition Amount | Powder Composition wt. % | | | | |
| | | | | | | | | Fe | Mo | W | Cu | S |
| 41 | Y5 | 67.30 | 15.00 | D3 | 15.00 | CuS | 2.70 | | | | 66.50 | 33.50 |
| 42 | Y5 | 65.52 | 15.00 | D3 | 15.00 | CuS | 4.48 | | | | 66.50 | 33.50 |

TABLE 9

| | Mixing Ratio wt. % | | | | | | | | | | | |
|---|---|---|---|---|---|---|---|---|---|---|---|---|
| | Preliminarily Mixed Powder | | | D, E Alloy Powder | | FeS, MoS$_2$, WS$_2$, CuS Powder | | | | | | |
| Sample No. | Powder No. | Addition Amount | C Alloy Powder | Powder No. | Addition Amount | Kind | Addition Amount | Powder Composition wt. % | | | | |
| | | | | | | | | Fe | Mo | W | Cu | S |
| 43 | Y11 | 67.50 | 15.00 | D3 | 15.00 | FeS | 2.50 | 63.50 | | | | 36.50 |
| 44 | Y12 | 67.50 | 15.00 | D3 | 15.00 | FeS | 2.50 | 63.50 | | | | 36.50 |
| 45 | Y13 | 67.50 | 15.00 | D3 | 15.00 | FeS | 2.50 | 63.50 | | | | 36.50 |
| 46 | Y14 | 67.50 | 15.00 | D3 | 15.00 | FeS | 2.50 | 63.50 | | | | 36.50 |
| 47 | Y15 | 67.50 | 15.00 | D3 | 15.00 | FeS | 2.50 | 63.50 | | | | 36.50 |
| 48 | Y16 | 67.50 | 15.00 | D3 | 15.00 | FeS | 2.50 | 63.50 | | | | 36.50 |
| 49 | Y17 | 67.50 | 15.00 | D3 | 15.00 | FeS | 2.50 | 63.50 | | | | 36.50 |
| 50 | Y18 | 67.50 | 15.00 | D3 | 15.00 | FeS | 2.50 | 63.50 | | | | 36.50 |
| 51 | Y19 | 67.50 | 15.00 | D3 | 15.00 | FeS | 2.50 | 63.50 | | | | 36.50 |
| 52 | Y5 | 82.50 | 0.00 | D3 | 15.00 | FeS | 2.50 | 63.50 | | | | 36.50 |
| 53 | Y5 | 79.50 | 3.00 | D3 | 15.00 | FeS | 2.50 | 63.50 | | | | 36.50 |
| 54 | Y5 | 52.50 | 30.00 | D3 | 15.00 | FeS | 2.50 | 63.50 | | | | 36.50 |
| 55 | Y5 | 67.50 | 15.00 | D7 | 15.00 | FeS | 2.50 | 63.50 | | | | 36.50 |
| 56 | Y5 | 67.50 | 15.00 | D8 | 15.00 | FeS | 2.50 | 63.50 | | | | 36.50 |
| 57 | Y5 | 82.50 | 15.00 | D3 | 0.00 | FeS | 2.50 | 63.50 | | | | 36.50 |
| 58 | Y5 | 79.50 | 15.00 | D3 | 3.00 | FeS | 2.50 | 63.50 | | | | 36.50 |
| 59 | Y5 | 47.50 | 15.00 | D3 | 35.00 | FeS | 2.50 | 63.50 | | | | 36.50 |
| 60 | Y5 | 70.00 | 15.00 | D3 | 15.00 | | | | | | | |
| 61 | Y5 | 69.28 | 15.00 | D3 | 15.00 | FeS | 0.72 | 63.50 | | | | 36.50 |
| 62 | Y5 | 65.79 | 15.00 | D3 | 15.00 | FeS | 4.21 | 63.50 | | | | 36.50 |
| 63 | Y5 | 69.35 | 15.00 | D3 | 15.00 | MoS$_2$ | 0.65 | | 60.00 | | | 40.00 |
| 64 | Y5 | 66.15 | 15.00 | D3 | 15.00 | MoS$_2$ | 3.85 | | 60.00 | | | 40.00 |
| 65 | Y5 | 68.94 | 15.00 | D3 | 15.00 | WS$_2$ | 1.06 | | | 74.10 | | 25.90 |
| 66 | Y5 | 64.11 | 15.00 | D3 | 15.00 | WS$_2$ | 5.89 | | | 74.10 | | 25.90 |
| 67 | Y5 | 69.20 | 15.00 | D3 | 15.00 | CuS | 0.80 | | | | 66.50 | 33.50 |
| 68 | Y5 | 65.42 | 15.00 | D3 | 15.00 | CuS | 4.58 | | | | 66.50 | 33.50 |
| 69 | Y20 | 85.00 | 15.00 | | | | | | | | | |
| 70 | Y21 | 85.00 | 15.00 | | | | | | | | | |

TABLE 10

| Sample No. | Constituent Composition as a While wt. % | | | | | | | | | | |
|---|---|---|---|---|---|---|---|---|---|---|---|
| | Fe | Ni | Cr | Co | Mo | V | W | Cu | Si | S | C |
| 1 | Balance | 6.75 | 4.35 | 10.20 | 4.56 | 0.14 | | | 0.37 | 0.89 | 0.75 |
| 2 | Balance | 2.03 | 3.97 | 11.34 | 4.74 | 0.09 | | | 0.37 | 0.89 | 0.75 |
| 3 | Balance | 4.05 | 3.94 | 11.27 | 4.74 | 0.09 | | | 0.37 | 0.89 | 0.75 |
| 4 | Balance | 6.75 | 3.91 | 11.19 | 4.74 | 0.09 | | | 0.37 | 0.89 | 0.62 |
| 5 | Balance | 7.75 | 3.24 | 5.32 | 2.02 | 0.10 | | | 0.12 | 0.89 | 0.83 |
| 6 | Balance | 7.25 | 3.57 | 8.25 | 3.38 | 0.10 | | | 0.24 | 0.89 | 0.79 |
| 7 | Balance | 6.75 | 2.70 | 11.18 | 4.74 | 0.09 | | | 0.37 | 0.89 | 0.75 |
| 8 | Balance | 6.75 | 3.30 | 11.18 | 4.74 | 0.09 | | | 0.37 | 0.89 | 0.75 |
| 9 | Balance | 7.75 | 2.84 | 11.47 | 4.82 | 0.10 | | | 0.37 | 0.89 | 0.69 |
| 10 | Balance | 7.25 | 3.37 | 11.33 | 4.78 | 0.10 | | | 0.37 | 0.89 | 0.72 |
| 11 | Balance | 6.75 | 3.90 | 11.18 | 4.74 | 0.09 | | | 0.37 | 0.89 | 0.75 |

TABLE 10-continued

| Sample No. | Fe | Ni | Cr | Co | Mo | V | W | Cu | Si | S | C |
|---|---|---|---|---|---|---|---|---|---|---|---|
| 12 | Balance | 6.25 | 4.44 | 11.04 | 4.70 | 0.08 | | | 0.37 | 0.89 | 0.78 |
| 13 | Balance | 5.75 | 4.97 | 10.89 | 4.66 | 0.08 | | | 0.37 | 0.89 | 0.81 |
| 14 | Balance | 5.25 | 5.50 | 10.75 | 4.62 | 0.07 | | | 0.37 | 0.89 | 0.84 |
| 15 | Balance | 6.75 | 3.90 | 11.18 | 4.89 | 0.09 | | | 0.37 | 0.89 | 0.75 |
| 16 | Balance | 6.75 | 3.90 | 11.18 | 4.74 | 0.52 | | | 0.37 | 0.89 | 0.75 |
| 17 | Balance | 6.75 | 3.90 | 11.18 | 4.74 | 0.09 | 0.30 | | 0.37 | 0.89 | 0.75 |
| 18 | Balance | 6.75 | 3.90 | 11.18 | 4.89 | 0.52 | | | 0.37 | 0.89 | 0.75 |
| 19 | Balance | 6.75 | 3.90 | 11.18 | 4.89 | 0.09 | 0.30 | | 0.37 | 0.89 | 0.75 |
| 20 | Balance | 6.75 | 3.90 | 11.18 | 4.74 | 0.51 | 0.30 | | 0.37 | 0.89 | 0.75 |
| 21 | Balance | 6.75 | 3.90 | 11.18 | 4.89 | 0.51 | 0.30 | | 0.37 | 0.91 | 0.75 |
| 22 | Balance | 6.75 | 4.35 | 11.18 | 4.74 | 0.09 | | | 0.37 | 0.91 | 0.75 |
| 23 | Balance | 6.75 | 5.10 | 11.18 | 4.74 | 0.09 | | | 0.37 | 0.91 | 0.75 |
| 24 | Balance | 6.75 | 5.85 | 11.18 | 4.74 | 0.09 | | | 0.37 | 0.91 | 0.75 |
| 25 | Balance | 6.25 | 4.24 | 14.11 | 6.10 | 0.08 | | | 0.49 | 0.91 | 0.71 |
| 26 | Balance | 5.75 | 4.57 | 17.04 | 7.46 | 0.08 | | | 0.61 | 0.91 | 0.67 |
| 27 | Balance | 6.75 | 3.90 | 11.18 | 4.74 | 0.09 | | | 0.37 | 0.91 | 0.89 |
| 28 | Balance | 6.75 | 3.90 | 11.17 | 4.74 | 0.09 | | | 0.37 | 0.91 | 1.02 |
| 29 | Balance | 10.13 | 3.85 | 11.07 | 4.74 | 0.09 | | | 0.37 | 0.91 | 0.75 |
| 30 | Balance | 13.50 | 3.80 | 10.96 | 4.74 | 0.09 | | | 0.37 | 0.91 | 0.75 |
| 31 | Balance | 6.75 | 3.45 | 12.16 | 4.92 | 0.05 | | | 0.38 | 0.91 | 0.75 |
| 32 | Balance | 6.92 | 3.93 | 11.23 | 4.76 | 0.09 | | | 0.37 | 0.30 | 0.76 |
| 33 | Balance | 6.59 | 3.88 | 11.14 | 4.73 | 0.09 | | | 0.36 | 1.50 | 0.74 |
| 34 | Balance | 6.93 | 3.93 | 11.23 | 5.21 | 0.09 | | | 0.37 | 0.30 | 0.76 |
| 35 | Balance | 6.78 | 3.91 | 11.19 | 6.09 | 0.09 | | | 0.37 | 0.90 | 0.75 |
| 36 | Balance | 6.63 | 3.89 | 11.15 | 6.98 | 0.09 | | | 0.36 | 1.50 | 0.74 |
| 37 | Balance | 6.88 | 3.92 | 11.22 | 4.75 | 0.09 | 0.86 | | 0.37 | 0.30 | 0.76 |
| 38 | Balance | 6.65 | 3.89 | 11.15 | 4.73 | 0.09 | 2.59 | | 0.36 | 0.91 | 0.74 |
| 39 | Balance | 6.42 | 3.86 | 11.09 | 4.72 | 0.09 | 4.29 | | 0.35 | 1.50 | 0.72 |
| 40 | Balance | 6.91 | 3.92 | 11.23 | 4.75 | 0.09 | | 0.60 | 0.37 | 0.30 | 0.76 |
| 41 | Balance | 6.73 | 3.90 | 11.18 | 4.74 | 0.09 | | 1.80 | 0.37 | 0.90 | 0.75 |
| 42 | Balance | 6.55 | 3.88 | 11.12 | 4.73 | 0.09 | | 2.98 | 0.36 | 1.50 | 0.73 |

TABLE 11

| Sample No. | Fe | Ni | Cr | Co | Mo | V | W | Cu | Si | S | C |
|---|---|---|---|---|---|---|---|---|---|---|---|
| 43 | Balance | 6.75 | 4.81 | 9.23 | 4.38 | 0.18 | | | 0.37 | 0.91 | 0.75 |
| 44 | Balance | 6.75 | 4.45 | 10.01 | 4.53 | 0.14 | | | 0.37 | 0.91 | 0.75 |
| 45 | Balance | 6.75 | 3.36 | 12.36 | 4.96 | 0.04 | | | 0.37 | 0.91 | 0.75 |
| 46 | Balance | 6.75 | 3.00 | 13.14 | 5.10 | 0.00 | | | 0.37 | 0.91 | 0.75 |
| 47 | Balance | | 4.00 | 11.40 | 4.74 | 0.09 | | | 0.37 | 0.91 | 0.75 |
| 48 | Balance | 0.51 | 4.00 | 11.38 | 4.74 | 0.09 | | | 0.37 | 0.91 | 0.75 |
| 49 | Balance | 14.85 | 3.78 | 10.92 | 4.74 | 0.09 | | | 0.37 | 0.91 | 0.75 |
| 50 | Balance | 6.75 | 3.91 | 11.19 | 4.74 | 0.09 | | | 0.37 | 0.91 | 0.48 |
| 51 | Balance | 6.75 | 3.90 | 11.17 | 4.74 | 0.09 | | | 0.37 | 0.91 | 1.16 |
| 52 | Balance | 8.25 | 2.90 | 2.39 | 0.66 | 0.11 | | | 0.00 | 0.91 | 0.87 |
| 53 | Balance | 7.95 | 3.10 | 4.15 | 1.48 | 0.11 | | | 0.07 | 0.91 | 0.85 |
| 54 | Balance | 5.25 | 4.90 | 19.97 | 8.82 | 0.07 | | | 0.73 | 0.91 | 0.63 |
| 55 | Balance | 6.75 | 2.40 | 11.18 | 4.74 | 0.09 | | | 0.37 | 0.91 | 0.75 |
| 56 | Balance | 6.75 | 6.15 | 11.18 | 4.74 | 0.09 | | | 0.37 | 0.91 | 0.75 |
| 57 | Balance | 8.25 | 2.30 | 11.62 | 4.86 | 0.11 | | | 0.37 | 0.91 | 0.66 |
| 58 | Balance | 7.95 | 2.62 | 11.53 | 4.84 | 0.11 | | | 0.37 | 0.91 | 0.68 |
| 59 | Balance | 4.75 | 6.04 | 10.60 | 4.58 | 0.06 | | | 0.37 | 0.91 | 0.87 |
| 60 | Balance | 7.00 | 3.94 | 11.25 | 4.76 | 0.09 | | | 0.38 | 0.00 | 0.77 |
| 61 | Balance | 6.93 | 3.93 | 11.23 | 4.76 | 0.09 | | | 0.37 | 0.26 | 0.76 |
| 62 | Balance | 6.58 | 3.88 | 11.13 | 4.73 | 0.09 | | | 0.36 | 1.54 | 0.74 |
| 63 | Balance | 6.94 | 3.93 | 11.24 | 5.15 | 0.09 | | | 0.37 | 0.26 | 0.76 |
| 64 | Balance | 6.62 | 3.89 | 11.14 | 7.04 | 0.09 | | | 0.36 | 1.54 | 0.74 |
| 65 | Balance | 6.89 | 3.92 | 11.22 | 4.75 | 0.09 | 0.79 | | 0.37 | 0.27 | 0.76 |
| 66 | Balance | 6.41 | 3.86 | 11.08 | 4.71 | 0.09 | 4.36 | | 0.35 | 1.53 | 0.72 |
| 67 | Balance | 6.92 | 3.93 | 11.23 | 4.76 | 0.09 | | 0.53 | 0.37 | 0.27 | 0.76 |
| 68 | Balance | 6.54 | 3.88 | 11.12 | 4.73 | 0.09 | | 3.05 | 0.36 | 1.53 | 0.73 |
| 69 | Balance | | 1.20 | 14.71 | 5.46 | | | | 0.38 | | 0.68 |
| 70 | Balance | 8.50 | 1.20 | 14.15 | 5.34 | | | | 0.38 | | 0.68 |

The measurements of the radial crush sterength, simplified wear tests and machinability tests were carried out for those alloys in the same condition as the first embodiment. The results are shown in Tables 12 and 13 and in FIGS. 13 through 22. The wear amounts of the valve seat and the valve after the test were measured and evaluated.

TABLE 12

| Sample No. | Wear Amount μm | | | Radial Crushing Strength MPa | Number of Machined Pores | Note |
|---|---|---|---|---|---|---|
| | Valve Seat | Valve | Total | | | |
| 1 | 85 | 6 | 91 | 967 | | |
| 2 | 75 | 4 | 79 | 873 | | |
| 3 | 65 | 5 | 70 | 929 | | |
| 4 | 70 | 4 | 74 | 923 | | |
| 5 | 82 | 6 | 88 | 999 | | |
| 6 | 71 | 5 | 76 | 976 | | |
| 7 | 68 | 3 | 71 | 900 | | |
| 8 | 65 | 4 | 69 | 936 | | |
| 9 | 80 | 4 | 84 | 898 | | |
| 10 | 68 | 4 | 72 | 927 | | |
| 11 | 63 | 5 | 68 | 950 | 18 | |
| 12 | 62 | 6 | 68 | 945 | | |
| 13 | 64 | 9 | 73 | 927 | | |
| 14 | 73 | 14 | 87 | 864 | | |
| 15 | 53 | 7 | 60 | 999 | | |
| 16 | 52 | 8 | 60 | 1019 | | |
| 17 | 53 | 8 | 61 | 983 | | |
| 18 | 46 | 12 | 58 | 1045 | | |
| 19 | 46 | 11 | 57 | 1026 | | |
| 20 | 45 | 13 | 58 | 1037 | | |
| 21 | 40 | 15 | 55 | 1080 | | |
| 22 | 60 | 7 | 67 | 948 | | |
| 23 | 61 | 8 | 69 | 922 | | |
| 24 | 77 | 18 | 95 | 857 | | |
| 25 | 63 | 8 | 71 | 918 | | |
| 26 | 74 | 15 | 89 | 855 | | |
| 27 | 56 | 8 | 64 | 946 | | |
| 28 | 54 | 12 | 66 | 932 | | |
| 29 | 60 | 5 | 65 | 924 | | |
| 30 | 77 | 3 | 80 | 865 | | |
| 31 | 90 | 6 | 96 | 954 | | |
| 32 | 80 | 7 | 87 | 1033 | 14 | |
| 33 | 72 | 12 | 84 | 829 | 33 | |
| 34 | 68 | 5 | 73 | 1046 | 12 | |
| 35 | 49 | 2 | 51 | 972 | 17 | |
| 36 | 63 | 13 | 76 | 822 | 30 | |
| 37 | 67 | 4 | 71 | 1040 | 13 | |
| 38 | 48 | 6 | 54 | 962 | 17 | |
| 39 | 65 | 12 | 77 | 811 | 27 | |
| 40 | 76 | 3 | 79 | 1059 | 13 | |
| 41 | 54 | 3 | 57 | 993 | 16 | |
| 42 | 68 | 12 | 80 | 848 | 24 | |

TABLE 13

| Sample No. | Wear Amount μm | | | Radial Crushing Strength MPa | Number of Machined Pores | Note |
|---|---|---|---|---|---|---|
| | Valve Seat | Valve | Total | | | |
| 43 | 101 | 16 | 117 | 990 | | |
| 44 | 110 | 13 | 123 | 972 | | |
| 45 | 115 | 10 | 125 | 963 | | |
| 46 | 155 | 12 | 167 | 982 | | |
| 47 | 125 | 5 | 130 | 751 | | |
| 48 | 110 | 4 | 114 | 782 | | |
| 49 | 121 | 3 | 124 | 788 | | |
| 50 | 96 | 2 | 98 | 828 | | |
| 51 | 91 | 40 | 131 | 864 | | |
| 52 | 139 | 7 | 146 | 1020 | | |
| 53 | 100 | 7 | 107 | 1011 | | |
| 54 | 128 | 44 | 172 | 702 | | |
| 55 | 125 | 2 | 127 | 846 | | |
| 56 | 100 | 38 | 138 | 759 | | |
| 57 | 125 | 4 | 129 | 765 | | |
| 58 | 100 | 4 | 104 | 864 | | |
| 59 | 114 | 40 | 154 | 657 | | |
| 60 | 126 | 10 | 136 | 1056 | 9 | |
| 61 | 95 | 6 | 101 | 1036 | 12 | |
| 62 | 91 | 28 | 119 | 798 | 35 | |
| 63 | 88 | 5 | 93 | 1048 | 12 | |
| 64 | 89 | 29 | 118 | 776 | 32 | |
| 65 | 87 | 6 | 93 | 1042 | 12 | |
| 66 | 90 | 27 | 117 | 771 | 29 | |
| 67 | 94 | 5 | 99 | 1060 | 12 | |
| 68 | 87 | 30 | 117 | 714 | 25 | |
| 69 | 220 | 11 | 231 | 850 | | Alloy of Japanese Patent Examined Publication No. 55593/93 |
| 70 | 181 | 12 | 193 | 930 | Alloyof | Japanese Patent Examined Publication No. 98985/95 |

As shown in Table 6, the preliminarily mixed powder Nos. Y1, Y5, Y10, Y11 to 14 are mutually different in the weight percent of the powders of the A alloy power and the B alloy powder. By comparing the test results of the sintered alloys of the sample Nos. 1, 11, 31 and 43 to 46 shown in Table 8 and 9 using the preliminarily mixed powders Y1, Y5, Y10 and Y11 to Y14, it is checked how the differences of the weight percents between the A alloy powder and the B alloy powder affect. The test results are shown in FIG. 13 together with the total wear amounts of the conventional sintered alloys of the sample Nos. 69 and 70.

Figure 13A:
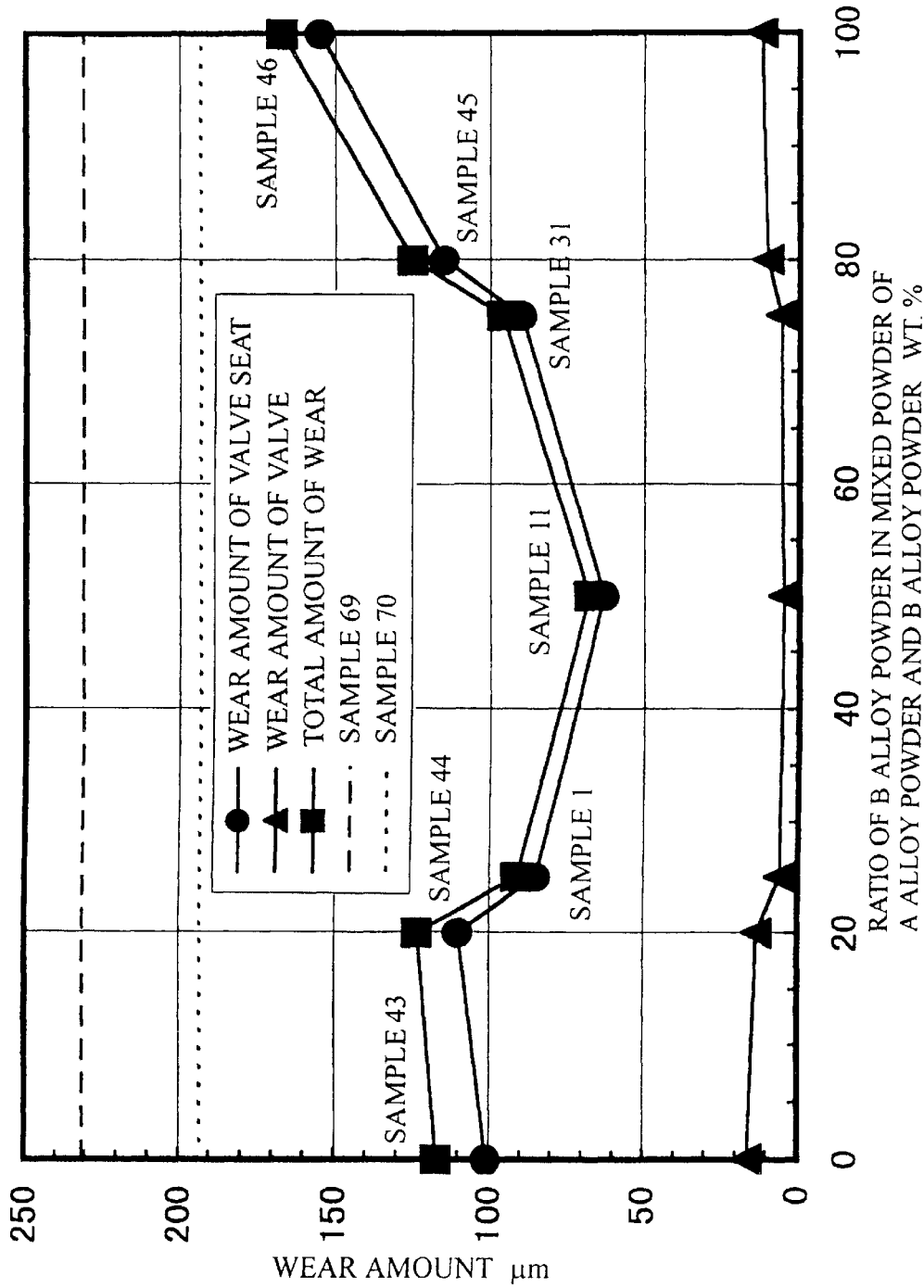
FIG. 13($a$) is a chart showing the relationship between the ratio of A alloy power and B alloy powder in the preliminary mixed powder and the wear amount, in the embodiment of the present invention.
Figure 13:
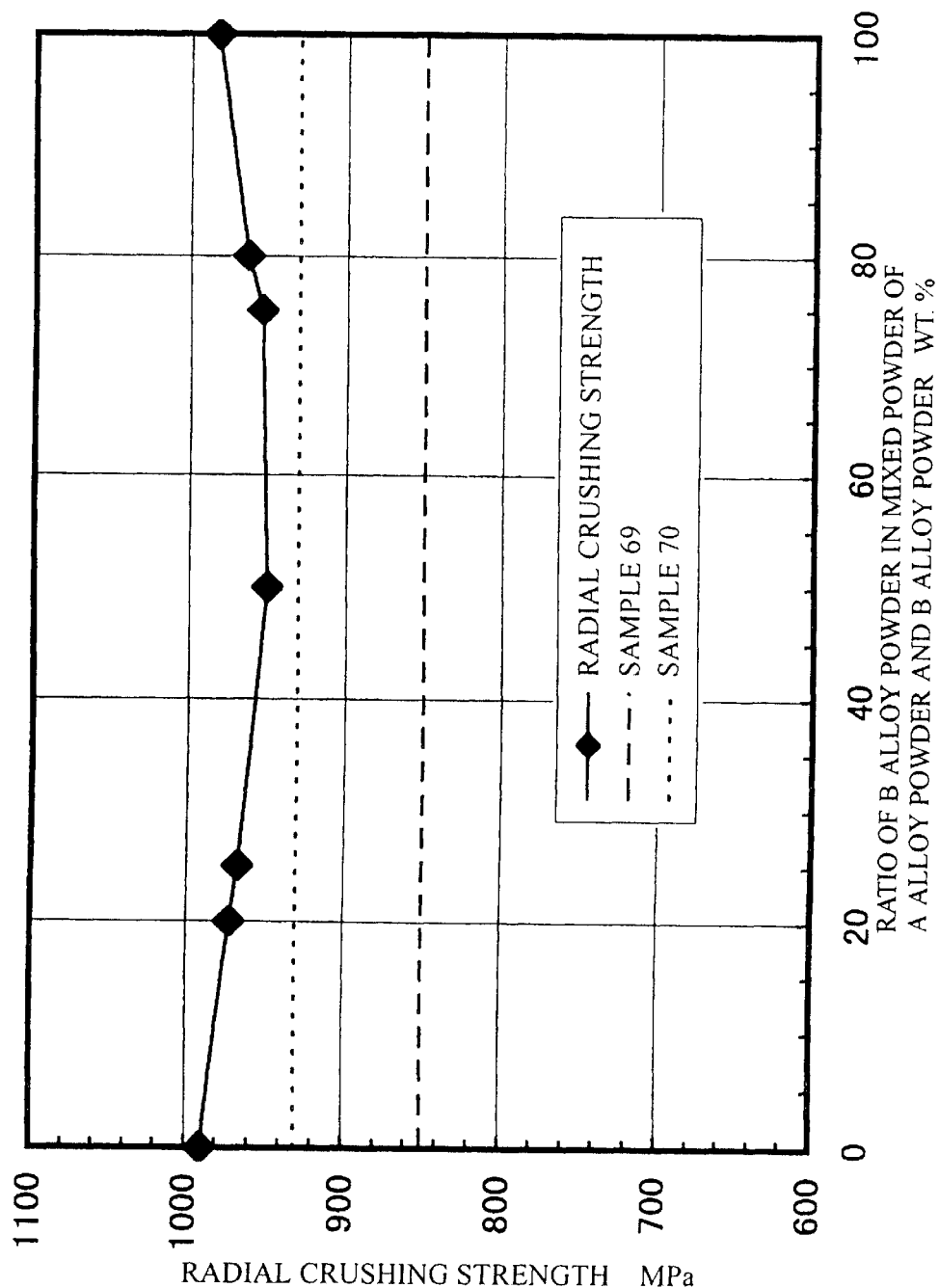

As shown in FIG. 13(*a*), in the sintered alloys (sample Nos. 1, 11 and 31) whose weight percent of the A alloy powers and the B alloy powders are in the range of 25:75 to 75:25, it is clear that the wear amounts of the valve seats and the wear amounts of the valves are stable and low, and that favorable wear resistance is exhibited. On the other hand, in the sintered alloys (sample Nos. 43 to 46, 69 and 70) whose weight percents are departed from the range of from 25:75 to 75:25, it is also clear that the wear amounts of both the valve seats and the valves are large. As shown in FIG. 13(*b*), the radial crush sterengths a little decrease where the percentage of the A alloy power and the B alloy powder is 50:50, but there is no problem since the radial crushing strength is larger than that of sample No. 70 which is a conventional alloy. In this way, it was confirmed that the wear resistance can be improved without decreasing the strength, inasmuch as the weight percents of the A alloy and the B alloy are in the range of 25:75 to 75:25.

Next, the preliminarily mixed powder Nos. Y2, Y3, Y5, Y8, Y9, and Y15 to 17 of Table 6 are mutually different in the addition amount of the Ni powder to be added to the preliminarily mixed powders. By comparing the test results of the sintered alloys of the sample Nos. 2, 3, 11, 29, 30, and 47 to 49 shown in Table 8 and 9 using the preliminarily mixed powders Y2, Y3, Y5, Y8, Y9, and Y15 to Y17, it is checked how the differences of the addition amounts of the Ni powders to be added to the preliminarily mixed powders affect. The test results are shown in FIG. 14 together with the total wear amounts of the conventional sintered alloys of the sample Nos. 69 and 70.

Figure 14A:
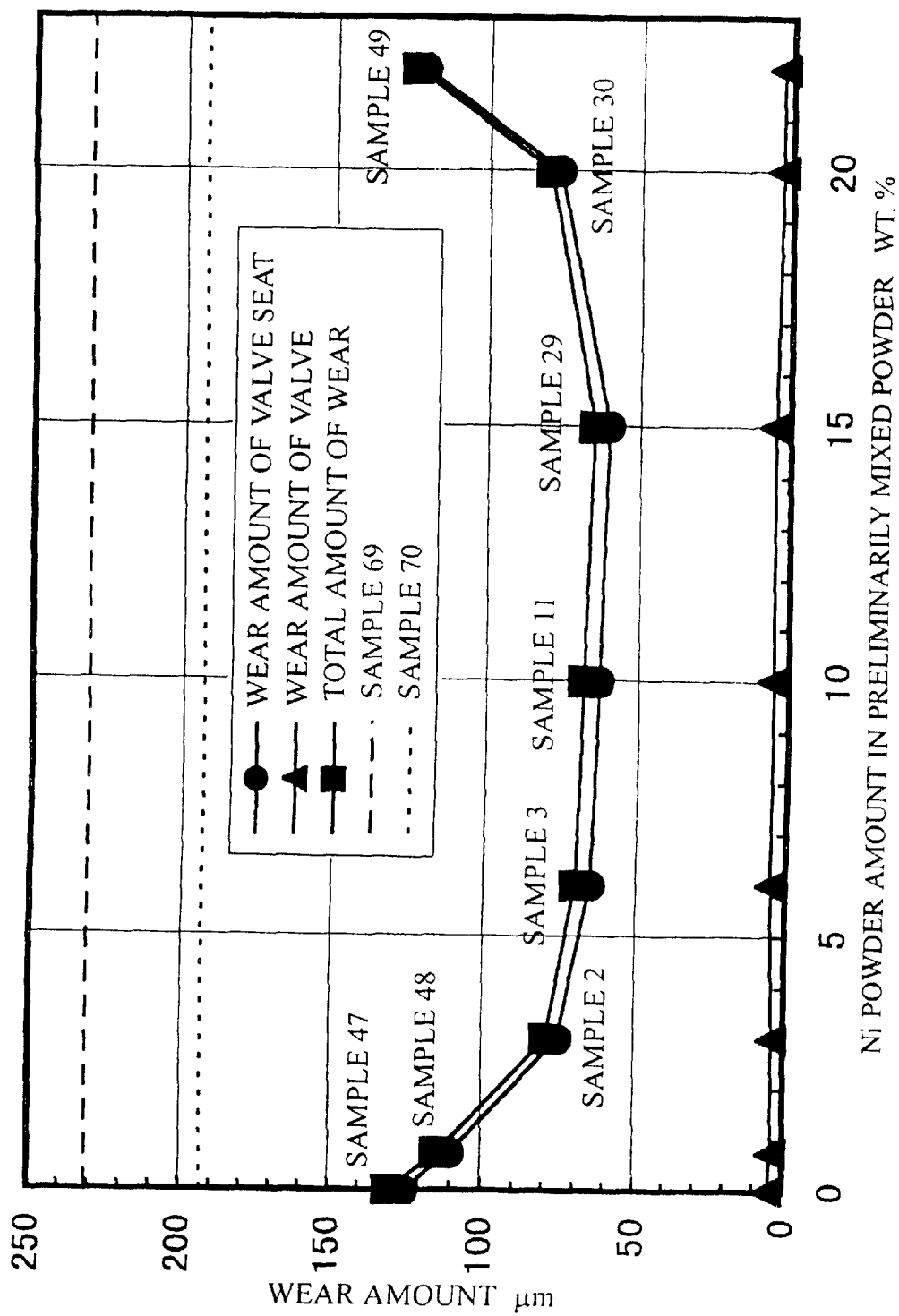
FIG. 14($a$) is a chart showing the relationship between the amount of addition of Ni powder in the preliminary mixed powder and the wear amount, in the embodiment of the present invention.
Figure 14B:
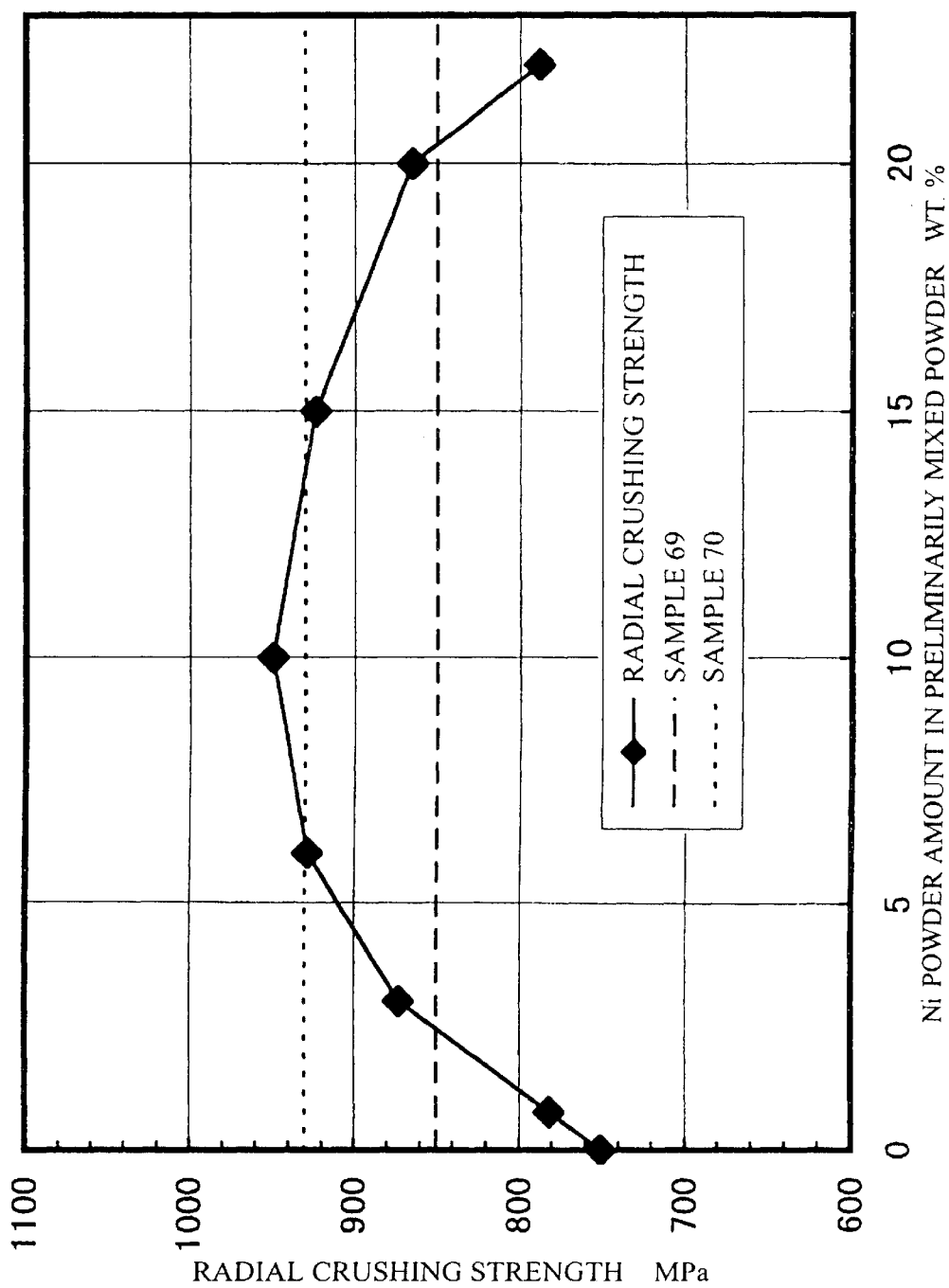

As shown in FIG. 14(a), in the sintered alloys (sample Nos. 2, 3, 11, 29, and 30) whose addition amounts of Ni powder in the preliminarily mixed powder are in the range of 3 to 20% by weight, it is clear that the wear amounts of the valve seats and the valves are stable and low, and that favorable wear resistance is exhibited. Also, as shown in FIG. 14(b), it is know that the radial crush sterength is high in the above sintered alloy. On the other hand, in the sintered alloys (sample Nos. 47 to 49, 69 and 70) whose addition amounts of Ni powders are departed from the range of from 3 to 20% by weight, it is also clear that the wear amounts of both the valve seats and the valves are large and the radial crush sterength is low. In this way, it was confirmed that when the addition amounts of the Ni powders are more than 20% by weight, the strength and the wear resistance are rather decreased because the soft austenite phase is overly increased.

Next, the preliminarily mixed powders Y4 to Y7, Y18, and Y19 of Table 6 are mutually different in the addition amount of the graphite powders to be added to the preliminarily mixed powders. By comparing the test results of the sintered alloys of the sample Nos. 4, 11, 27, 28, 50, and 51 of Table 8 and 9 using the preliminarily mixed powders Y4 to Y7, Y18, and Y19, it is checked how the difference in the addition amounts of the graphite powders to be added to the preliminarily mixed powers affect. The test results are shown in FIG. 15 together with the total wear amounts of the conventional sintered alloys of the sample Nos. 69, and 70.

Figure 15A:
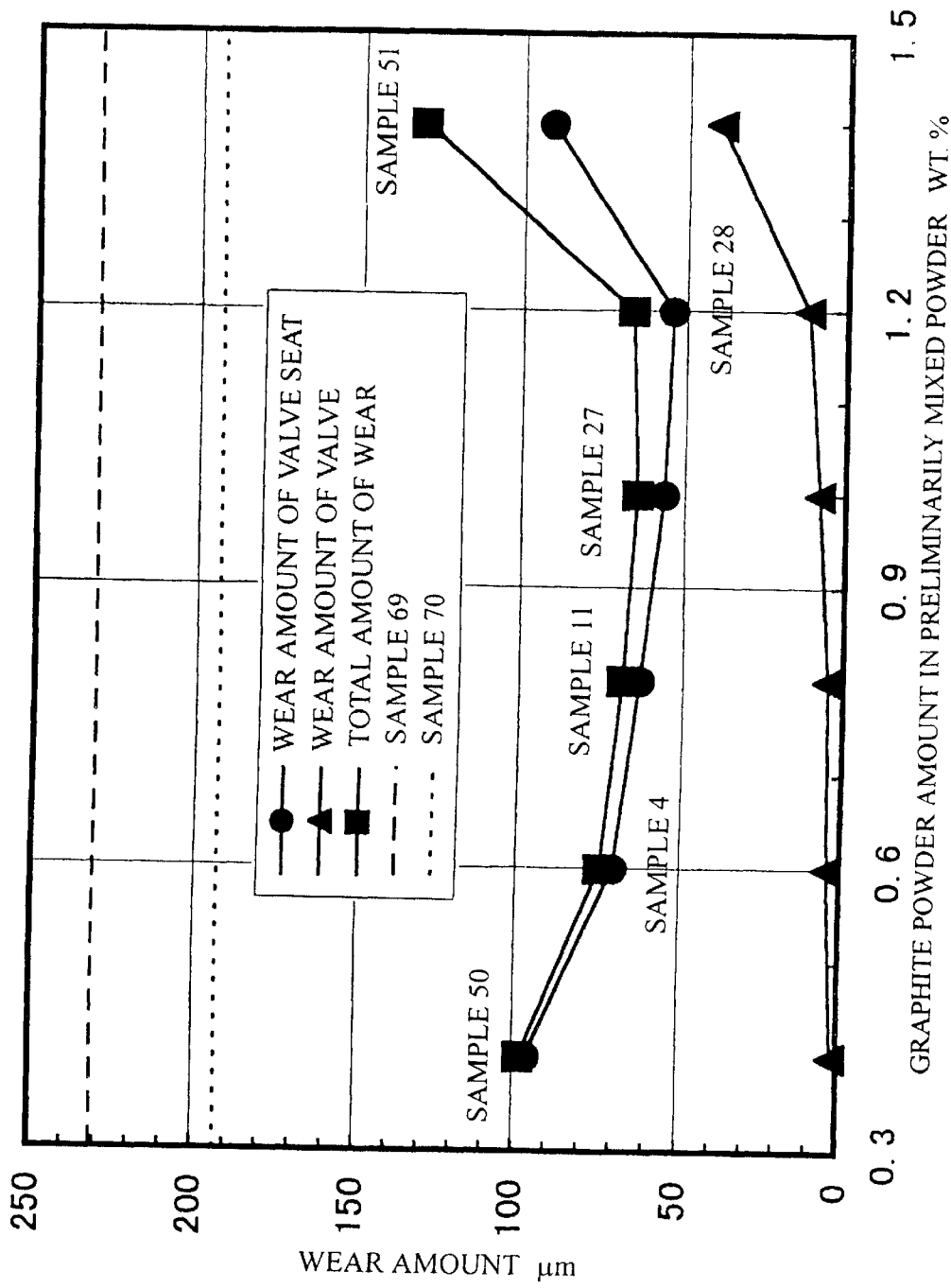
FIG. 15($a$) is a chart showing the relationship between the amount of addition of graphite powder in the preliminarily mixed power and the radial crushing strength, in the embodiment of the present invention.
Figure 15B:
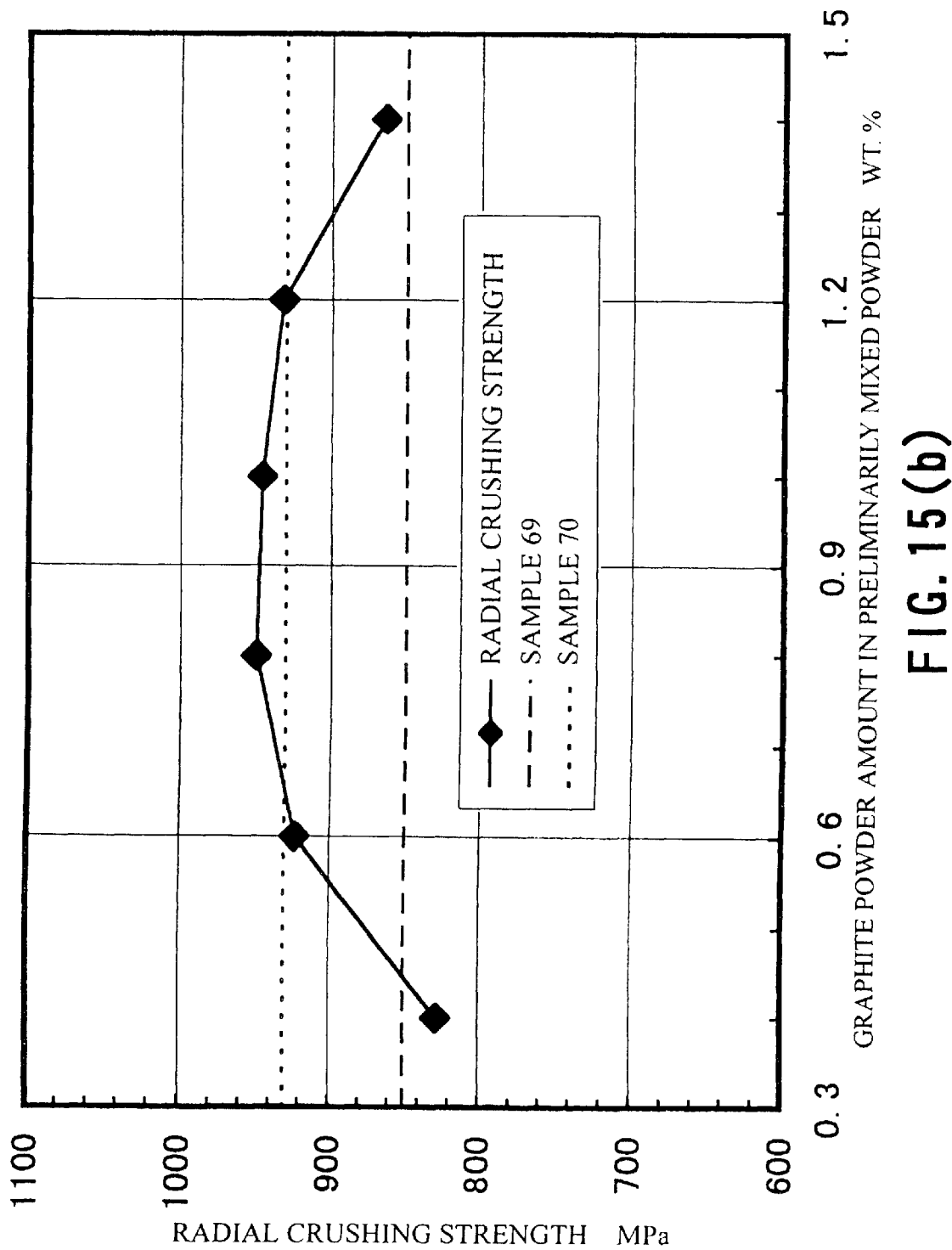

As apparent from FIG. 15(a), with the increase of the addition amounts of the graphite powers contained in the preliminarily mixed powders, the matrix is strengthened, and the wear amount of the valve seat tends to lower until the addition amount reaches 1.2% by weight. On the contrary, the wear amount of the valve tends to increase gradually. However, it is known that when the addition amounts of the graphite exceeds 1.2% by weight, the valve attackability is increased and the wear amounts of the valve are also abruptly increased because the cementite is precipitated to cause the matrix to be rather brittle so that the wear resistance is deteriorated. In this way, the total wear amounts of the valves and the valve sheets show stable and low values when the addition amounts of the graphite powders are in the range of 0.6 to 12.% by weight. Also, as shown in FIG. 15(b), as the addition amounts of the graphite powders are increased, the matrix is strengthened and the radial crush sterength is increased, but when the addition amounts of the graphite powders exceed 1.2% by weight, the radial crush sterength is rather lowered because of brittleness of the matrix due to precipitation of the cementite. In this way, it was confirmed that when the addition amounts of the graphite powders into the preliminarily mixed powders are in the range of 0.6 to 1.2% by weight, both the wear resistance and the strength are favorable.

Next, the sample Nos. 5, 6, 11, 25, 26, and 52 to 54 of Tables 8 and 9 are mutually different in the addition amounts of the C alloy powders to the mixed powers. By comparing the test results of the sintered alloys, it is checked how the difference in the addition amounts of the C alloy powders to be added to the mixed powders affect. The test results are shown in FIG. 16 together with the total wear amounts of the conventional sintered alloys of the sample Nos. 69 and 70.

Figure 16A:
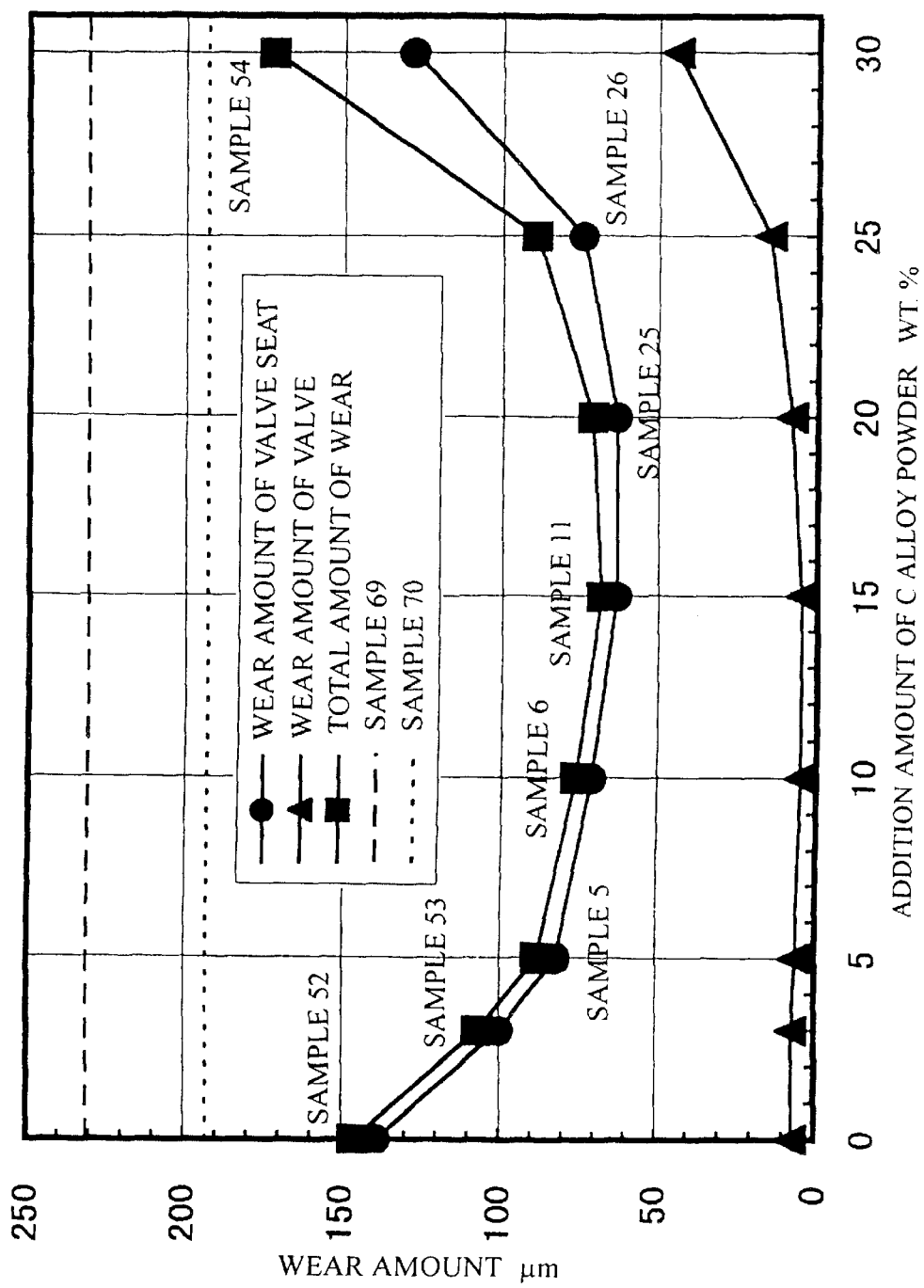
FIG. 16($a$) is a chart showing the relationship between the amount of addition of C alloy powder and the wear amount, in the embodiment of the present invention.
Figure 16:
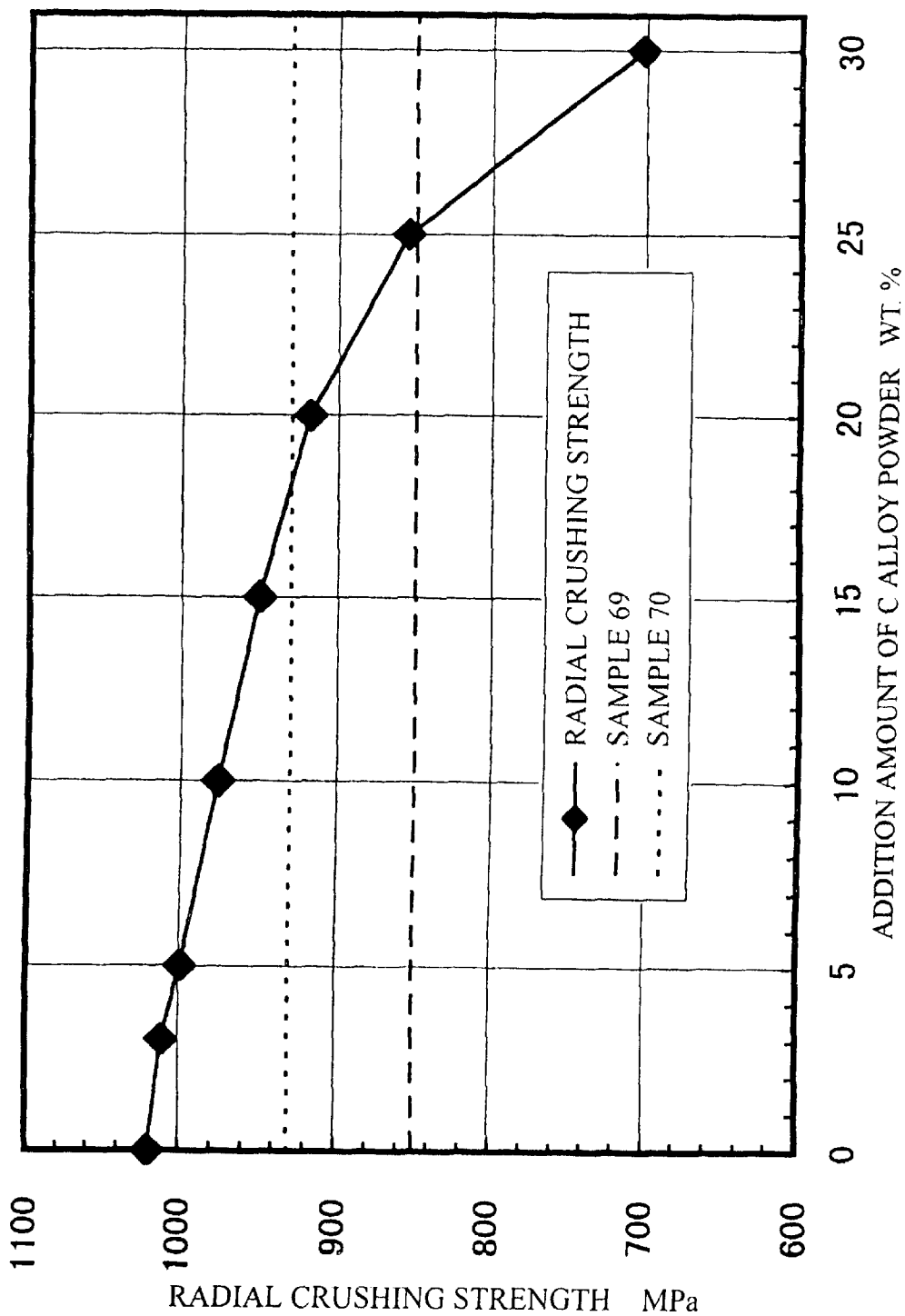

As shown in FIG. 16(a), with the addition of the C alloy powders, the wear amounts of the valve seats are lowered, and when the addition amounts of the C alloy powders are in the range of 5.0 to 25% by weight, the valves sheets exhibit favorable wear resistance. The wear amounts of the valves gradually increase from about the spot where the addition amounts of the C alloy powders exceed 15% by weight due to increase of the valve attackability. When the addition amounts exceed 25.0% by weight, the compactability during forming of a valve seat is lowered, and therefore, the green density is lowered and the strength of the sintered bodies is lowered, too. At the same time, due to increase of the valve attackability, the wear of the valve seats is also progressed because the worn particles of the valves act as abrasive grains. As a result, the wear amounts of the valve seat and the valve radically increase. Therefore, it is known that when the addition amounts of the C alloy powders are in the range of 5.0 to 25.0% by weight, a favorable wear resistance is exhibited. As shown in FIG. 16(b), when the addition amounts of the C alloy powders exceed 25.0% by weight, the radial crush sterength is abruptly lowered. From this, it is known that the green density is lowered and the strength is lowered.

Figure 17:
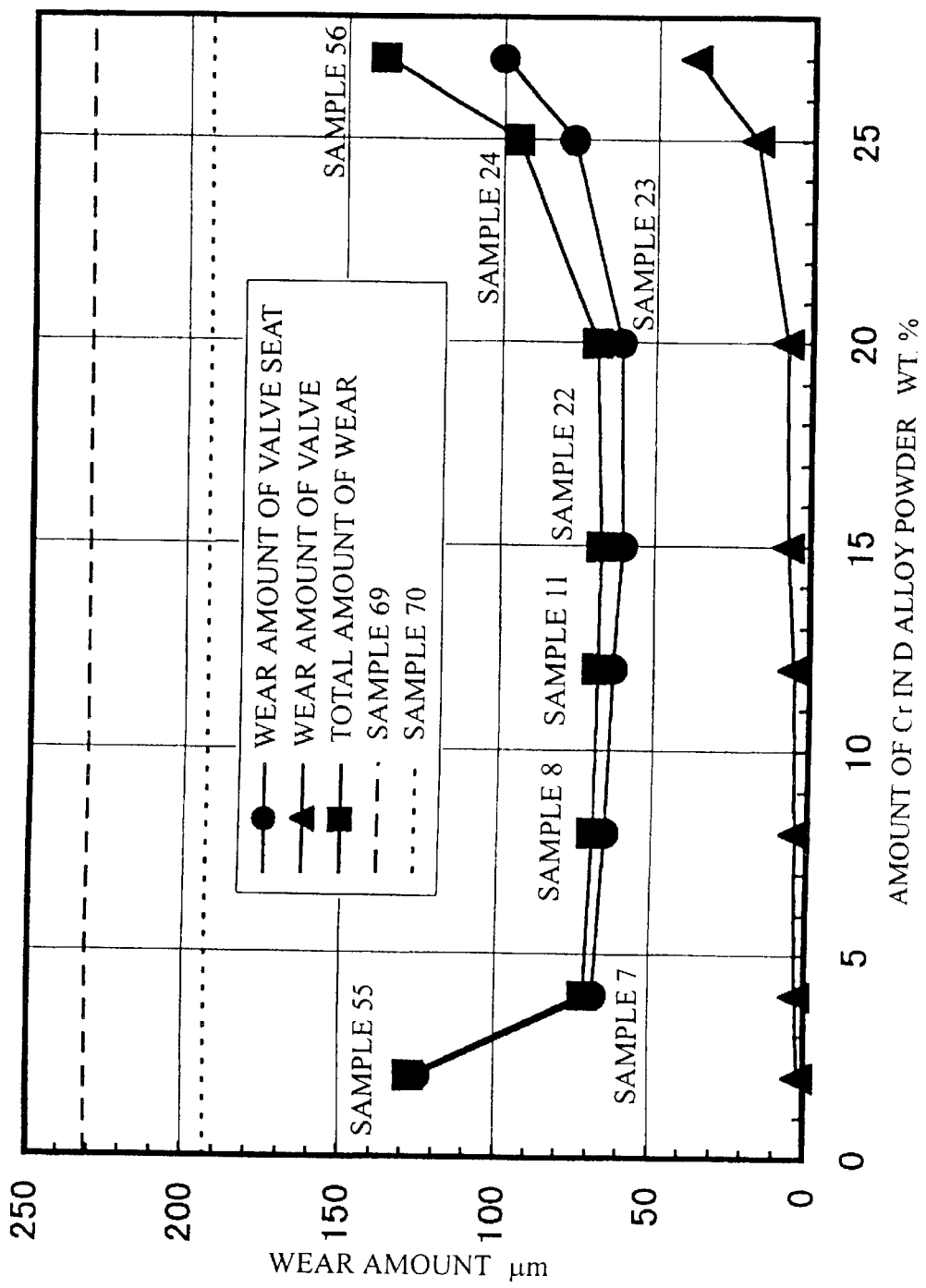
FIG. 17($a$) is a chart showing the relationship between the content of Cr in D alloy powder and the wear amount, in the embodiment of the present invention.

Next, the D alloy powders D1 to D8 of Table 7 are mutually different in the amounts of Cr contained in the D alloy powders. By comparing the test results of the sintered alloys of the sample Nos. 7, 8, 11, 22 to 24, 55, and 56 of Tables 8 and 9 using the D alloy powders D1 to D8, it is checked how the difference in the contents of Cr in the D alloy powders affect. The test results are shown in FIG. 17 together with the total wear amounts of the conventional sintered alloys of the sample Nos. 69, and 70.

Figure 17B:
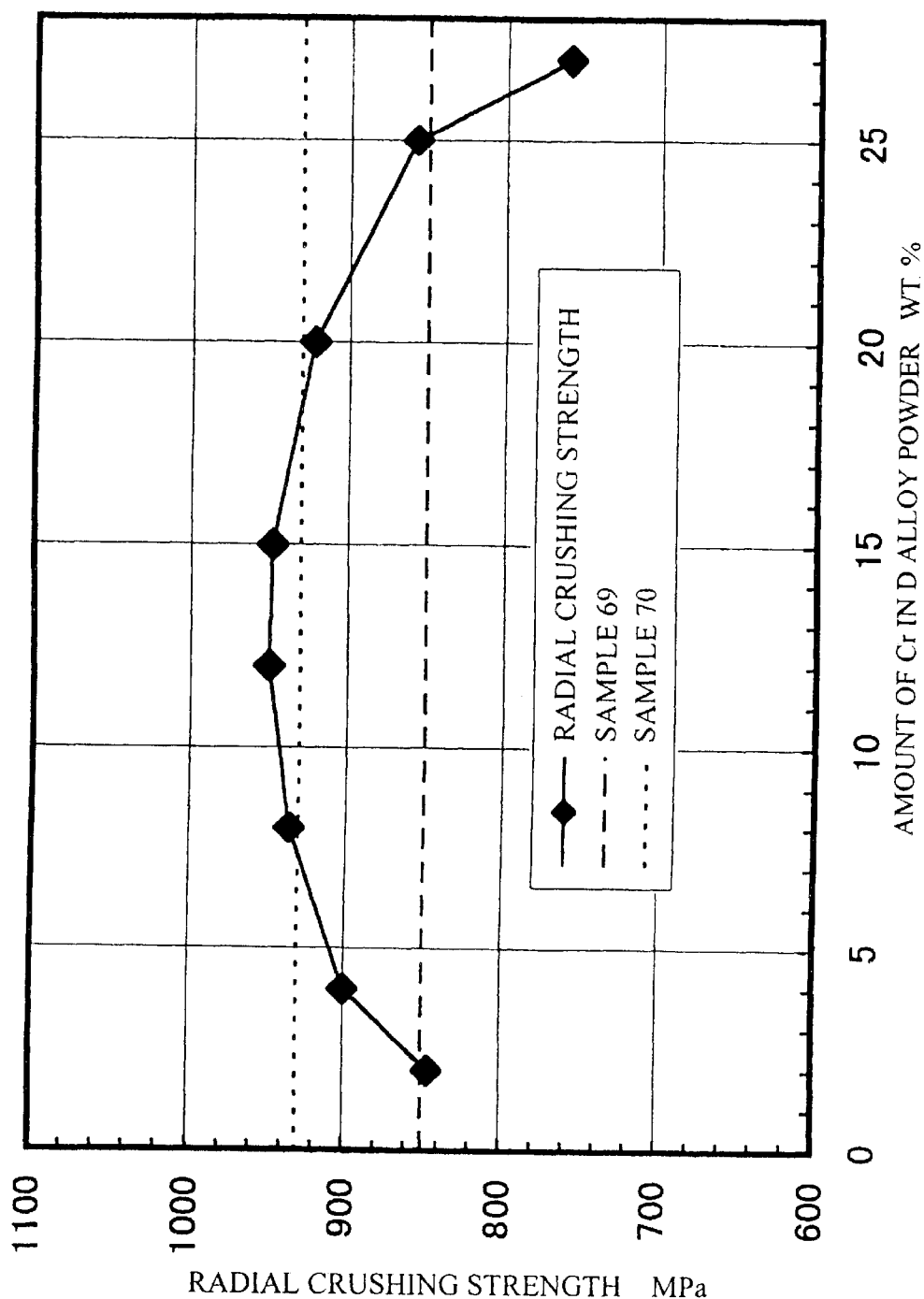

As shown in FIG. 17(a), when the contents of Cr in the D alloy powders are in the range of 4.0 to 25.0% by weight, the wear amounts of the valve seats are stable a low value. By making the contents of Cr contained in the D alloy powders in the range of 4.0 to 25.0% by weight (sample Nos. 7, 8, 11. 22 to 24), it was confirmed that the wear resistance becomes more favorable than the comparative alloy of the sample No. 70 (alloy of Japanese Patent Publication No. 98985/97). When the contents of Cr in the D alloy powders become lower than 4.0% by weight, the wear amounts of the valve seats are increased because the amount for forming the particle group by the Cr carbides is decreased and the amount of Cr to be diffused into the matrix to strengthen the matrix is decreased. On the other hand, when the contents of Cr in the D alloy powders exceed 25.0% by weight, the amount for forming the particle group increases and therefore, the valve attackability increases. As a consequence, the wear amounts of the valves abruptly increase. Moreover, the powders are hardened since the contents of Cr increase, so that the compacting properties of the powders are deteriorated, strength of the matrix is lowered. Furthermore, since the worn particles of the valves act as abrasive grains, the wear amounts of the valve seats are increased and the total wear amounts of both the valves and valve seats are increased. As shown in FIG. 17(b), the effects of the contents of Cr in the D alloy powders are significantly reflected to the radial crush sterength of the valve seats, which is high when the contents of Cr are in the range of 4.0 to 25.0% by weight.

In this way, it was confirmed that when the contents of Cr in the D alloy powders are in the range of 4.0 to 25.0% by weight, both the wear resistance and the strength are favorable. As apparent from FIG. 17(a), when the contents of Cr in the D alloy powders are 20.0% by weight or less, the wear amounts of the valve seat and the valve are stable at a rather low level. Thus, it is more preferable that the contents of Cr in the D alloy powders are 20.0% or less.

Figure 18A:
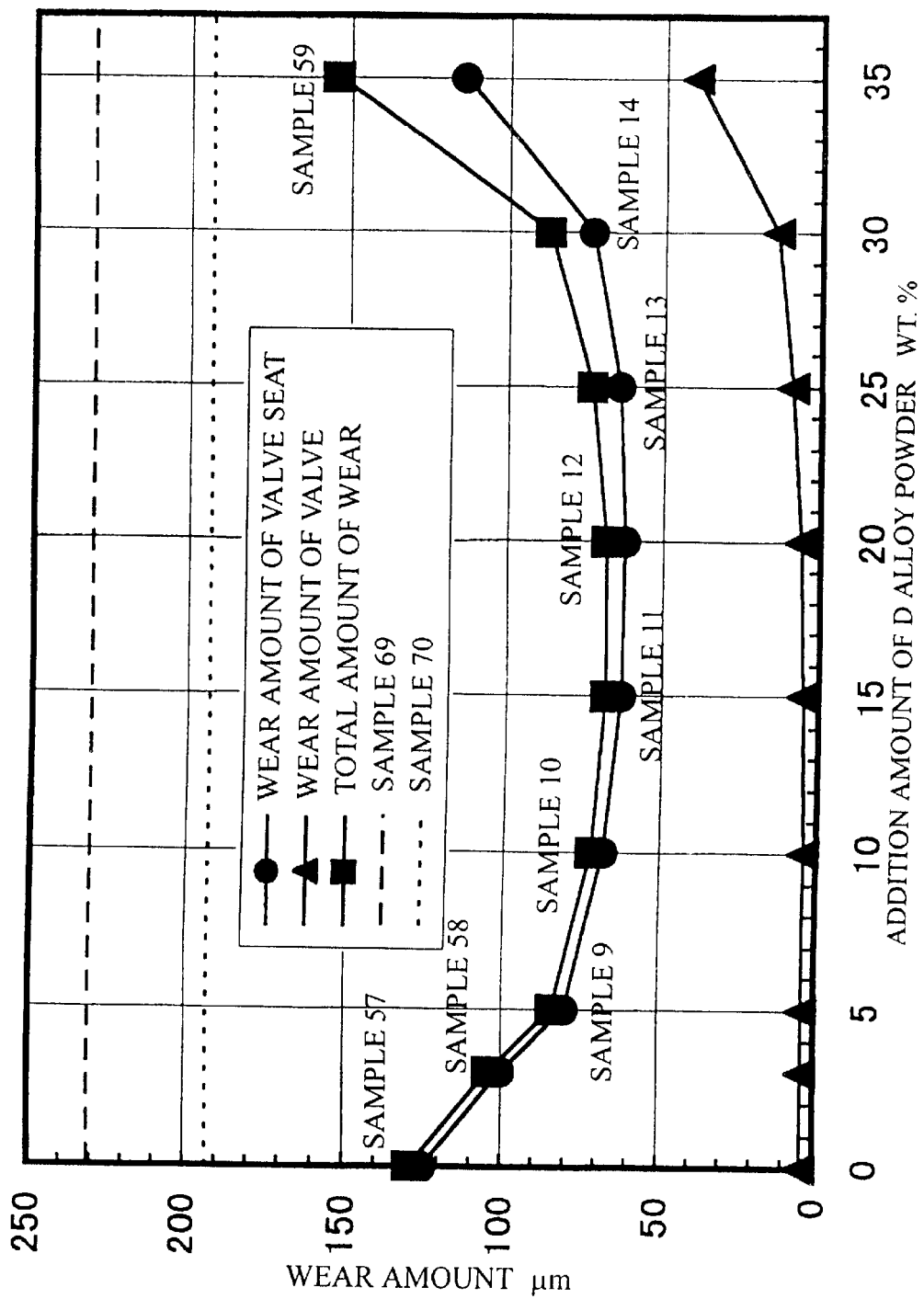
FIG. 18($a$) is a chart showing the relationship between the amount of addition of D alloy powder and the wear amount, in the embodiment of the present invention.
Figure 18B:
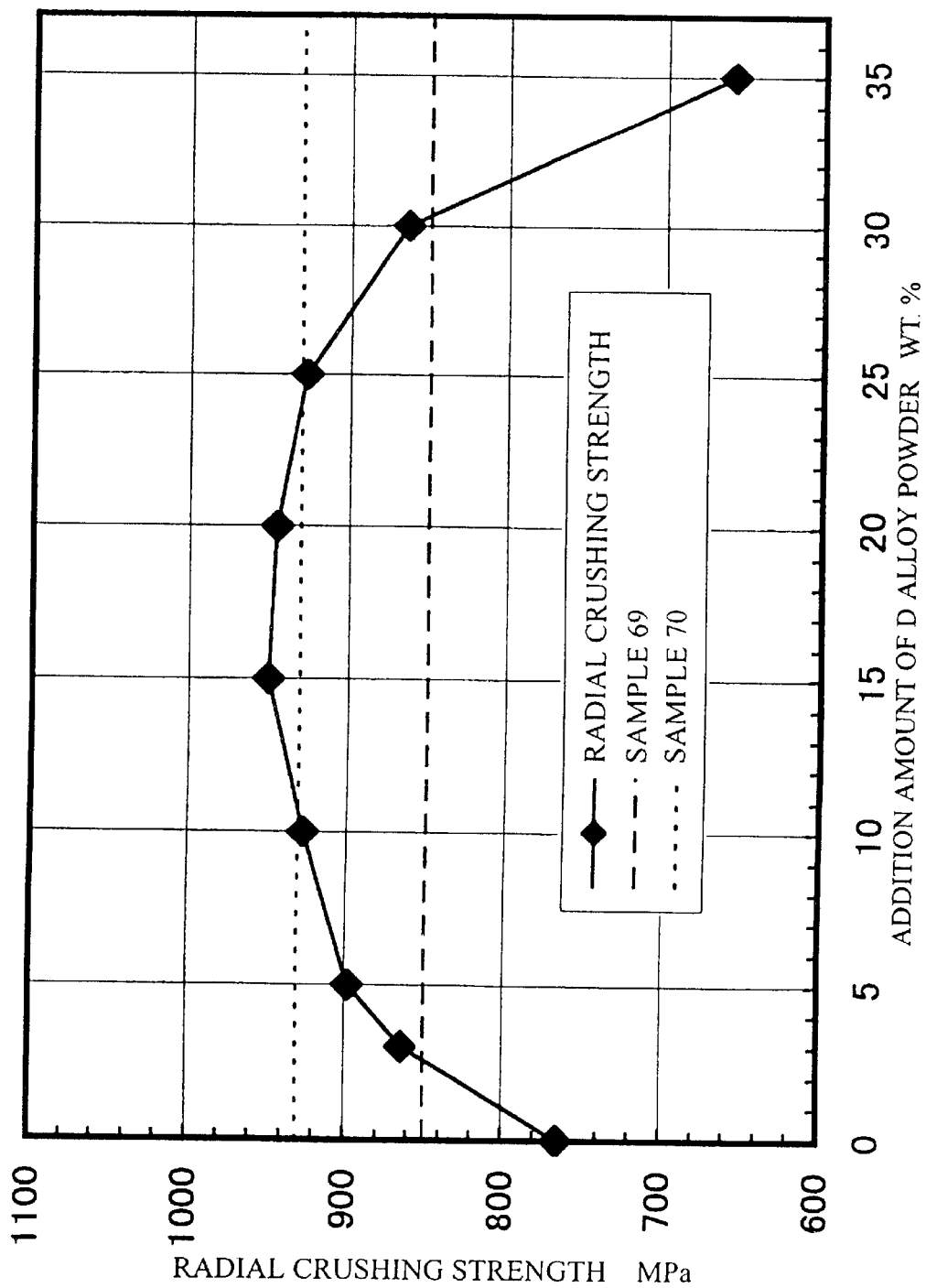

Next, the sample Nos. 9 to 14, and 57 to 59 of Tables 8 and 9 are different in the addition amounts of the D alloy powders to the mixed powders. By comparing the test results of those sintered alloys, it is checked how the differences of the addition amounts of the D alloy powders affect. The test results are shown in FIG. 18 together with the total wear amounts of the conventional sintered alloys of sample Nos. 69 and 70. As shown in FIG. 18(*a*), when the addition amounts of the D alloy powders are 3.0% by weight, the effect of the improvement of the wear resistance is insufficient because the addition amounts are too small. With the increase of the addition amounts from 5.0% by weight, the effect of the improvement of the wear resistance becomes significant. When the addition amounts of the D alloy powders are in the range of 5.0 to 30.0% by weight, the wear amounts of the valve seats are low and stable. However, when the addition amounts exceed 30.0% by weight, the strength of the matrix is lowered because the compactability of the powders is deteriorated. As a result, the wear amounts of the valve seats are increased and the valve attackability is increased. Thus, the total wear amounts are increased. Also, the effects of the addition amounts in the D alloy powders are significantly reflected to the radial crush sterength of the valve sheets, as shown in FIG. 18(*b*). The effects are high when the addition amounts are in the range of 5.0 to 30.0% by weight. In this way, it was confirmed that both the wear resistance and the strength are favorable when the addition amounts of the D alloy powders are in the range of 5.0 to 30.0% by weight.

Next, the E alloy powders E1 to E7 of Table 7 are obtained by further adding Mo, V, and W to the D alloy powers. By comparing the test results of the sintered alloys of the sample Nos. 15 to 21 shown in Table 8 to Table 11 using the E alloy powders E1 to E7, it is checked how the effects of the addition of Mo, V, and W to the D alloy powders affect. The test results are shown in FIG. 19 together with the total wear amounts of the sintered alloy power (the D alloy powder is added thereto) of the sample No. 11 containing no Mo, V and W.

Figure 19A:
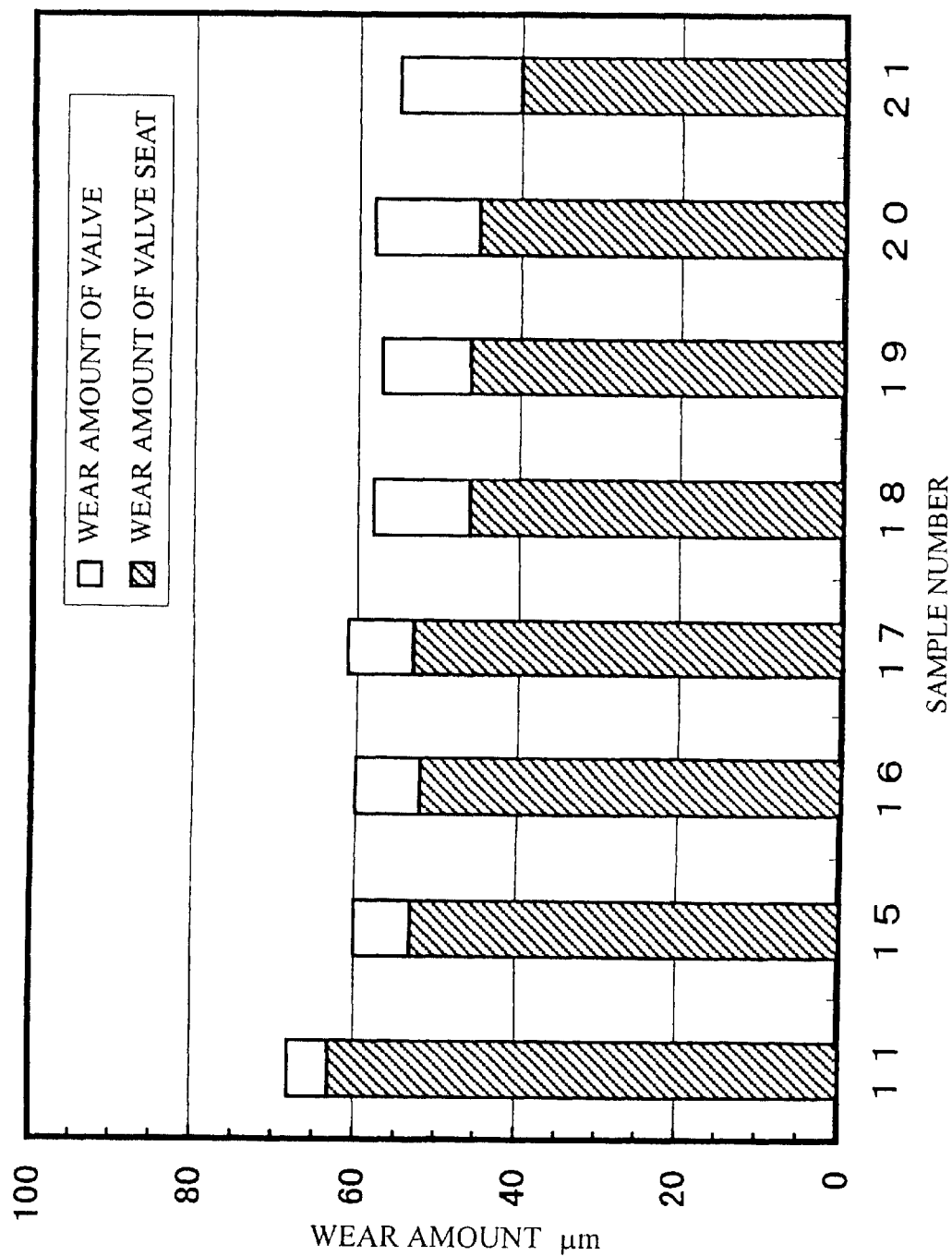
FIG. 19($a$) is a chart showing how the Mo, V and W in E alloy powder affects the wear amount, in the embodiment of the present invention.

As shown in FIG. 19(*a*), it is known that the sintered alloy consisting of the E alloy powder obtained by adding Mo, V, and W to the D alloy powder is less in the wear amount of the valve seat than the sintered alloys consisting of the D alloy powder without lowering the strength, less in the total wear amount, and further improved in the wear resistance.

Figure 20B:
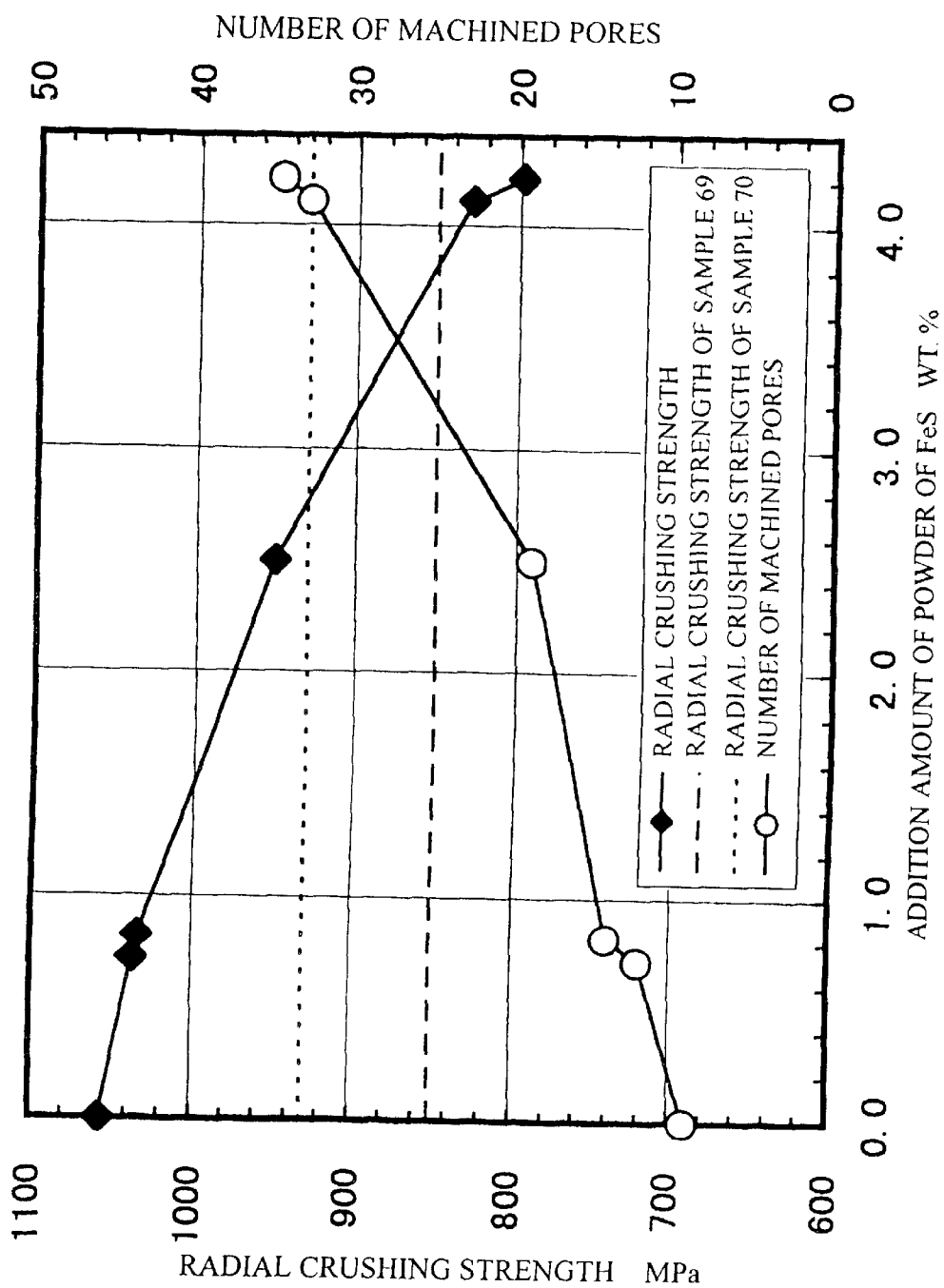
FIG. 20($a$) is a chart showing the relationship between the amount of addition of FeS powder and the wear amount, in the embodiment of the present invention.

Next, the sample Nos. 11, 32, 33, and 60 to 62 of Tables 8 and 9 are different in the addition amounts of the FeS powders to the mixed powders. By comparing the test results of those sintered alloys, it is checked how the differences of the addition amounts of the FeS powders affect. The test results are shown in FIG. 20 together with the total wear amounts of the conventional sintered alloys of sample Nos. 69 and 70. As shown in FIG. 20(*a*), when the addition amount of the FeS powder is 0.72% by weight, the effect of the improvement of the wear resistance is insufficient because the addition amounts are too small. With the increase of the addition amounts from 0.82% by weight, the effect of the improvement of the wear resistance becomes significant. When the addition amounts of the FeS powders are in the range of 0.82 to 4.11% by weight, the wear amounts of the valve seats are low and stable. However, when the addition amounts exceed 4.11% by weight, the strength of the matrix is lowered. As a result, the wear amounts of the valve seats increase. As shown in FIG. 20(*b*), with the addition of the FeS powder and the increase of the addition amounts thereof, the number of machined pores increase, thus improvement of the machinability was confirmed. Additionally, the radial crush sterength gradually decreases, and the decrease becomes radical when the addition amount exceeds 4.11% by weight. In this way, it was confirmed that the wear resistance, the machinability and the strength are favorable when the addition amounts of the FeS powders are in the range of 0.82 to 4.11% by weight.

Figure 21:
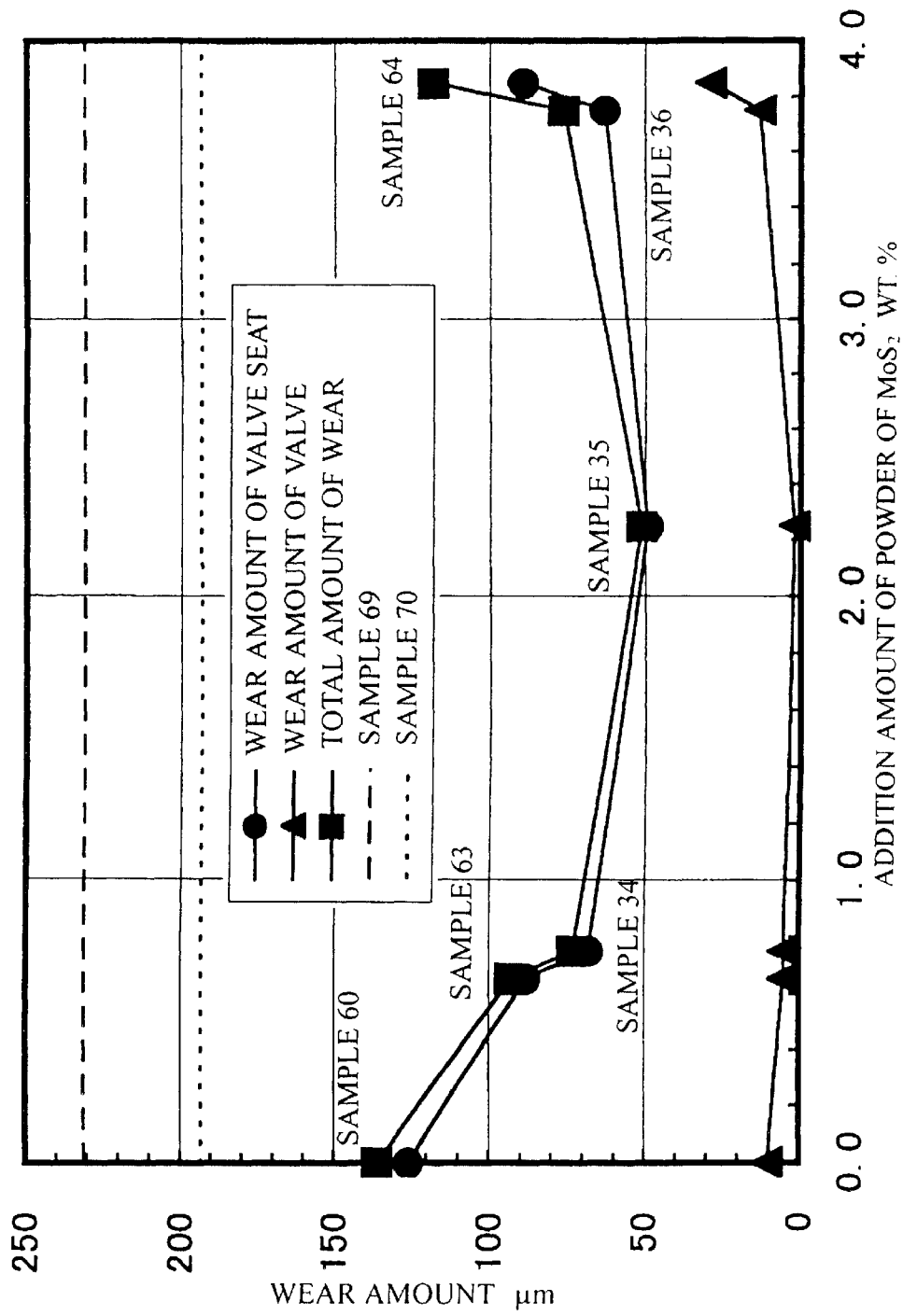
FIG. 21($a$) is a chart showing the relationship between the amount of addition of $MoS_2$ powder and the wear amount, in the embodiment of the present invention.
Figure 21B:
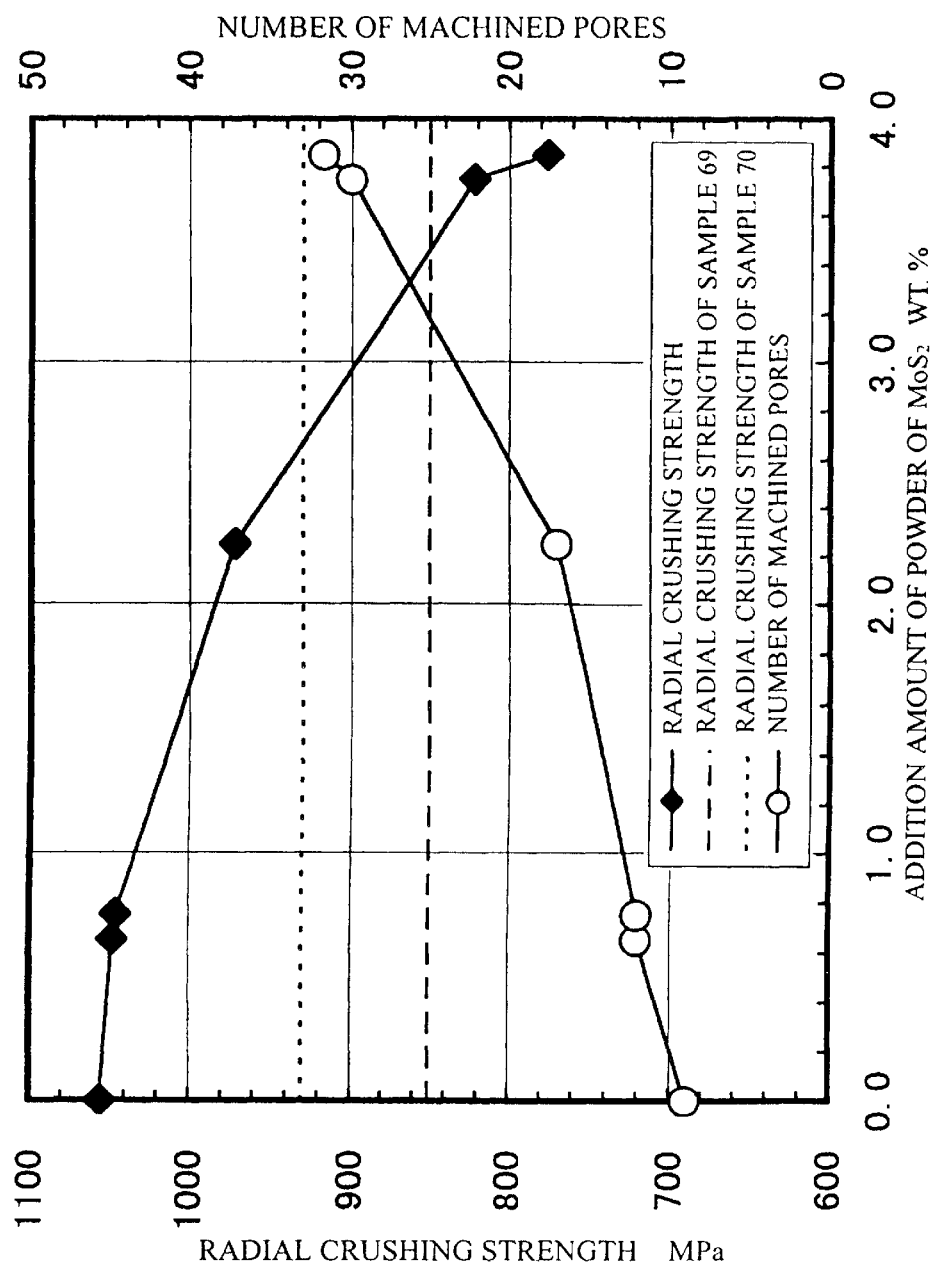

Next, the sample Nos. 34 to 36, 60,63, and 64 of Tables 8 and 9 are different in the addition amounts of the $MoS_2$ powders to the mixed powders. By comparing the test results of those sintered alloys, it is checked how the differences of the addition amounts of the $MoS_2$ powders affect. The test results are shown in FIG. 21 together with the total wear amounts of the conventional sintered alloys of sample Nos. 69 and 70. As shown in FIG. 21(*a*), when the addition amount of the $MoS_2$ powder is 0.65% by weight, the effect of the improvement of the wear resistance is insufficient because the addition amounts are too small. With the increase of the addition amount from 0.75% by weight, the effect of the improvement of the wear resistance becomes significant. When the addition amounts of the $MoS_2$ powders are in the range of 0.75 to 3.75% by weight, the wear amounts of the valve seats are low and stable. However, when the addition amounts exceed 3.75% by weight, the strength of the matrix is lowered. As a result, the wear amount of the valve seat increases. As shown in FIG. 21(*b*), with the increase of the addition amount of $MoS_2$, the number of machined pores increase, thus improvement of the machinability was confirmed. Additionally, the radial crush sterength is hardly lowered so far as the addition amount is 0.75% by weight due to the solid-solution strengthening of Mo. However, the strength is significantly lowered when the addition amount exceeds 0.75% by weight, the strength is radically lowered when the addition amount exceeds 3.75 by weight. In this way, it was confirmed that the wear resistance, the machinability and the strength are favorable when the addition amounts of the $MoS_2$ powders are in the range of 0.75 to 3.75% by weight.

Figure 22:
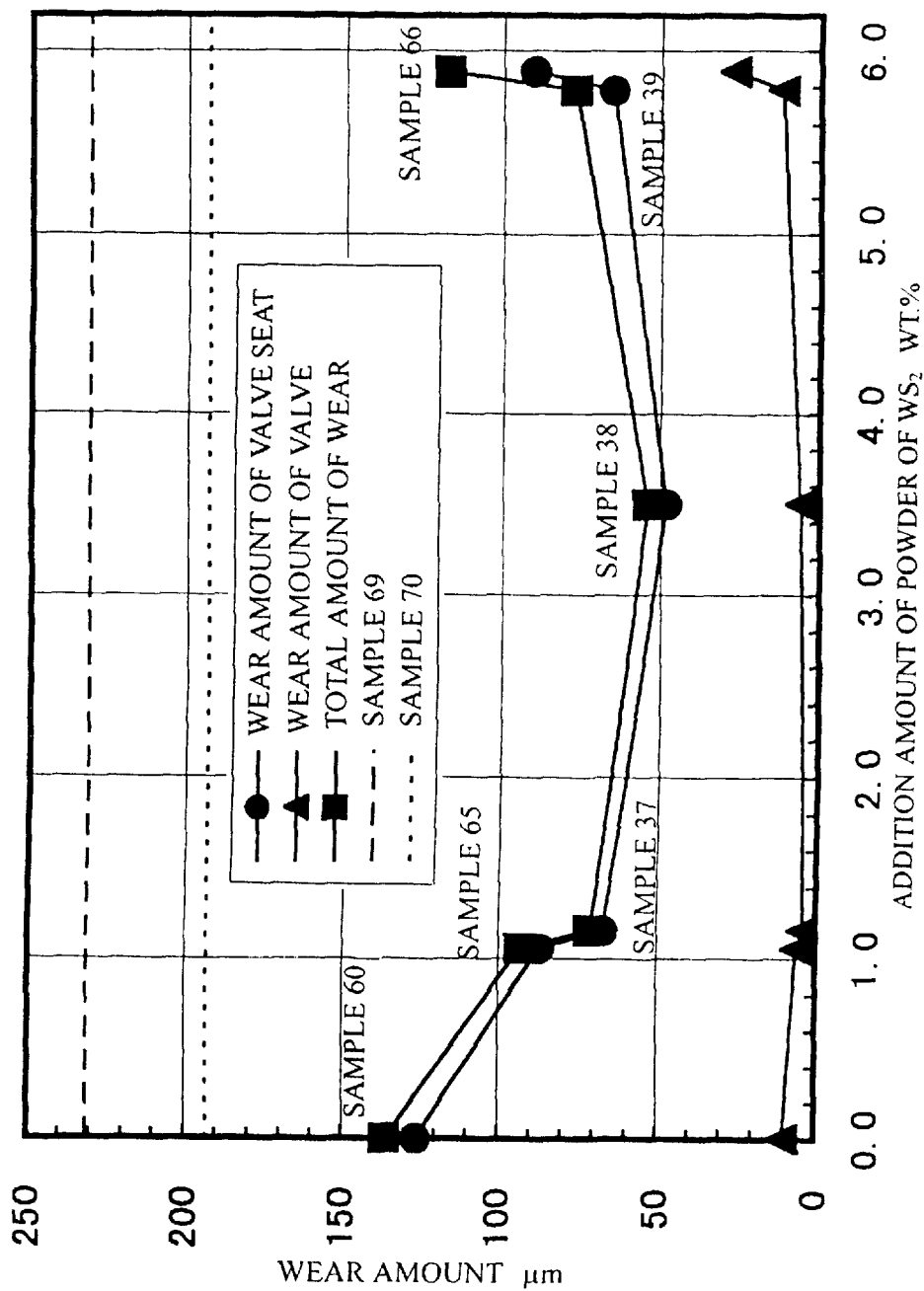
FIG. 22($a$) is a chart showing the relationship between the amount of addition of $WS_2$ powder and the wear amount, in the embodiment of the present invention.
Figure 22:
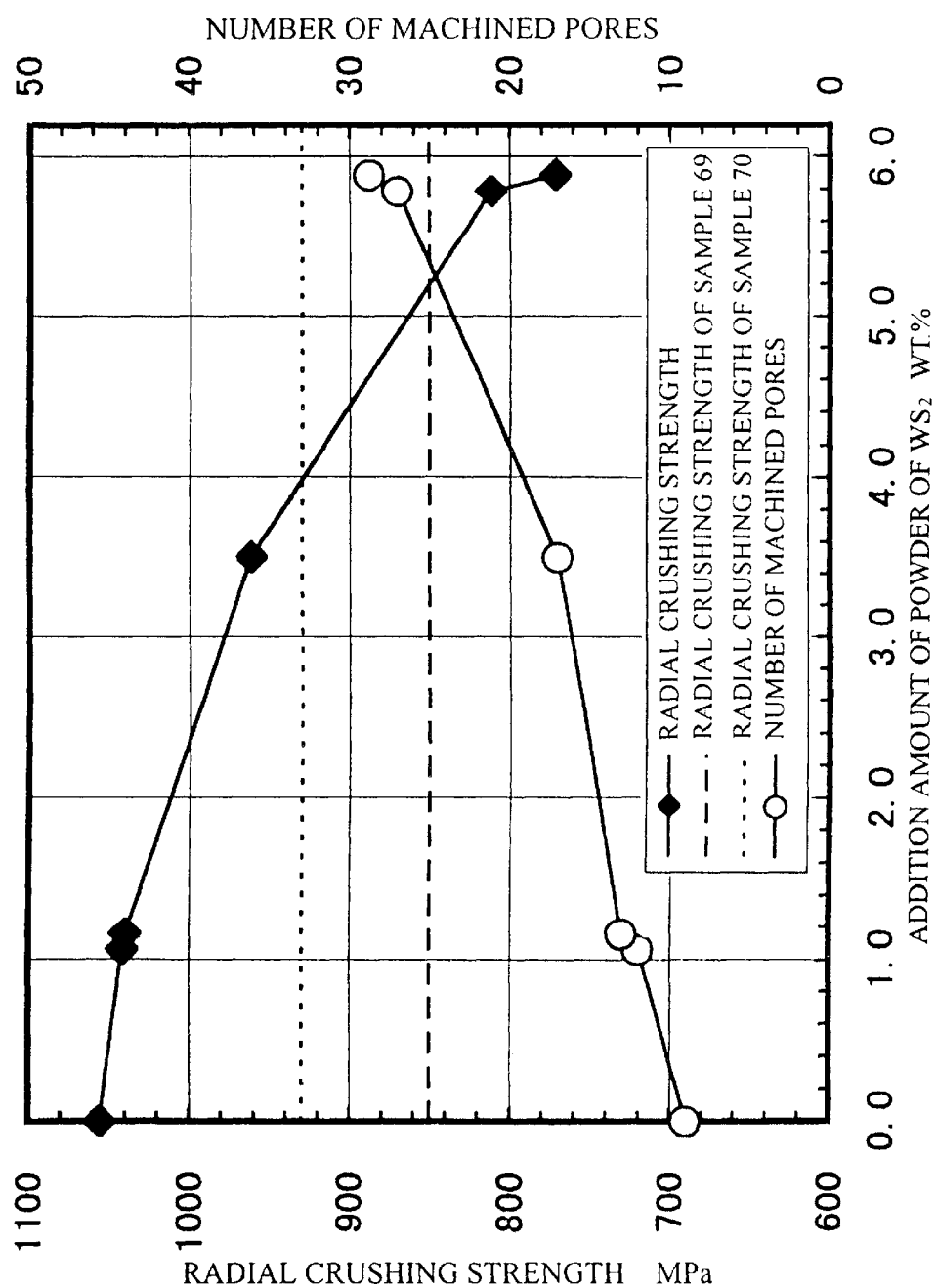

Next, the sample Nos. 37 to 39, 60, 65, and 66 of Tables 8 and 9 are different in the addition amounts of the $WS_2$ powders to the mixed powders. By comparing the test results of those sintered alloys, it is checked how the differences of the addition amounts of the $WS_2$ powders affect. The test results are shown in FIG. 22 together with the total wear amounts of the conventional sintered alloys of sample Nos. 69 and 70. As shown in FIG. 22(*a*), when the addition amount of the $WS_2$ powder is 1.06% by weight, the effect of the improvement of the wear resistance is insufficient because the addition amounts are too small. With the increase of the addition amount from 1.16% by weight, the effect of the improvement of the wear resistance becomes significant. When the addition amounts of the $WS_2$ powders are in the range of 1.16 to 5.79% by weight, the wear amounts of the valve seats are low and stable. However, when the addition amounts exceed 5.79% by weight, the strength of the matrix is lowered. As a result, the wear amount of the valve seat increases. As shown in FIG. 22(*b*), with the addition of $MoS_2$ and the increase of the addition amount thereof, the number of machined pores increase, thus improvement of the machinability is confirmed. Additionally, the radial crush sterength is hardly lowered so far as the addition amount is 1.16% by weight due to the solid-solution strengthening by W. However, the strength is significantly lowered when the addition amount exceeds 1.15% by weight, the strength is radically lowered when the addition amount exceeds 5.79% by weight. In this way, it was confirmed that the wear resistance, the machinability and the strength are favorable when the addition amounts of the WS$_2$ powders are in the range of 1.16 to 5.79% by weight.

Figure 23A:
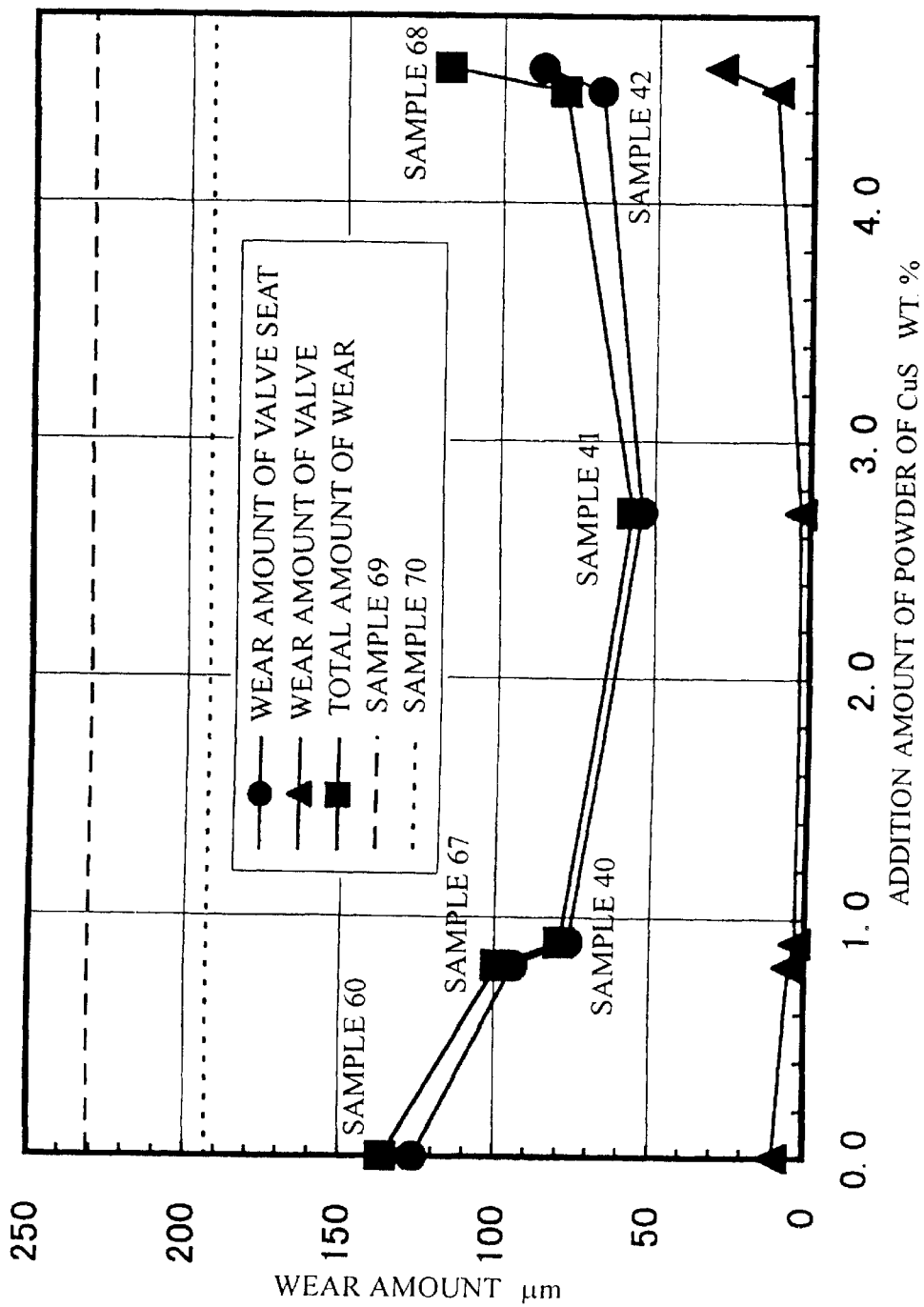
FIG. 23($a$) is a chart showing the relationship between the amount of addition of CuS powder and the wear amount, in the embodiment of the present invention.
Figure 23B:
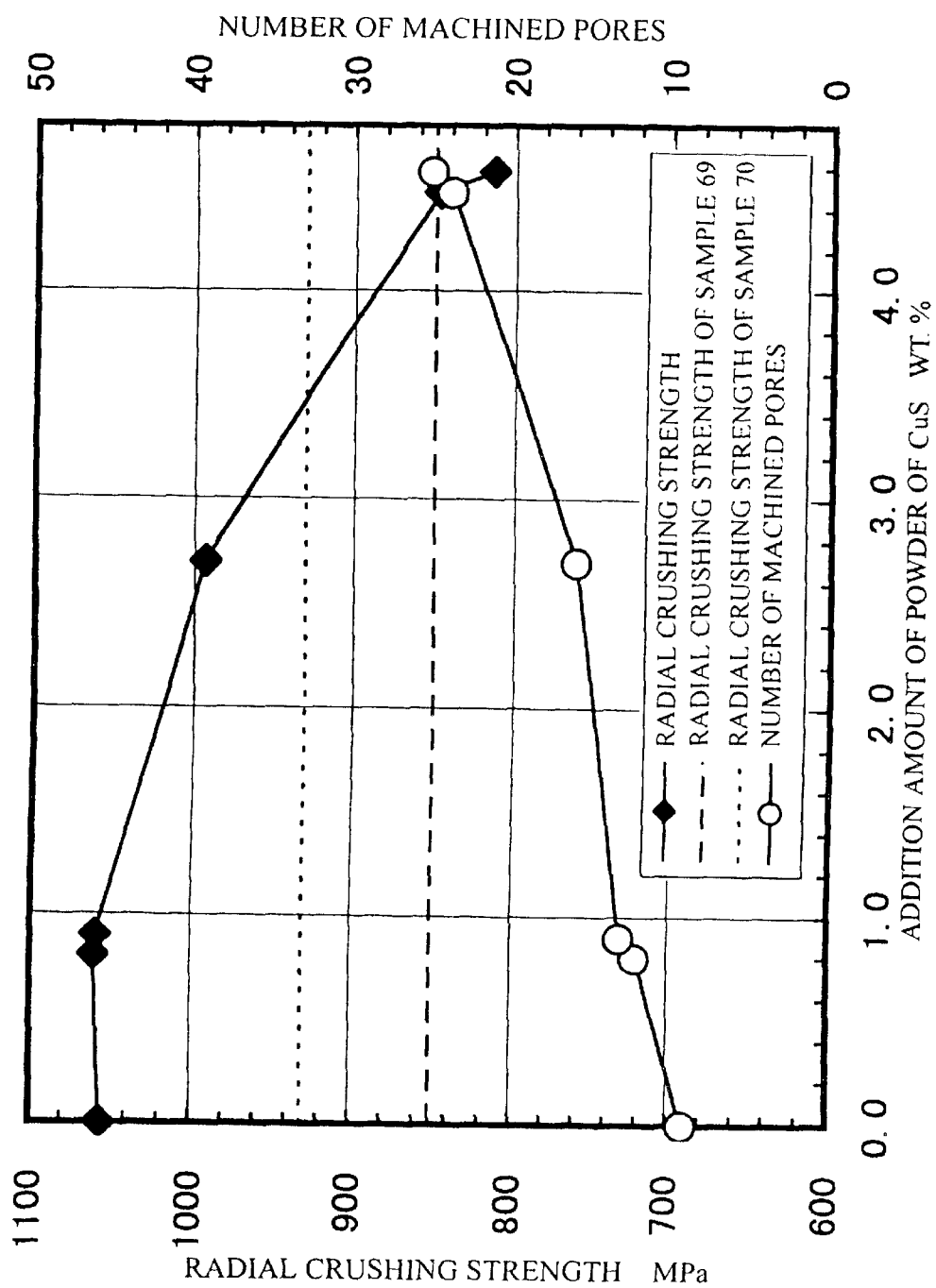

Next, the sample Nos. 40 to 42, 60, 67, and 68 of Tables 8 and 9 are different in the addition amounts of the CuS powders to the mixed powders. By comparing the test results of those sintered alloys, it is checked how the differences of the addition amounts of the CuS powders affect. The test results are shown in FIG. 23 together with the total wear amounts of the conventional sintered alloys of sample Nos. 69 and 70. As shown in FIG. 23(a), when the addition amount of the CuS powder is 0.8% by weight, the effect of the improvement of the wear resistance is insufficient because the addition amounts are too small. With the increase of the addition amount from 0.9% by weight, the effect of the improvement of the wear resistance becomes significant. When the addition amounts of the CuS powders are in the range of 0.9 to 4.48% by weight, the wear amounts of the valve seats are low and stable. However, when the addition amounts exceed 4.48% by weight, the strength is lowered. As a result, the wear amount of the valve seat increases. As shown in FIG. 23(b), with the addition of CuS and the increase of the addition amount thereof, the number of machined pores increase, thus improvement of the machinability is confirmed. Additionally, the radial crush strength gradually increases so far as the addition amount is 0.9% by weight due to the effect upon the solid-solution strengthening and the improvement of hardening property of the matrix. However, the strength is gradually lowered and radically lowered when the addition amount exceeds 5.79% by weight. In this way, it was confirmed that the wear resistance, the machinability and the strength are favorable when the addition amounts of the CuS powders are in the range of 1.16 to 5.79% by weight.

Evaluation Test 2

Next, the preliminarily mixed power of the powder No. Y5 of Table 6, the C alloy powder of Fe-28Mo-8Cr-2.5Si, and the D alloy powder of the powder No. 3 of Table 7 and FeS powder were added and mixed with a manganese sulfide powder, a lead powder, a boron nitride powder, or a MgSiO$_3$ powder as meta-magnesium silicate mineral powder at the adding and mixing ratios shown in Table 14, and compacted and sintered in the same conditions as in the Evaluation Test 1. By doing so, alloys 71 to 86 having the chemical positions shown in Table 15, and comparative alloys 87 to 94 were prepared. Further, by infiltrating or impregnating lead, copper or acrylic resin into the pores of the alloy of the sample Nos. 11, 95 to 97 were prepared.

The sintered alloys thus prepared were subjected to radial crush sterength test, simplified wear test, and machinability test. The results are shown in Table 16 and FIGS. 24 through 28.

TABLE 14

| | Preliminarily Mixed Powder | | | D Alloy Powder | | Mixing Ratio wt. % | | | | | |
|---|---|---|---|---|---|---|---|---|---|---|---|
| Sample No. | Powder No. | Addition Amount | C Alloy Powder | Powder No. | Addition Amount | Fe Powder | MnS Powder | Pb Powder | BN Powder | MgSiO$_3$ Powder | Infilteration/ Impregnation |
| 71 | Y5 | 67.20 | 15.00 | D3 | 15.00 | 2.50 | 0.30 | | | | |
| 72 | Y5 | 67.00 | 15.00 | D3 | 15.00 | 2.50 | 0.50 | | | | |
| 73 | Y5 | 66.50 | 15.00 | D3 | 15.00 | 2.50 | 1.00 | | | | |
| 74 | Y5 | 65.50 | 15.00 | D3 | 15.00 | 2.50 | 2.00 | | | | |
| 75 | Y5 | 67.20 | 15.00 | D3 | 15.00 | 2.50 | | 0.30 | | | |
| 76 | Y5 | 67.00 | 15.00 | D3 | 15.00 | 2.50 | | 0.50 | | | |
| 77 | Y5 | 66.50 | 15.00 | D3 | 15.00 | 2.50 | | 1.00 | | | |
| 78 | Y5 | 65.50 | 15.00 | D3 | 15.00 | 2.50 | | 2.00 | | | |
| 79 | Y5 | 67.20 | 15.00 | D3 | 15.00 | 2.50 | | | 0.30 | | |
| 80 | Y5 | 67.00 | 15.00 | D3 | 15.00 | 2.50 | | | 0.50 | | |
| 81 | Y5 | 66.50 | 15.00 | D3 | 15.00 | 2.50 | | | 1.00 | | |
| 82 | Y5 | 65.50 | 15.00 | D3 | 15.00 | 2.50 | | | 2.00 | | |
| 83 | Y5 | 67.20 | 15.00 | D3 | 15.00 | 2.50 | | | | 0.30 | |
| 84 | Y5 | 67.00 | 15.00 | D3 | 1500 | 2.50 | | | | 0.50 | |
| 85 | Y5 | 66.50 | 15.00 | D3 | 15.00 | 2.50 | | | | 1.00 | |
| 86 | Y5 | 65.50 | 15.00 | D3 | 15.00 | 2.50 | | | | 2.00 | |
| 87 | Y5 | 67.30 | 15.00 | D3 | 15.00 | 2.50 | 0.20 | | | | |
| 88 | Y5 | 64.50 | 15.00 | D3 | 15.00 | 2.50 | 3.00 | | | | |
| 89 | Y5 | 68.30 | 14.00 | D3 | 15.00 | 2.50 | | 0.20 | | | |
| 90 | Y5 | 64.50 | 15.00 | D3 | 15.00 | 2.50 | | 3.00 | | | |
| 91 | Y5 | 67.30 | 15.00 | D3 | 15.00 | 2.50 | | | 0.20 | | |
| 92 | Y5 | 64.50 | 15.00 | D3 | 15.00 | 2.50 | | | 3.00 | | |
| 93 | Y5 | 67.30 | 15.00 | D3 | 15.00 | 2.50 | | | | 0.20 | |
| 94 | Y5 | 64.50 | 15.00 | D3 | 15.00 | 2.50 | | | | 3.00 | |
| 95 | Y5 | 67.50 | 15.00 | D3 | 15.00 | 2.50 | | | | | Pb Infilteration |
| 96 | Y5 | 67.50 | 15.00 | D3 | 15.00 | 2.50 | | | | | Cu Infilteration |
| 97 | Y5 | 67.50 | 15.00 | D3 | 15.00 | 2.50 | | | | | Resin Impregnation |

TABLE 15

| Sample No. | Fe | Ni | Cr | Co | Mo | V | Si | C | S | MnS | Pb | BN | MgSiO₃ |
|---|---|---|---|---|---|---|---|---|---|---|---|---|---|
| 71 | Balance | 6.72 | 3.90 | 11.17 | 4.74 | 0.09 | 0.38 | 0.75 | 0.91 | 0.30 | | | |
| 72 | Balance | 6.70 | 3.90 | 11.17 | 4.74 | 0.09 | 0.38 | 0.75 | 0.91 | 0.50 | | | |
| 73 | Balance | 6.65 | 3.89 | 11.15 | 4.73 | 0.09 | 0.38 | 0.74 | 0.91 | 1.00 | | | |
| 74 | Balance | 6.55 | 3.88 | 11.12 | 4.72 | 0.09 | 0.38 | 0.73 | 0.91 | 2.00 | | | |
| 75 | Balance | 6.72 | 3.90 | 11.17 | 4.74 | 0.09 | 0.38 | 0.75 | 0.91 | | 0.30 | | |
| 76 | Balance | 6.70 | 3.90 | 11.17 | 4.74 | 0.09 | 0.38 | 0.75 | 0.91 | | 0.50 | | |
| 77 | Balance | 6.65 | 3.89 | 11.15 | 4.73 | 0.09 | 0.38 | 0.74 | 0.91 | | 1.00 | | |
| 78 | Balance | 6.55 | 3.88 | 11.12 | 4.72 | 0.09 | 0.38 | 0.73 | 0.91 | | 2.00 | | |
| 79 | Balance | 6.72 | 3.90 | 11.17 | 4.74 | 0.09 | 0.38 | 0.75 | 0.91 | | | 0.30 | |
| 80 | Balance | 6.70 | 3.90 | 11.17 | 4.74 | 0.09 | 0.38 | 0.75 | 0.91 | | | 0.50 | |
| 81 | Balance | 6.65 | 3.89 | 11.15 | 4.73 | 0.09 | 0.38 | 0.74 | 0.91 | | | 1.00 | |
| 82 | Balance | 6.55 | 3.88 | 11.12 | 4.72 | 0.09 | 0.38 | 0.73 | 0.91 | | | 2.00 | |
| 83 | Balance | 6.72 | 3.90 | 11.17 | 4.74 | 0.09 | 0.38 | 0.75 | 0.91 | | | | 0.30 |
| 84 | Balance | 6.70 | 3.90 | 11.17 | 4.74 | 0.09 | 0.38 | 0.75 | 0.91 | | | | 0.50 |
| 85 | Balance | 6.65 | 3.89 | 11.15 | 4.73 | 0.09 | 0.38 | 0.74 | 0.91 | | | | 1.00 |
| 86 | Balance | 6.55 | 3.88 | 11.12 | 4.72 | 0.09 | 0.38 | 0.73 | 0.91 | | | | 2.00 |
| 87 | Balance | 6.73 | 3.90 | 11.18 | 4.74 | 0.09 | 0.38 | 0.75 | 0.91 | 0.20 | | | |
| 88 | Balance | 6.45 | 3.86 | 11.10 | 4.72 | 0.08 | 0.38 | 0.73 | 0.91 | 3.00 | | | |
| 89 | Balance | 6.83 | 3.84 | 10.59 | 4.47 | 0.09 | 0.35 | 0.76 | 0.91 | | 0.20 | | |
| 90 | Balance | 6.45 | 3.86 | 11.10 | 4.72 | 0.08 | 0.38 | 0.73 | 0.91 | | 3.00 | | |
| 91 | Balance | 6.73 | 3.90 | 11.18 | 4.74 | 0.09 | 0.38 | 0.75 | 0.91 | | | 0.20 | |
| 92 | Balance | 6.45 | 3.86 | 11.10 | 4.72 | 0.08 | 0.38 | 0.73 | 0.91 | | | 3.00 | |
| 93 | Balance | 6.73 | 3.90 | 11.18 | 4.74 | 0.09 | 0.38 | 0.75 | 0.91 | | | | 0.20 |
| 94 | Balance | 6.45 | 3.86 | 11.10 | 4.72 | 0.08 | 0.38 | 0.73 | 0.91 | | | | 3.00 |
| 95 | Balance | 6.75 | 3.90 | 11.18 | 4.74 | 0.09 | 0.38 | 0.75 | 0.91 | | | | |
| 96 | Balance | 6.75 | 3.90 | 11.18 | 4.74 | 0.09 | 0.38 | 0.75 | 0.91 | | | | |
| 97 | Balance | 6.75 | 3.90 | 11.18 | 4.74 | 0.09 | 0.38 | 0.75 | 0.91 | | | | |

Constituent Composition as a While wt. %

TABLE 16

| Sample No. | Wear Amount μm Valve Seat | Wear Amount μm Valve | Wear Amount μm Total | Radial Crushing Strength MPa | Number of Machined Pores | Note |
|---|---|---|---|---|---|---|
| 71 | 60 | 5 | 65 | 941 | 22 | |
| 72 | 59 | 4 | 63 | 931 | 24 | |
| 73 | 58 | 4 | 62 | 900 | 27 | |
| 74 | 65 | 6 | 71 | 863 | 35 | |
| 75 | 58 | 5 | 63 | 940 | 22 | |
| 76 | 55 | 4 | 59 | 933 | 24 | |
| 77 | 51 | 3 | 54 | 920 | 29 | |
| 78 | 57 | 3 | 60 | 873 | 39 | |
| 79 | 57 | 3 | 60 | 941 | 21 | |
| 80 | 56 | 2 | 58 | 936 | 22 | |
| 81 | 55 | 2 | 57 | 926 | 26 | |
| 82 | 59 | 5 | 64 | 883 | 28 | |
| 83 | 61 | 4 | 65 | 946 | 22 | |
| 84 | 61 | 4 | 65 | 941 | 23 | |
| 85 | 59 | 5 | 64 | 928 | 25 | |
| 86 | 68 | 6 | 74 | 880 | 28 | |
| 87 | 62 | 4 | 66 | 944 | 19 | |
| 88 | 110 | 30 | 140 | 733 | 38 | |
| 89 | 61 | 5 | 66 | 944 | 19 | |
| 90 | 105 | 33 | 138 | 725 | 41 | |
| 91 | 60 | 5 | 65 | 945 | 18 | |
| 92 | 109 | 27 | 136 | 737 | 35 | |
| 93 | 63 | 4 | 67 | 948 | 19 | |
| 94 | 107 | 30 | 137 | 741 | 33 | |
| 95 | 50 | 4 | 54 | 957 | 54 | Pb Infiltration |
| 96 | 60 | 6 | 66 | 1001 | 36 | Cu Infiltration |
| 97 | 61 | 5 | 66 | 951 | 82 | Resin Impregnation |

Figure 24A:
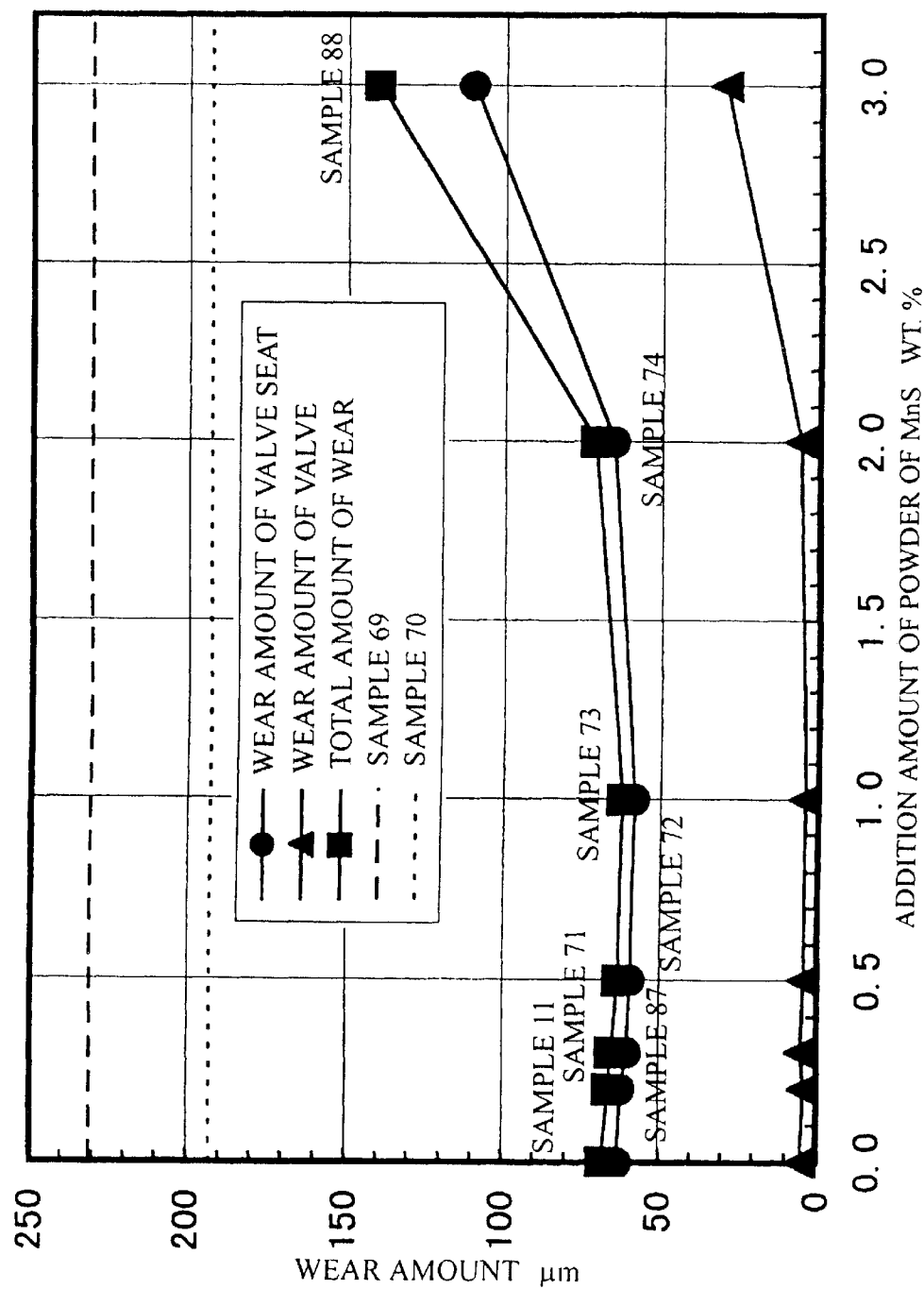
FIG. 24($a$) is a chart showing the relationship between the amount of addition of manganese sulfide powder and the wear amount, in the embodiment of the present invention.
Figure 24B:
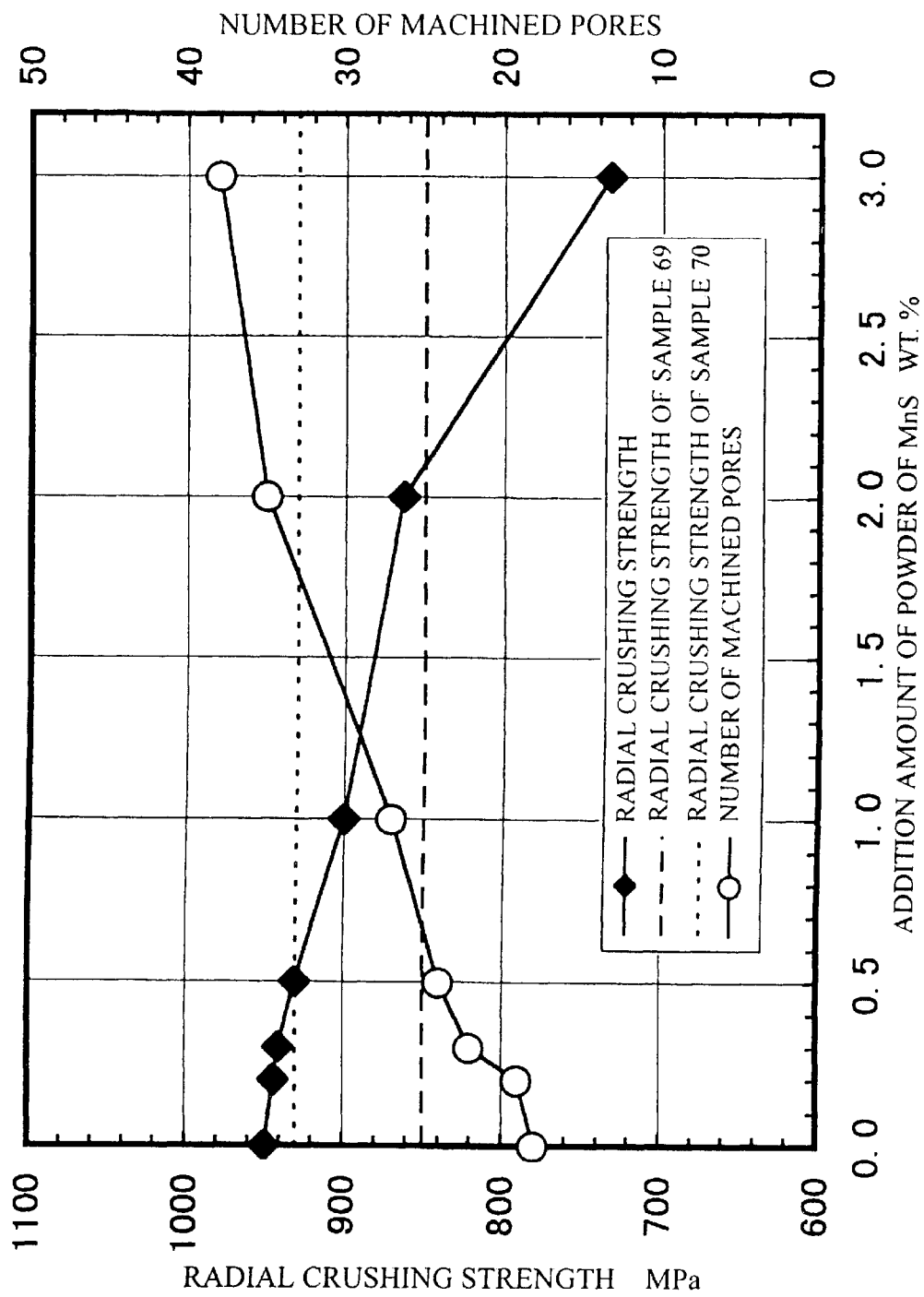

Next, by comparing the test results of the sintered alloys of the sample Nos. 11, 71 to 74, 87, and 88 of Table 14 and Table 15 the effect of the addition amounts of manganese sulfide is checked. The test results are shown in FIG. 24 together with the total wear amounts of the conventional sintered alloys of the sample Nos. 69 and 70. As shown in FIG. 24(b), the improvement of the wear resistance becomes significant when the addition amount of the manganese sulfide powder is 0.3% or more by weight. With the increase of addition of the manganese sulfide powders, the machinability is improved under the effect of the manganese sulfide particles dispersed in the matrix. However, the radial crush sterength is lowered because the diffusion of powders are interrupted by the manganese sulfide powders when the sintering is carried out, and as a result, the strength of the matrix is lowered. Also, as shown in FIG. 24(a), the wear amounts of the valve seats are small although it is slightly increased and exhibit favorable wear resistance until the addition amounts of the manganese sulfide reach 2.0% by weight. When the addition amounts exceed 2.0% by weight, the wear amounts are increased under the effect of the lowering of the strength of the matrix. From this, it became apparent that the machinability can be improved within the limit that the strength and wear resistance are not deteriorated, when the addition amounts of the manganese sulfide powders are in the range of 0.3 to 2.0% by weight.

Figure 25A:
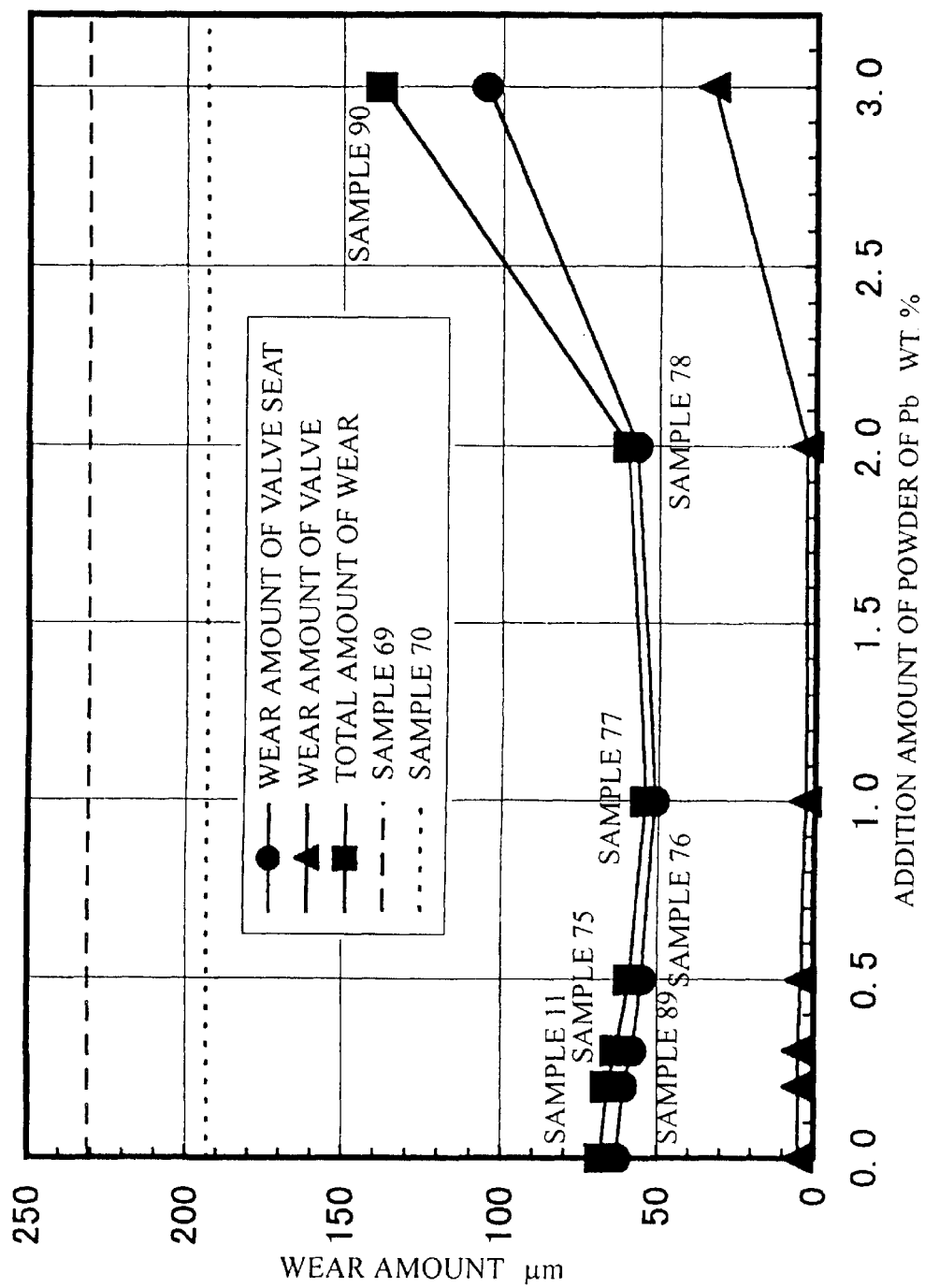
FIG. 25($a$) is a chart showing the relationship between the amount of addition of lead powder and the wear amount, in the embodiment of the present invention.
FIG. 25(b) is a chart showing the relationship between the amount of addition of lead powder and the radial crushing strength, in the embodiment of the present invention.
Figure 25B:
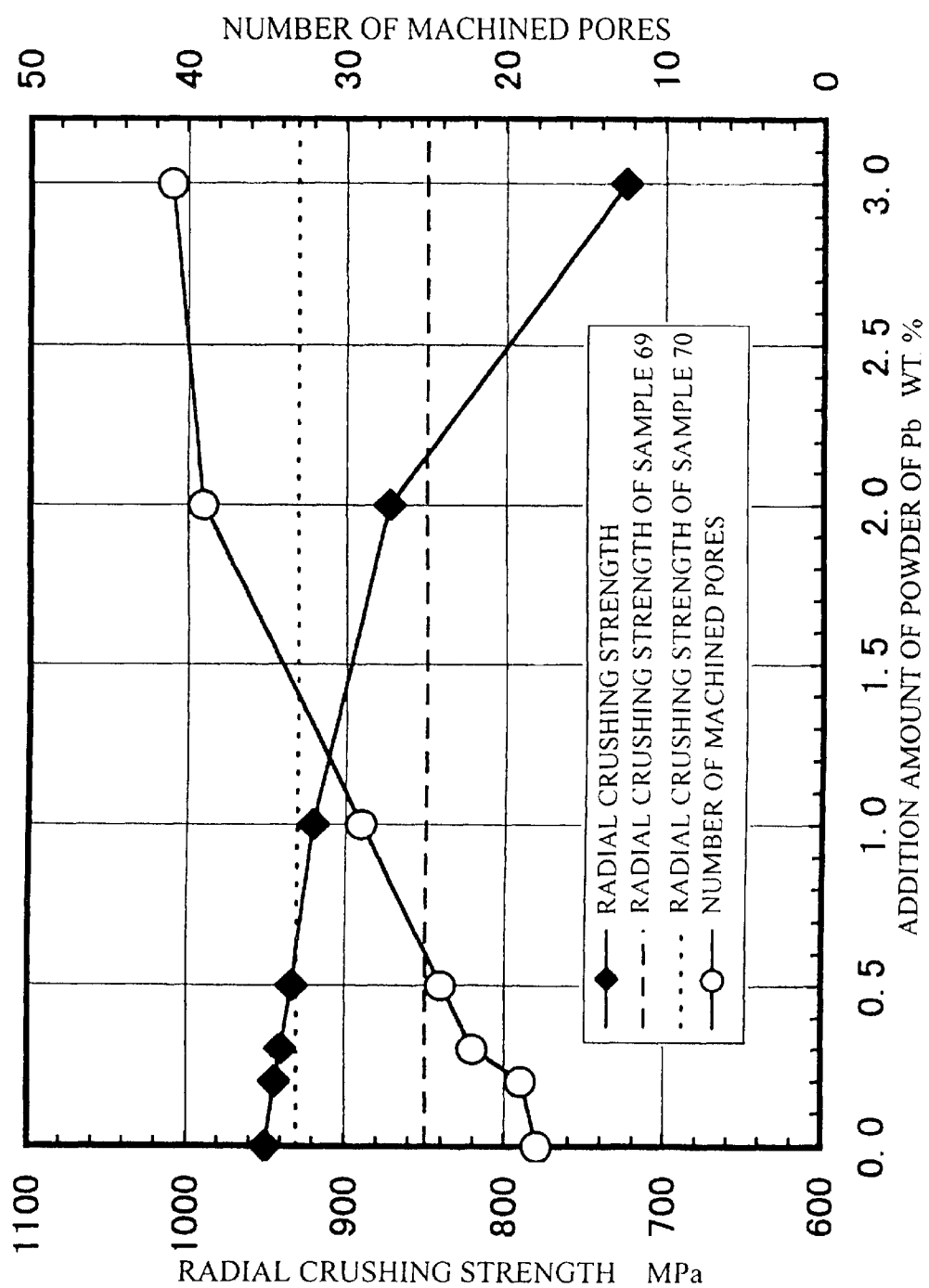

Next, by comparing the test results of the sintered alloys of the sample Nos. 11, 75 to 78, 89, and 90 of Table 14 and Table 15 the effect of the addition amounts of the lead powders is checked. The test results are shown in FIG. 25 together with the total wear amounts of the conventional sintered alloys of the sample Nos. 69, and 70. As shown in FIG. 25(b), the improvement of the wear resistance becomes significant when the addition amount of the lead powder is 0.3% by weight, and as the addition amount of the lead powder increases, the machinability is improved. Also, a metallographic structure is exhibited in which fine lead phases are dispersed in the matrix so far as the addition amounts of the lead powders is 2.0% by weight, so that favorable in strength and wear resistance which are generally the same as in the case where no addition is made. However, when the addition amount of lead powder exceeds 2.0% by weight, the wear resistance is lowered (see FIG.

25(*a*)). The reason is considered as follows. When the lead powders are added in the amount exceeding 2.0% by weight, the lead powders are aggregated to produce a large and coarse lead phase(s) in the matrix. By this large and coarse lead phase(s) formed in the matrix, large force is acted on the matrix in such a way as to spread the matrix due to expansion of the lead under elevated temperatures. As a result, the strength of the matrix is lowered. This phenomenon did not occur during the radial crushing test under room temperature. From this fact, it is known that the machinability can be improved by adding the lead 9 powder in the range of 0.3 to 2.0% by weight, without deteriorating the strength and wear resistance.

Figure 26A:
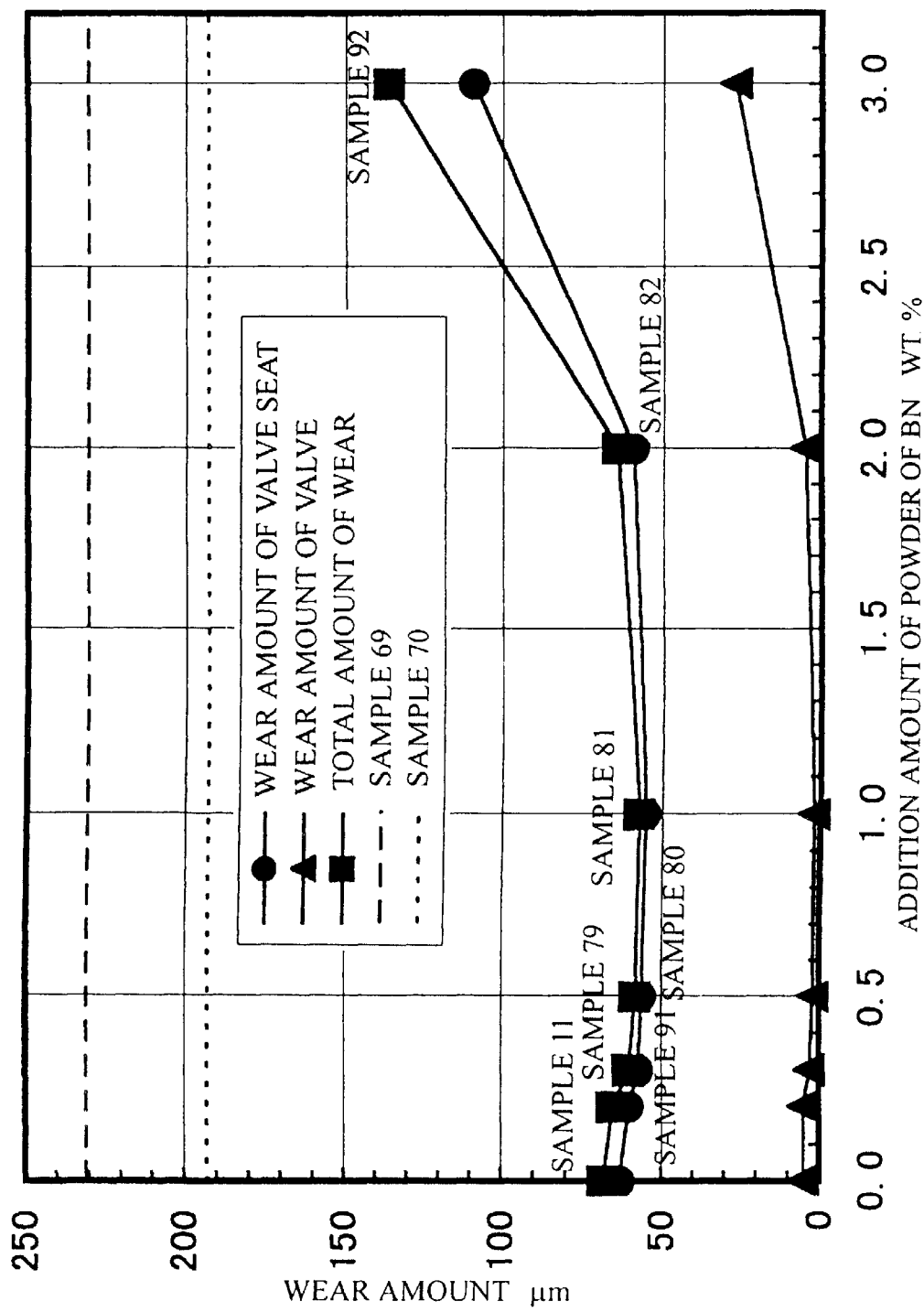
FIG. 26(a) is a chart showing the relationship between the amount of addition of boron nitride powder and the wear amount, in the embodiment of the present invention.
Figure 26B:
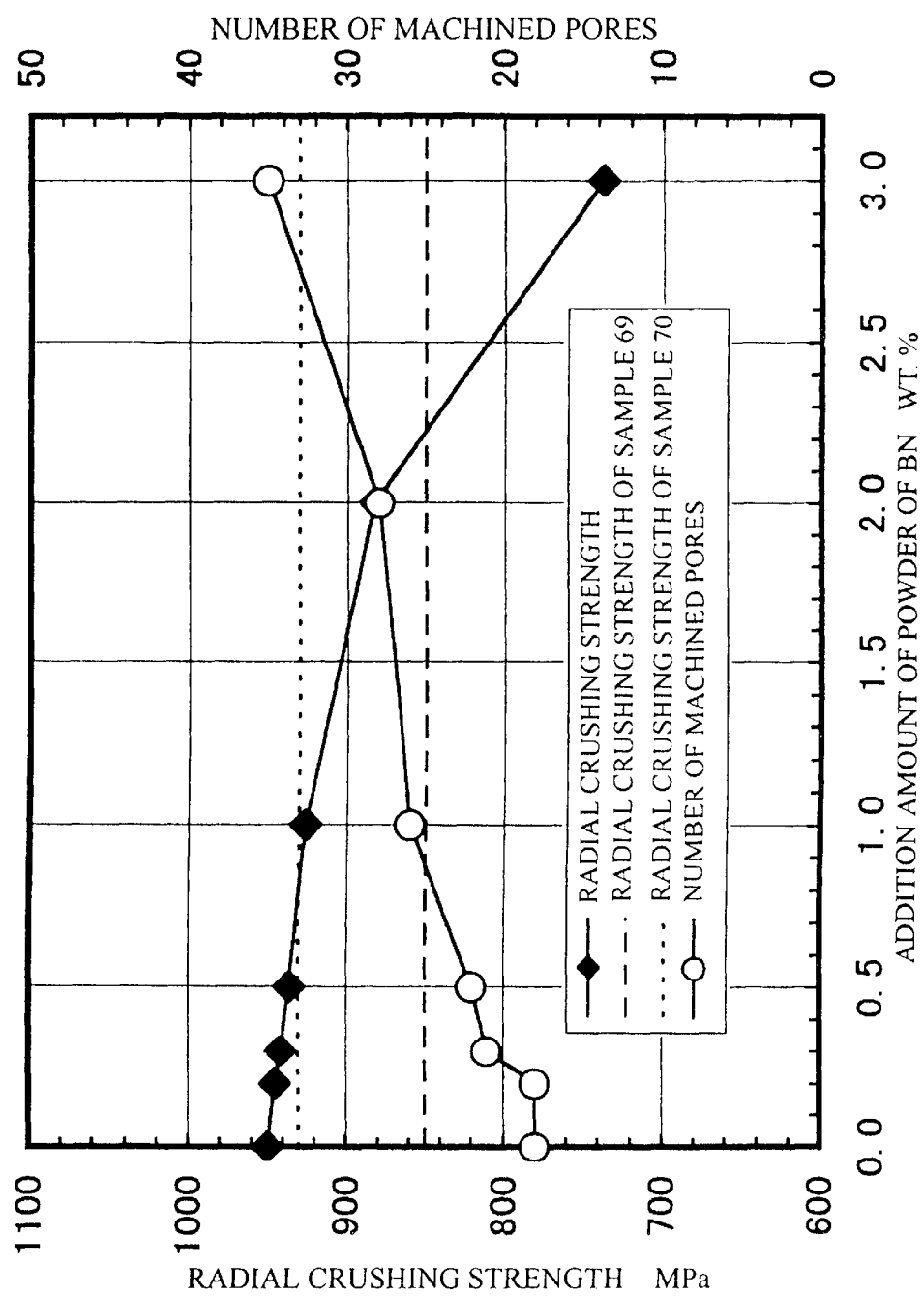
FIG. 26(b) is a chart showing the relationship between the amount of addition of boron nitride powder and the radial crushing strength, in the embodiment of the present invention.

Next, by comparing the sample Nos. 11, 79 to 82, 91, and 92 of Table 14 and Table 15 t is checked how the addition amounts of the boron nitride (BN) powders affect. The test results are shown in FIG. 26 together with the total wear amounts of the conventional sintered alloys of the sample Nos. 69 and 70. As shown in FIG. 26(*b*), the improvement of the wear resistance becomes significant when the addition amount of the boron nitride powder is 0.3% or more by weight. With the increase of addition of the boron nitride powder, the machinability is improved under the effect of the boron nitride particles dispersed in the matrix in accordance with the increase of the addition of the boron nitride powders. However, the boron nitride powder interrupts the diffusion of the powders during the sintering. As a result, the strength of the matrix is lowered and the radial crush sterength is lowered. Further, as shown in FIG. 26(*a*), the wear amount of the valve seat is small although it slightly increases and exhibit favorable wear resistance so far as the addition amounts of the boron nitride powder is 2.0% by weight. When the addition amount exceeds 2.0% by weight, the wear amount increases under the effect of the lowering of the strength of the matrix. From this, it is known that the machinability can be improved within the limit that the strength and the wear resistance are not deteriorated, when the addition amounts of the boron nitride powders is the range of 0.3 to 2.0% by weight.

Figure 27A:
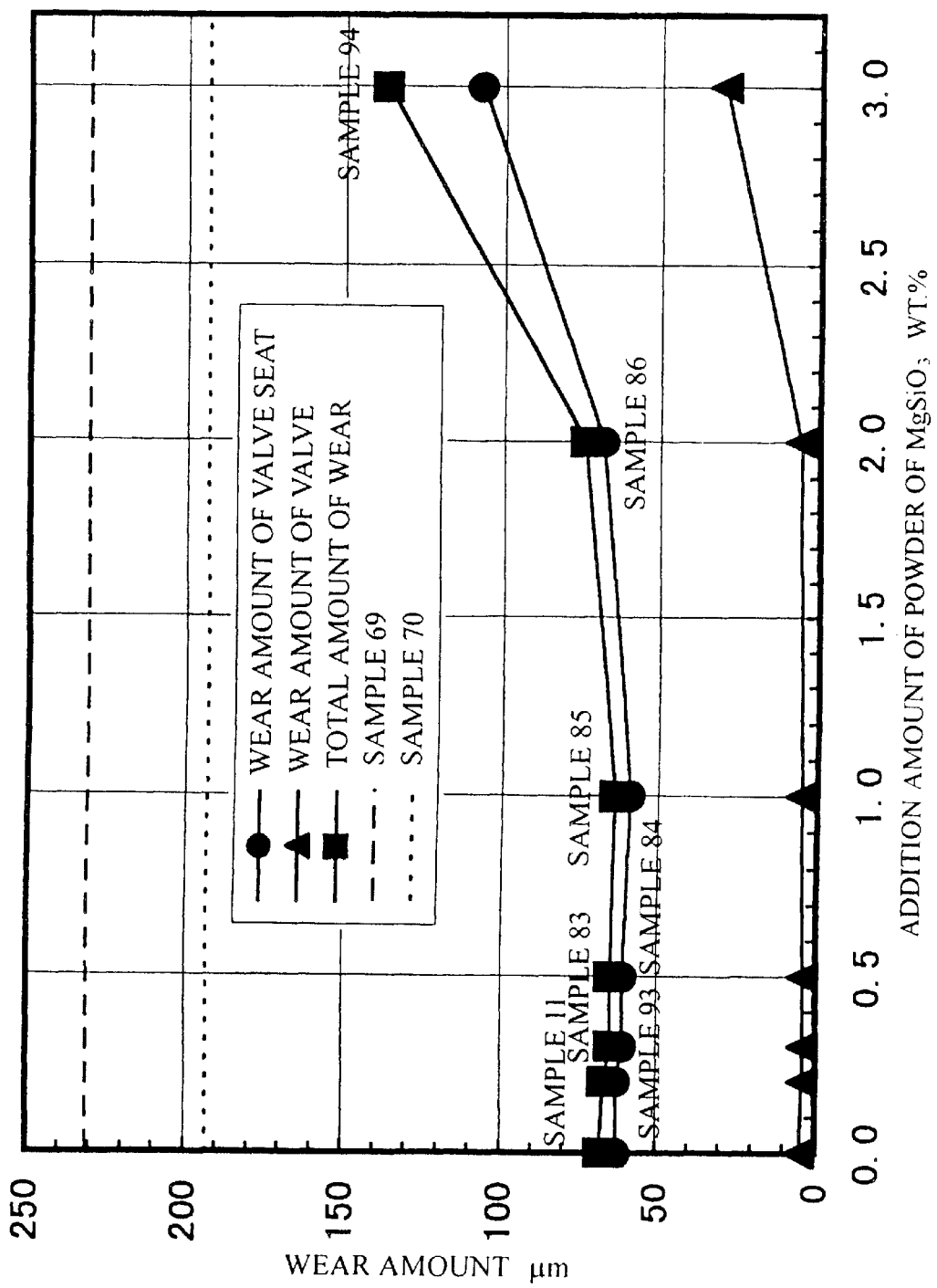
FIG. 27(a) is a chart showing the relationship between the amount of addition of $MgSiO_3$ powder and the wear amount, in the embodiment of the present invention.
Figure 27:
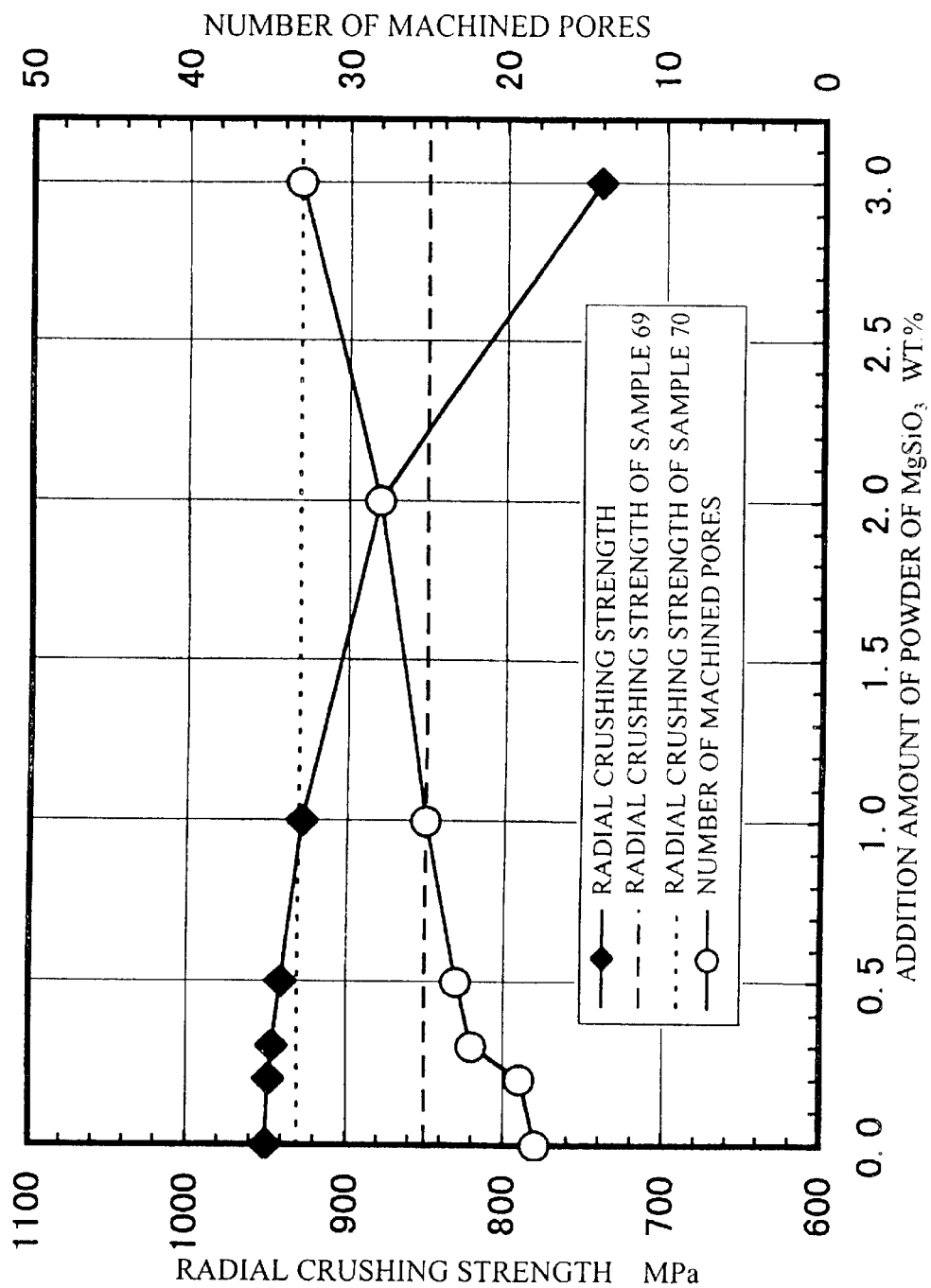
FIG. 27(b) is a chart showing the relationship between the amount of addition of $MgSiO_3$ powder and the radial crushing strength, in the embodiment of the present invention.

Next, by comparing the sample Nos. 11, 83 to 86, 93, and 94 of Table 14 and Table 15, is checked how the addition amounts of the $MgSiO_3$ powders affect. The test results are shown in FIG. 27 together with the total wear amounts of the conventional sintered alloys of the sample Nos. 69 and 70. As shown in FIG. 27(*b*), the improvement of the wear resistance becomes significant when the addition amount of the $MgSiO_3$ powder is 0.3% or more by weight. The machinability is improved under the effect of the $MgSiO_3$ particles dispersed in the matrix in accordance with the increase of the addition amounts of $MgSiO_3$ powders. However, $MgSiO_3$ powder interrupts the diffusion of the powders during the sintering, so that the strength of the matrix is lowered and the radial crush sterength is lowered. Further, as shown in FIG. 27(*a*), the wear amount of the valve seat is small although it slightly increases and exhibits favorable wear resistance so far as the addition amount of the $MgSiO_3$ powder is 2.0% by weight. When the addition amount exceeds 2.0% by weight, the wear amount increases under the effect of the lowering of the strength of the matrix. From this, it is known that the machinability can be improved within the limit that the strength and wear resistance are not sacrificed, when the addition amounts of the $MgSiO_3$ powders is the range of 0.3 to 2.0% by weight.

Figure 28A:
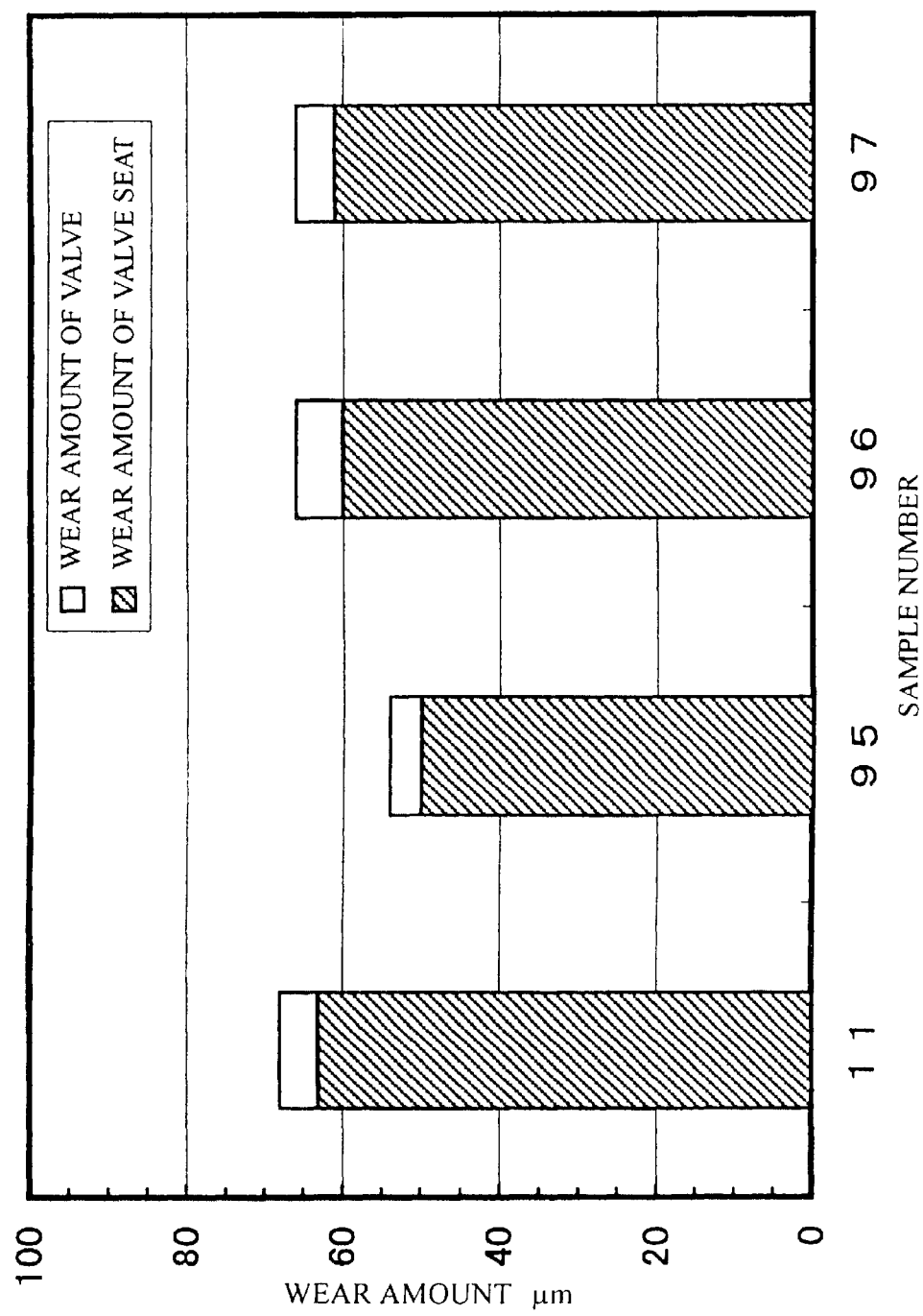
FIG. 28(a) is a chart showing how the infiltration or impregnation of lead, copper, and acrylic resin affects the wear amount, in the embodiment of the present invention.
Figure 28B:
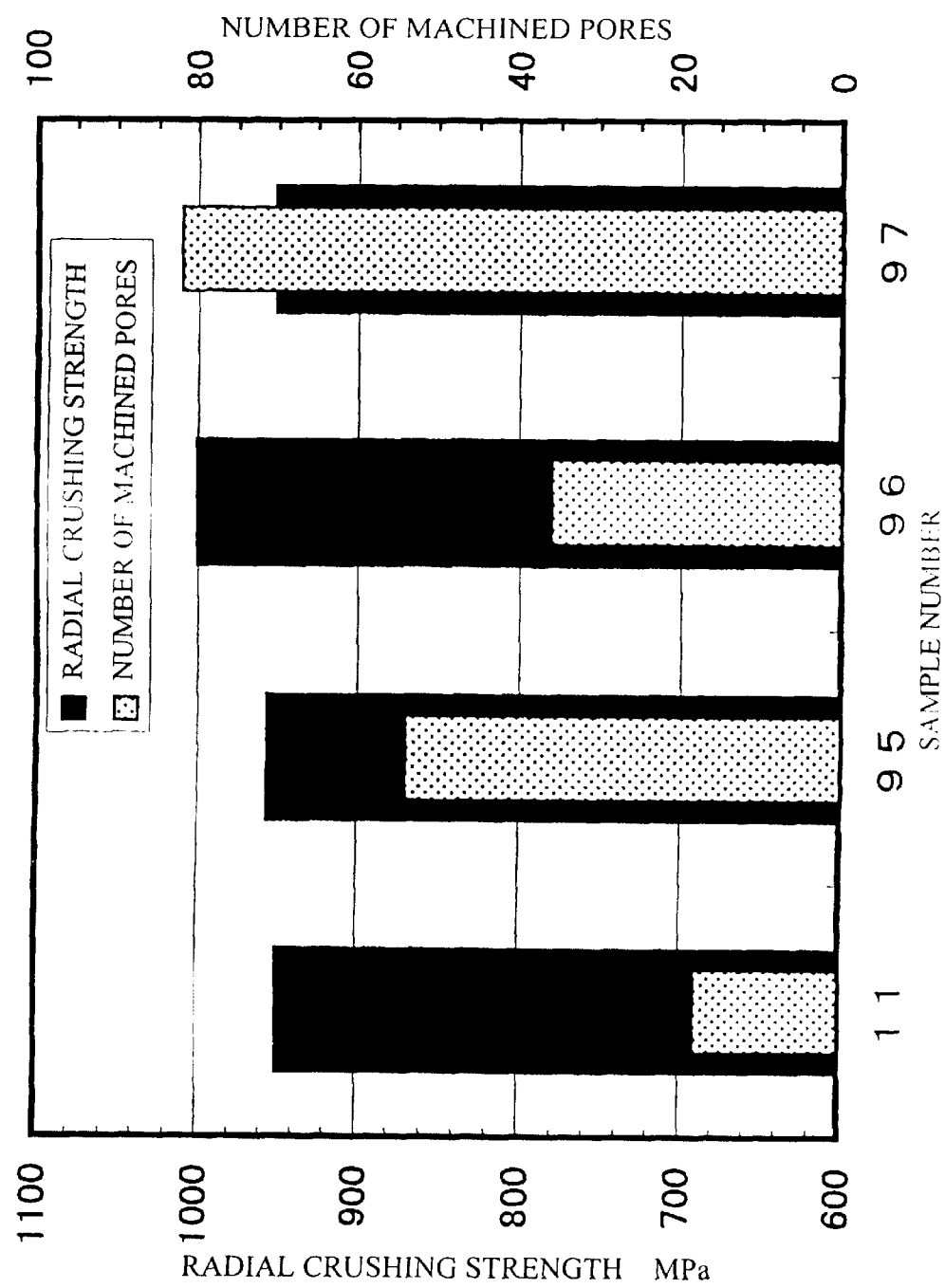
FIG. 28(b) is a chart showing how the infiltration or impregnation of lead, copper, and acrylic resin affects the radial crushing strength, in the embodiment of the present invention.

Next, by comparing the sample Nos. 11, and 95 to 97 of Table 14 and Table 15 t is checked how the infiltration or impregnation of the lead, etc. affects. The test results are shown in FIG. 24. As shown in FIG. 28, it is known that by having the lead, the copper, and the acrylic resin infiltrate or impregnate, the wear resistance is almost as good as or better than the case where no infiltration or impregnation is effected and that the machinability can be improved extensively while maintaining the superb wear resistance.

As described hereinbefore, in the sintered alloy having superb wear resistance and the process for producing the same, there can be provided a higher wear resistance and machinability than the conventional techniques. Furthermore, by limiting the area ratio of the particle group and the like, the wear resistance and the machinability can be surely improved.

What is claimed is:

1. A sintered alloy having superb wear resistance comprising:

composite phases dispersed in a matrix of the sintered alloy;

said composite phase consisting of;

a particle group in which Cr carbide particles and Cr sulfide particles exist in a mixed condition; and a ferrite phase or a mixture phase of ferrite and austenite surrounding said particle group as a core.

2. A sintered alloy having superb wear resistance according to claim 1, wherein proportion of said particle group with respect to a metallographic structure of said sintered alloy ranges from 3 to 30% by area ratio.

3. A sintered alloy having superb wear resistance according to claim 1 or 2, wherein carbide particles formed by at least one of Mo, W, V exists in a mixed condition in said particle group.

* * * * *